United States Patent [19]

Dargan

[11] Patent Number: 4,677,659
[45] Date of Patent: Jun. 30, 1987

[54] TELEPHONIC DATA ACCESS AND TRANSMISSION SYSTEM

[76] Inventor: John Dargan, 10409 Montrose Ave. #301, Bethesda, Md. 20814

[21] Appl. No.: 771,624

[22] Filed: Sep. 3, 1985

[51] Int. Cl.⁴ .................... H04M 11/06; H04M 11/00
[52] U.S. Cl. ........................................ 379/97; 379/52; 379/88; 379/96
[58] Field of Search .............. 179/2 DP, 2 A; 379/52, 379/88, 96, 97

[56] References Cited

U.S. PATENT DOCUMENTS

| | | | |
|---|---|---|---|
| 3,647,973 | 3/1972 | James et al. | 179/2 DP |
| 3,870,821 | 3/1975 | Steury | 179/2 DP |
| 4,304,968 | 12/1981 | Klausner et al. | 179/6.02 |
| 4,426,555 | 1/1984 | Underkoffler | 179/84 L |
| 4,440,977 | 4/1984 | Pao et al. | 179/2 DP |
| 4,532,378 | 7/1985 | Nakayama et al. | 179/2 DP |
| 4,585,908 | 4/1986 | Smith | 179/81 C |
| 4,608,460 | 8/1986 | Carter et al. | 179/6.11 |

OTHER PUBLICATIONS

L. R. Rabiner, "Digital Techniques for Computer Voice Response: Implementations and Applications", IEEE, Apr. 1976, pp. 427-432.
Smith et al., "Alphabetic Data Entry Via the Touch-Tone Pad", Human Factors, Apr. 1971, pp. 189-190.
"Straight Talk", DECtalk, Inc., pp. 11 and 12, Copyright 1985.

*Primary Examiner*—Gene Z. Rubinson
*Assistant Examiner*—Matthew E. Connors
*Attorney, Agent, or Firm*—Shlesinger, Arkwright, Garvey & Fado

[57] ABSTRACT

A system for transmitting and accessing data through a standard telephone system. The system including activating a key or sequence of keys wherein each key represents a plurality of letters. Signals produced by activating the keys are compared to a data base having indexed entries of words or names. In this way, words can be input into the system using only 8 unique keys.

20 Claims, 4 Drawing Figures

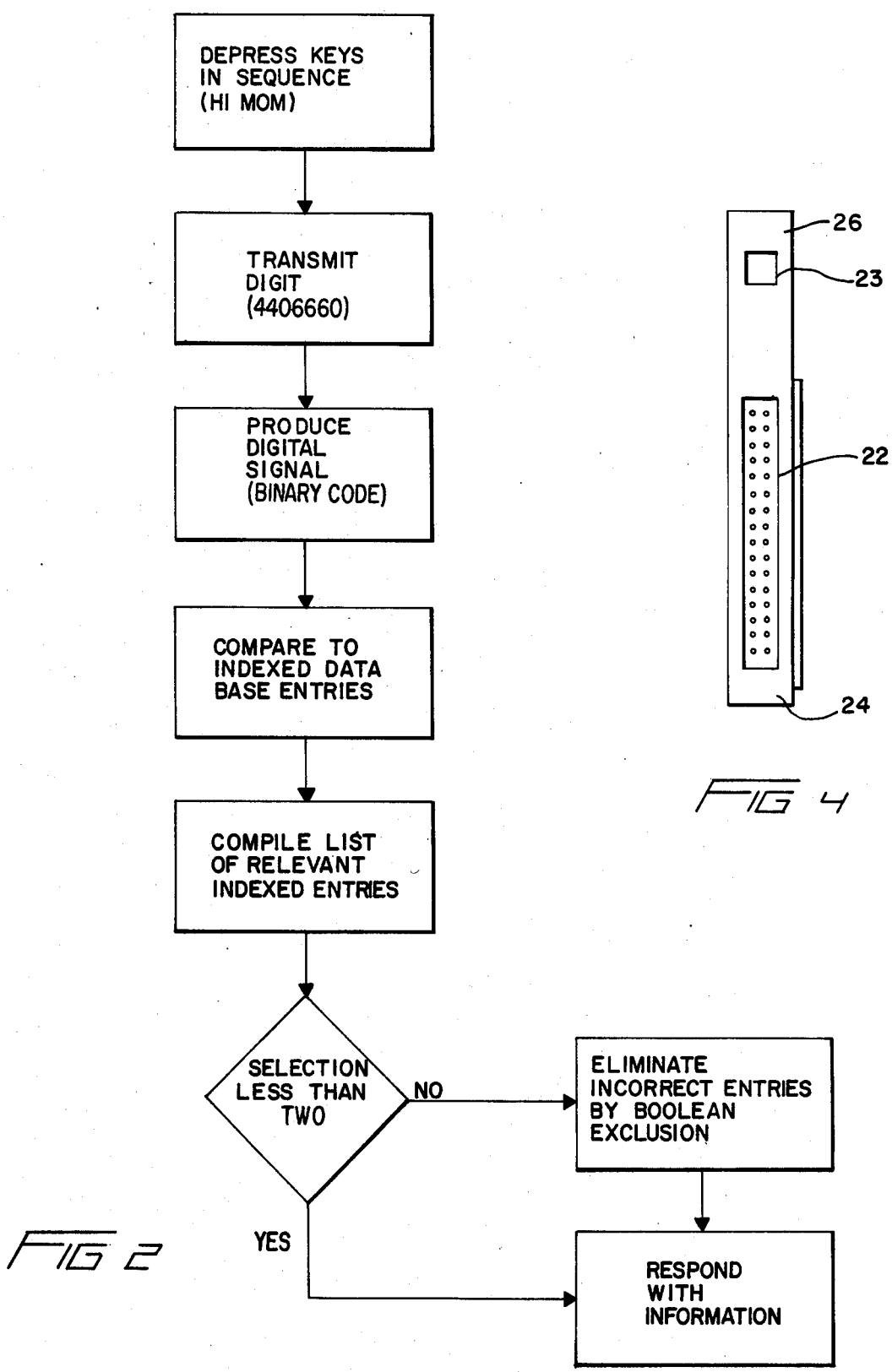

TELEPHONIC DATA ACCESS AND TRANSMISSION SYSTEM

BACKGROUND OF THE INVENTION

The present invention relates to a telephonic data access and transmission system, and, more particularly, to a system for transmitting and accessing data through a standard TOUCH-TONE telephone system utilizing a standard TOUCH-TONE telephone set.

In the past, several systems have been proposed which allow data to be entered into a telephone TOUCH-TONE set and which then transmit the data to a central computer or the like. It is typical for such systems to rely on coding schemes wherein strings of letters may be transmitted to the central computer through the TOUCH-TONE telephone set by depressing TOUCH-TONE keys in such a manner that the central computer will be able to interpret the information transmitted. Such systems are desirable for use in conducting business transactions by phone without intervention beween the caller and the data processing apparatus. For example, it is desirable to conduct banking by phone, to purchase commercial products by phone, place reservations on airlines or the like by phone and arrange ticketing. Further, it would be convenient for a telephone user to gain access to various informational data bases or the like. For instance, it is desirable for a telephone user to get phone directory information.

Although it is desirable to tramsit data and access data utilizing the TOUCH-TONE (DTMF) transmitter of the standard telephone set, systems devised by the prior art are inefficient because of the complicated coding schemes which are involved. Coding schemes have been necessary in the past because the standard telephone TOUCH-TONE key pad is designed to provide only ten or twelve distinct keys. In order to transmit letters, prior art systems have relied on coding schemes and translating devices to transmit information between the telephone set and the computer.

The standard TOUCH-TONE telephone set (transmitter) typically includes twelve buttons, or keys, disposed in a matrix of four horizontal rows by three vertical columns. Each of the keys has associated therewith two distinct frequencies: A frequency chosen from a group ('A') of relatively low frequencies, corresponding to the row wherein the button is disposed; and a frequency selected from a group ('B') of relatively high frequencies, corresponding to the column wherein the button is disposed. Depression of a given key causes transmission of a dual tone multi frequency (DTMF) signal having frequency components of both the group A (row) and group B (column) frequencies associated with the disposition of the key in the matrix.

Each key of the TOUCH-TONE phone additionally is enscribed with indicia such as numerical designations (0 through 9) as well as alphabetic designations (A through Z) as shown in FIG. 1. The alphabetic characters "Z" and "Q" are not portrayed on the standard TOUCH-TONE set, but can be considered to be associated with the keys with the designations 9 and 7 respectively.

U.S. Pat. No. 4,427,848 issued to Tsakanikas teaches a system for the transmission of alpha numeric data by use of a standard telephone set. The system provides a translation technique wherein alphabetic characters are transmitted by depressing a designated key a number of times equal to the relative position of the inscription of the character on the key, followed by the depression of a key on which the character is inscribed. A return to the numeric mode may be effected by depression of a second designated key. Other translation schemes are disclosed by Tsakanikas and are equally burdensome to a user.

U.S. Pat. No. 4,500,751 issued to Darland et al, teaches a data communication system wherein a large number of remote terminals communicate with a central host terminal through telephone lines. The system contemplates the use of two or more twelve-key TOUCH-TONE key pads which are connected to the same inputs of a two tone signal generator. Key pads are differentiated when the group of keys in each key pad triggers a corresponding timer when the key is released. The timer then actuates a signal generator through one of its inputs to generate a tone that identifies which key pad is being actuated when the key in that pad is released.

U.S. Pat. No. 4,307,266 issued to Messina teaches a telephone communication apparatus for use by a handicapped person. The system uses a code wherein the user enters the appropriate position for the letter of the alphabet to be communicated and a second entry is input to identify which one of the plurality of letters (or the number) the user intends to transmit.

U.S. Pat. No. 4,012,599 issued to Meyer teaches a telephone communication system for use by a deaf person. An encoding scheme is utilized wherein alphabetic characters are trnsmitted by activating at least two keys.

U.S. Pat. No. 3,381,275 issued to Tsakanikas, describes a telephonic data transmission system utilizing what is termed a twin depression translation technique. This system involves the simultaneous depression of a plurality of keys which produces a signal having frequency characteristics, which may be discriminated from the pairs of frequencies generated in response to the depression of a single key.

Another example of a TOUCH-TONE to alpha numerical translator is described in U.S. Pat. No. 3,618,038 issued to Stein. This system utilizes what is known as the delayed depression translation technique, wherein depression of keys having different durations are discriminated.

In addition, other translation techniques whereby each alpha numeric symbol is represented by a specific sequence of DTMF signals with each character separated by a specific designated DTMF signal have been proposed. An example of such a transmission technique is described in Brumfield et al, Electronics, "Making a Data Terminal out of the TOUCH-TONE Telephone" McGraw Hill, July 3, 1980.

As is apparent from the above discussion, systems taught by the prior art are slow, involve a coding scheme which is difficult for a user to master, and are in general not practical for most people to use.

OBJECTS AND SUMMARY OF THE INVENTION

It is an object of the present invention to provide a system for transmission of and access to data using a standard TOUCH-TONE phone without employing an encoding scheme for each alphabetic letter.

It is another object of the invention to apply the principle of Boolean exclusion (defined and exemplified below) to discriminate among data base entries indexed by numerals matching the latters designated on a standard TOUCH-TONE telephone key pad and to discriminate among separate entries with matching index numbers by the content of their corresponding informational fields.

It is another object of the invention to provide a system for transcribing a letter or string of letters wherein letters or strings of letters are keyed into a standard TOUCH-TONE telephone, relayed to a computer, and compared to indexed entries of a data base. The computer then responds with information desired by the user.

It is another object of the invention to provide a telephone directory system wherein a person's name or part of a person's name is keyed into a standard TOUCH-TONE telephone utilizing the alphabetic characters which are inscribed on the TOUCH-TONE key pad. Signals generated from TOUCH-TONE keys are then directed to a central computer which can access a telephone directory data base, and a telephone number relating to the information keyed in by the user is given in response, typically by means of electronic voice synthesis.

Still another object of the present invention is to provide a means for accessing data by telephone wherein a user may utilize the letters enscribed on a standard TOUCH-TONE telephone to key strings of letters without the use of a code scheme.

It is a further object of the invention to provide a system for telephone communications which can be used by a deaf person and involves the use of a standard telephone key pad without the use of an eleborate coding scheme.

It is a further object of the invention to provide a system for the telephonic access of data and transmission of data which is readily adaptable to standard computer hardware.

It is an an object of the invention to provide a system including a large data base of information, such as an English language dictionary or an ordinary telephone book, that can be stored electronically in such a way that each entry could be retrieved by list processing software using an alphabetic conversion system for the telephone key pad buttons number 2, 3, 4, 5, 6, 7, 8, and 9; and that the software would search for information using the basic sequence: request input from user, compile a list of possible entries; convey the entry if only one is present; otherwise, eliminate incorrect entries by Boolean exclusion and convey the remaining correct entry; and that such a system would allow a human to interact directly with a central computer using only his standard TOUCH-TONE telephone.

Still another object of the invention is to provide a telephone key pad spelling system that requires only one button to be pushed for each letter.

Still another object of the present invention is to provide a telephone key pad spelling system which is easy to learn and is simpler to use than a standard typewriter.

Another object of the present invention is to provide a word processing apparatus that is adapted so a handicapped person could readily input data with one hand or with only one finger.

Various features of novelty which characterize the invention are pointed out with particularity in the claims annexed to and forming a part of this disclosure. For a better understanding of the invention, its operating advantages and specific objects, attained by its uses, reference is made to the accompanying drawings and descriptive matter in which preferred embodiments of the invention are illustrated.

BRIEF DESCRIPTION OF THE DRAWINGS

In the drawings:

FIG. 2 shows the general algorithm of the system of the present invention.

FIG. 4 is a top plan view of a mini word processor according to the invention.

DETAILED DESCRIPTION OF THE PREFERRED EMBODIMENT

Figure 1:
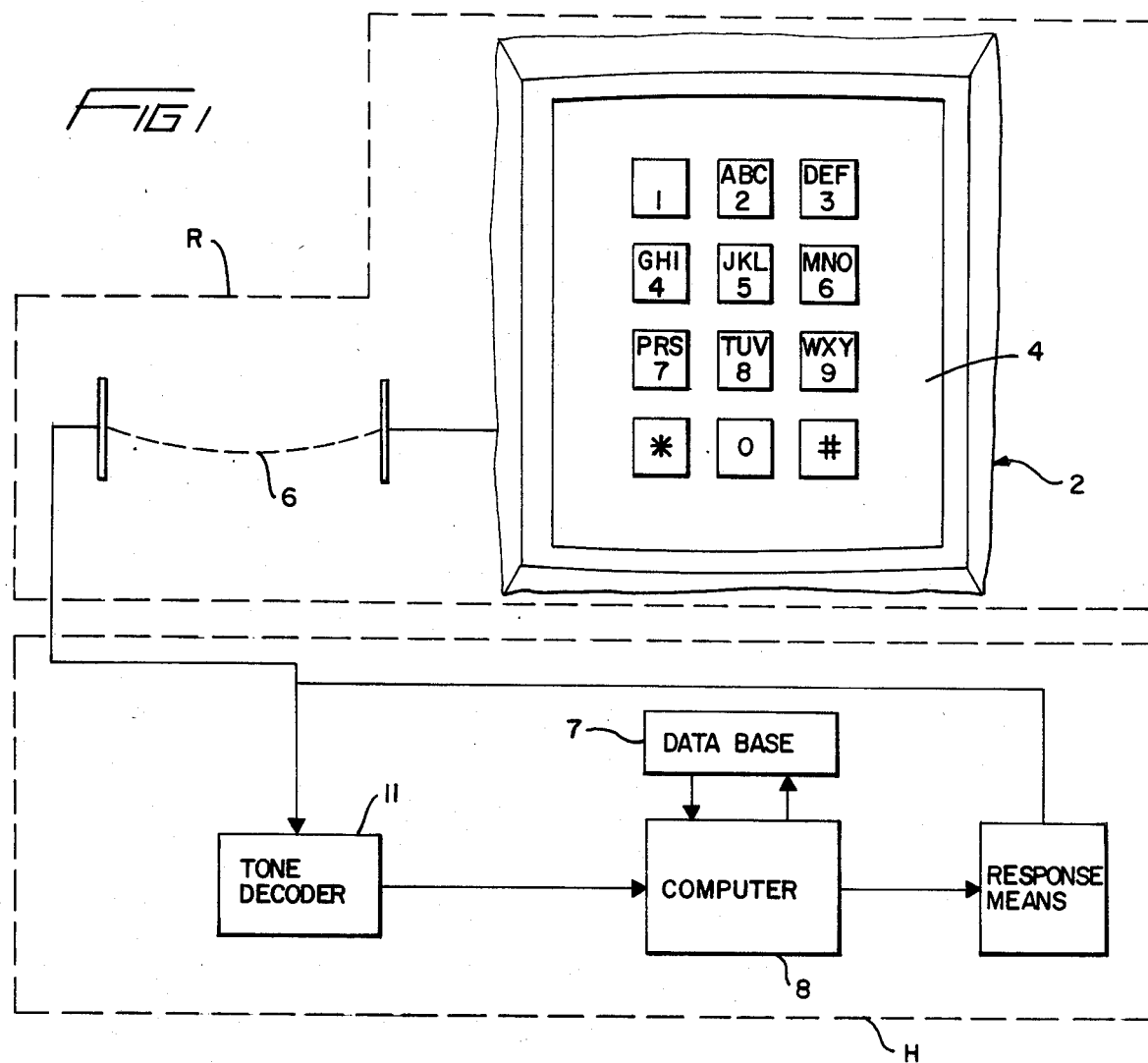
FIG. 1 is a schematic view showing a remote TOUCH-TONE telephone connected to a central data base.

U.S. Pat. No. 4,500,751 to Darland et al and U.S. Pat. No. 4,427,848 to Tsakanikas show various known equipment for connecting telephones to computers or the like. U.S. Pat. No. 4,427,848 to Tsakanikas and U.S. Pat. No. 4,500,751 to Darland et al are hereby incorporated by reference.

Referring to the drawings in particular, the invention embodied therein utilizes a TOUCH-TONE telephone set 2 including a TOUCH-TONE telephone key pad 4 at remote station generally designated R and telephone lines or the like 6. A host station H is connected to remote station R through telephone line 6 and include a computer or other data processing apparatus 8 and a TOUCH-TONE decoder 11 for receiving the DTMF signals from the remote station R and generating a corresponding data stream that is readable by the computer 8.

The system of the present invention is based on the use of a standard TOUCH-TONE key pad 4 whereby, unlike prior art systems, letters are transmitted by pressing one key for the one letter desired. Strings of letters or words are transmitted by pressing sequences of keys wherein each letter of the string of letters or each letter of the word is transmitted by pressing the key bearing that letter's designation. Specifically, any one of the letters A, B or C may be transmitted by depressing the "2" key. In this way, all of the letters A through Z may be transmitted by activating one of the keys 2 through 9 of the standard TOUCH-TONE telephone key pad-all the letters A through Z being represented by only eight unique keys.

Each word or letter string is delimited from the next by depressing a designated spacebar key. In the preferred embodiment the zero/operator key is the spacebar/delimiter key.

Table 1 shows the correlation between the letter a user intends and the key depressed. Since only eight keys are used for the twenty-six letters of the alphabet, the keys represented by "1", "*", and "#" are free for other uses, including the transmission of a simple code to activate the keys for number designations and punctuation. In this manner, all of the keys of a traditional typewriter are represented in a standard TOUCH-TONE telephone key pad as used in the present invention (Table III).

TABLE 1

| User Intends | Key depressed |
|---|---|
| A, B or C | 2 |

TABLE 1-continued

| User Intends | Key depressed |
|---|---|
| D, E or F | 3 |
| G, H or I | 4 |
| J, K or L | 5 |
| M, N or O | 6 |
| P, Q, R or S | 7 |
| T, U, or V | 8 |
| W, X, Y or Z | 9 |
| Word delimit key/spacebar | 0 |

The present invention relies on list processing software, an appropriate data base for the specific use intended, and an efficient sorting routine, based on the length of words and the configuration of letters, which allows the information in the data base to be quickly accessed. As best seen in FIG. 2, strings of letters keyed into a telephone key pad 4 transmit DTMF signals by telephone line or the like 6 to a computer 8. It should be noted that this invention also contemplates the use of a telephone key pad 4 at the same location as computer 8. The signals are then converted by a TOUCH-TONE decoder or the like 11 to digital signals intelligible by the computer 8. The signals are then compared within the computer to a data base 7 having a multiplicity of indexed informational entries. If two or more indexed entries match the keyed numerical sequence, the computer eliminates incorrect entries through Boolean exclusion. The computer then responds with the informational entry using electronic voice synthesis.

As is apparent to one of ordinary skill in the art, the above system has numerous applications of which only a small portion are presented infra. One of the more significant applications is directory assistance. The description below illustrates Boolean exclusion as embodied in this invention.

TELEPHONE DIRECTORY SYSTEM

Present methods of accessing telephone information via telephone depend on an operator and a computer data base wherein the operator is asked to give the telephone number of a specific person having a last name, first name or first initial, a residence or place of business and a locality at which the residence or place of business is located. The application of this system to automate directory assistance would allow a person having a TOUCH-TONE telephone to gain direct access to information stored in the data base by using a standard TOUCH-TONE phone.

The telephone directory system contemplated by the invention relies on the telephone data access and data transmission system described above. In particular, a user may dial the number for the telephone directory system and will receive instructions from a standard voice synthesis device which requests the user to input six letters corresponding to the last name for which a number may be required. For example, the caller may be addressed by an electronically synthesized voice which states "You have reached directory assistance. This service can assist you if you will type in the first six letters of the person's last name using your telephone key pad." The user then inputs the first six letters of the last name using the standard telephone key pad. For example, the name Smith would be transmitted by depressing the sequence of keys correspondence to the individual keys having the numbers "76484" inscribed on them. The caller then is addressed by a synthesized voice which may say "Thank you. What is the first letter of the first name?" The user will then depress the key with a "5" inscribed on it corresponding to the letter "J". Next, the synthesized voice says "Thank you. What are the first three letters of the locality?" The user then may input "275" which represents the first three letters of the locality of "Arlington". Next, the synthesized voice will state "Thank you. What is the two letter state code?" At this point, the user may input "82" representing the state code "VA" or Virginia. The computer 8 at the central terminal or host station H will then compile a list of all relevant possibilities—the digits entered by the caller are compared with the indexed data base through means of an efficient sorting routine and a list of all entries which match those twelve digits is compiled.

Next, if more than five possibilities are found in the data base, then Boolean exclusion is used to reduce number of possibilities. Boolean exclusion is herein defined as the method of identifying properties of data base entries, querying the user in regard to the correct property, and eliminating all entries having the incorrect property (see Table II for a list of typical questions). With five or less possibilities, program control goes immediately to the instructions which release the appropriate phone number.

When more than five entries exist which conflict in the telephone directory data base, the caller is queried as to which letter was intended. For instance "Does the first name begin with the letter J?" The caller is expected to press "N" for No and "Y" for Yes. The list of possibilities is then reduced by eliminating all entries which non-matching first initials.

If there are still more than five possibilities, the program checks to see if more than one locality is represented among the entries in the list of possibilities. If more than one locality is represented among the entries, the caller is asked which locality was intended. For instance "There are now forty-five possibilities. Is the locality Arlington?" The program then reduces the list of possibilities by eliminating all entries with non-matching localities.

The program then checks to see if more than one last name is represented among the entries in the list of possibilities. The caller than may be asked which last name was intended. For instance "There are now twenty possibilities. Is the last name Smith?" The program then reduces the list of possibilities by eliminating all entries with non-matching last names.

TABLE II

| Typical Boolean Exclusion Questions |
|---|
| Did you intend X? |
| Did you mean X? |
| X? |
| Is the X-characteristic Y? |
| Does X contain Y? |
| Does X exclude Y? |
| May items costing more than X be excluded? |
| Is the amount of X lower than Y-amount? |
| Is X's occupation Y? |
| Does X produce Y? |
| Is X listed on the New York Stock Exchange? |
| Is X in Y-locality? |
| Is X the first letter of Y? |
| Did you mean X in the context of Y? |
| Does X provide Y-service? |
| Is X the manufacturer of Y? |
| Continue? |
| Go on? |

In some cases, even after the above, there are still more than one data base entries that match the entry having the number which the user requests. In this case, first names must be used to reduce the possibilities. This step begins by first reducing the list of possibilities by removing all entries whose first name is represented in the phone directory by only one initial (the "singlets") and placing them in a separate list.

At this juncture, the twelve digit code number originally input by the user need no longer be used. The program deletes the twelve digit code number from the list of possibilities at this juncture. Twelve digit code numbers are now replaced by new code number of variable length representing the first name of each person on the list of possibilities. For instance, Ann Smith would be represented by "266" corresponding to the letters ANN. At this point the user can be requested to input the person's first name, and the list of possibilities reduced to only those corresponding to that name.

When the list of possibilities is five or less, the program may begin asking the user which person on the list of possibilities is the person for which a number is desired. The synthesized voice will query the user as to which of the remaining possibilities is the person for which a number is desired. The user will select the appropriate name with appropriate address by pressing the "Y" key or the "N" key.

If all other entries on the list of possibilities have been eliminated, the program then checks whether the list of previously segregated entries whose first name is represented by initial only. The program then lists the remaining names only having a first initial associated therewith.

If the user has still not found the number which is desired, the program uses synthetic speech to inform the caller of the lack of success and suggests a "help" number for further assistance.

A diagram located in the appendices portrays the procedure discussed above.

TELEPHONE KEY PAD SPELLING ALGORITHM (TKSA)

The system of the present invention is well suited for use in wordprocessing. Using only twelve keys of a standard TOUCH-TONE telephone set, a person using the system of the present invention has the equivalent of a full typewriter wordprocessor at his or her disposal. Unlike systems taught by the prior art, the system of the present invention is actually simpler to use than an ordinary typewriter. Referring now to FIG. 2 in particular, the telephone key pad spelling algorithm is shown. This system relies on a TOUCH-TONE telephone set 2 having a TOUCH-TONE key pad 4 connected by telephone lines or the like to a host station H having a computer 8. The computer 8 may be connected to the telephone line 6 by TOUCH-TONE decoder 11 through the telephone lines to remote station R where the telephone set 2 is located. Alternatively, computer 8 may be directly hooked to the telephone set 2 at same location as the telephone set 2.

A person practicing the TKSA system of the present invention may use the TOUCH-TONE telephone set 2 by using the TOUCH-TONE keys 2 through 9 to input the twenty-six letters of the alphabet. As seen in Table III, punctuation for the TKSA system may be input into the TOUCH-TONE telephone key pad by keying a "1" and then an abbreviation for the punctuation system desired. As seen in Table IV special commands such as "backspace" and the like may be input into the TKSA system by keying a "1" and then a suitable abbreviation for the special command. Other wordprocessing commands would be added in a similar manner as needed for a particular application. Numbers may be input into the system by using the number sign "#" followed by the appropriate number. The zero key "0" or "operator" key may be used as a word delimiter key or space bar.

TABLE III

| SEQUENCE OF KEYS | "1" AND COMMAND ABBREVIATION | PUNCTUATION DESIRED |
|---|---|---|
| 1737 | 1per | period |
| 1266 | 1com | comma |
| 1752 | 1sla | slash mark |
| 1783 | 1que | question mark |
| 1392 | 1exc | exclamation point |
| 1736 | 1sem | semicolon |
| 1265 | 1col | colon |
| 1276 | 1apo | apostrophe |
| 1497 | 1hyp | hyphen |
| 1786 | 1quo | quote sign |
| 1758 | 1plu | plus sign |
| 1768 | 1pou | pound sign, e.g. # |
| 1365 | 1dol | dollar sign |
| 1728 | 1pct | percent sign |
| 1267 | 1amp | ampersand |
| 1285 | 1bul | bullet |
| 1673 | 1ope | open parenthesis |
| 1256 | 1clo | close parenthesis |
| 1378 | 1equ | equal sign |
| 1772 | 1spa | spacebar |
| 1546 | 1lin | line feed |
| 1738 | 1car | carriage return |
| 1822 | 1tab | tab |
| 1222 | 1bac | backspace |

TABLE IV

| NUMBER OF KEY | "1" AND COMMAND ABBREVIATION | COMMAND DESIRED |
|---|---|---|
| 1372 | 1era | erase-backspace (erases previous word) |
| 1686 | 1num | number (prompts: "input number") |
| 1533 | 1kee | keep file (prompts: "input keep file name") |
| 1346 | 1fin | find file (prompts: "input find-file name") |
| 1639 | 1new | new paragraph |
| 1234 | 1beg | begin again (erases screen) |
| 1363 | 1end | end (prompts: "return to operating system?") |
| 1233 | 1add | add new word (prompts: "first letter" then "Intend A?" "Intend B?"; "second letter" "Intend J?" "Intend K?" etc.) |

A person using the TKSA system is first prompted to input a word. Upon receiving the keyed digits, the program first checks the word to see if the word begins with the number 1, indicating punctuation or a special command. Next, the program uses an efficient sorting routine to select the subset of the main data base that will contain the word corresponding to the keyed digits. If the word was not found in the main data base, as in the case of words with matching digits, then a sorting routine is used to select the subset of the matching words data base that would contain the word corresponding to the input digits and the correct word is identified through Boolean exclusion.

In an alternate arrangement, the user could key in a series of words and assist the computer in verifying each correct word through the process of Boolean exclusion at a later point in time.

For example, if a person using the TKSA system wishes to write the statement "I have gone home" The following keys are input into the TKSA system: 4-0-4-2-8-3-0-4-6-6-3-0-4-6-6-3-0. Having receive the digits keyed by the user, the computer searches the data base and returns the corresponding entries, "I have gone home".

The foregoing exemplative text is especially interesting in that it contains two words which have identical TKSA numerical expressions. That is "gone" and "home" are both represented by "4663" in the TKSA system and therefore, cannot be distinguished from each other by the computer. The computer will proceed to print the text, printing all words that have a unique TKSA number. For example, the computer will print "I" in that the "4" key represents the letters "G, H and I" and since "I" is the only one letter word represented by the "4" key, the computer will print "I". When the computer reaches the word which is represented by the digits "4663", the computer eliminates incorrect entries by Boolean exclusion. For instance, the computer will ask: "Is GONE the word you intended? "Y" or "N". Is HOME the word you intended? "Y" or "N". Is HONE the word you intended? "Y" or "N"". Once the correct word is selected, the program proceeds with the next word. Since the next word is represented by the digits "4663", the program will proceed in a similar manner as it had done for the word "gone". The program next responds with a period for the punctuation command 1per.

The above example contained two words which have an identical digital index in the TKSA system. The TKSA system is especially useful in that relatively few words having a length of six letters or longer have a TKSA digital index identical with that of another word in the data base. One reason for this, is that each vowel (a, e, i, o, u) is represented by a unique key on the TOUCH-TONE telepone key pad.

PORTABLE WORDPROCESSOR

Figure 3:
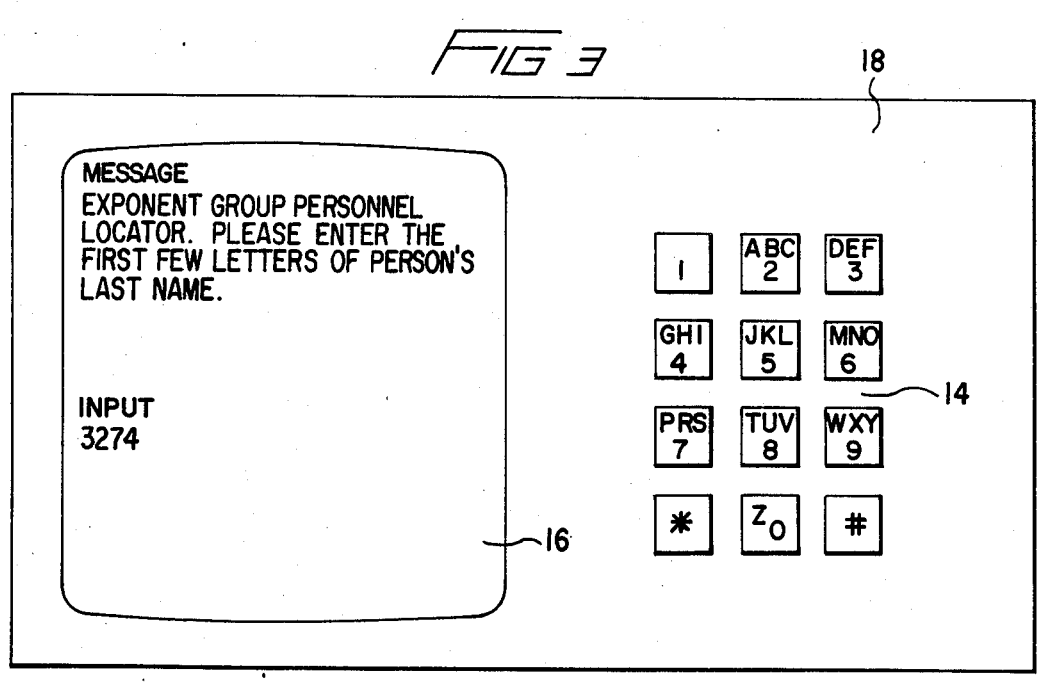
FIG. 3 is a side elevational view of a mini word processor according to the invention.

Referring to FIG. 3 in particular, there is shown a compact portable data transmission and access device generally designated A. This device comprises a telephone type key pad 14 adjacent a display screen 16. Within a housing 18 there is a central processing unit, an appropriate data base, and list processing software which provide the function of computer 8 and data base 7 discussed in the embodiments above.

A person using the portable key pad may input information using the key pad 14 by depressing appropriate keys. The display screen 16 displays the keyed information in words produced by the computer. In the case of a TKSA digital string which represents more than one word, the display screen will display all words corresponding to the digital string, and eliminates incorrect words by Boolean exclusion. In this way, the person using the portable key pad can key words or the like without the use of a large typewriter type key pad.

In addition, a modem type telephone hook-up (not shown) may be provided on housing side 24. In this manner, a person may input data into the portable TKSA device, read the information input to be certain that there are no mistakes and that the correct word appears for every entry, and then the person may transmit the data to a central computer at a different location. The portable device can also use a standard cable hook-up 22, located on housing side 24, to transmit information to, and receive information from, another computer.

The portable key pad 14 is especially useful for handicapped persons. For example, a deaf person could communicate at any telephone by an interactive system wherein key pad 14 is additionally provided with TOUCH-TONE decoder 26. With this construction, a telephone may be coupled to a telephone jack 23 and TOUCH-TONE decoder 26. A user at a distant location may engage in a dialog with a deaf person using the key pad 14 and an electronic speech synthesis device (not shown).

The key pad 14 utilizing the TKSA system along with a processing unit may also be useful for persons who are blind in that less keys are involved, and also for persons who have difficulty controlling their hands or the like. Additionally, in the case of the blind, a braille printer means may be provided with the key pad unit 14.

Appendices A through E form a part of this disclosure. Appendix A is a demonstration program of a telephone spelling system and associated algorithm. Appendix B is a demonstration program of a telephone directory system and associated algorithm. Appendix C is sample data base for the demonstration program of a telephone directory system. Appendix D is a sample data base for the demonstration program of the telephone spelling system. Appendix E is another sample data base using the spanish language for the demonstration program of the telephone spelling system.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

```
1:  ; File: TEXTER.LIB
2: *
3:  (PUTD 'DEFUN '(NLAMBDA (NAM$ EXP$) (PUTD NAM$ EXP$) NAM$))
4:
5:  (DEFUN SETQQ (NLAMBDA (NAM$ EXP$)
6:     (SET NAM$ EXP$)
7:     NAM$ ))
8:
9:
10: (DEFUN CLRSCRN (LAMBDA NIL
11:    (HOME)
12:    (PRIN1 ESC)
13:    (PRIN1 '"[2J")
```

```
14:     (ASCII 32) ))
15:
16: (DEFUN LIFTOFF (LAMBDA NIL
17:     ((EQ COUNTER 'A)
18:      (SETQ COUNTER 'B)
19:      (PHONE-PICTURE7) )
20:     ((EQ COUNTER 'B)
21:      (SETQ COUNTER 'A)
22:      (PHONE-PICTURE8) ) ))
23:
24: (DEFUN PHONE-PICTURE8 (LAMBDA NIL

25:     (CLRSCRN)
26:     (PRIN1 (ASCII 32))
27:     (PRIN1 (ASCII 32))
28:     (PRIN1 (ASCII 32))
29:     (PRIN1 SMILEYS)
30:     (PRIN1 SMILEYS)
31:     (PRIN1 SMILEYS)
32:     (PRIN1 SMILEYS)
33:     (PRIN1 SMILEYS)
34:     (PRIN1 SMILEYS)
35:     (PRIN1 (ASCII 2))
36:     (PRIN1 (ASCII 2))
37:     (PRIN1 (ASCII 2))
38:     (PRIN1 (ASCII 2))
39:     (PRIN1 (ASCII 2))
40:     (PRINT (ASCII 2))
41:     (PRIN1 (ASCII 32))
42:     (PRIN1 (ASCII 32))
43:     (PRIN1 (ASCII 32))
44:     (PRIN1 (ASCII 2))
45:     (PRIN1 (ASCII 32))
46:     (PRIN1 '1)
47:     (PRIN1 (ASCII 32))
48:     (PRIN1 (ASCII 2))
49:     (PRIN1 (ASCII 32))
50:     (PRIN1 'ABC-2)
51:     (PRIN1 (ASCII 32))
52:     (PRIN1 (ASCII 2))
53:     (PRIN1 (ASCII 32))
54:     (PRIN1 'DEF-3)
55:     (PRIN1 (ASCII 32))
56:     (PRIN1 (ASCII 2))
57:     (PRIN1 (ASCII 32))
58:     (PRIN1 'GHI-4)
59:     (PRIN1 (ASCII 32))
60:     (PRIN1 (ASCII 2))
61:     (PRIN1 (ASCII 32))
62:     (PRIN1 'JKL-5)
63:     (PRIN1 (ASCII 32))
64:     (PRIN1 (ASCII 2))
65:     (PRIN1 (ASCII 32))
66:     (PRIN1 'MNO-6)
67:     (PRIN1 (ASCII 32))
68:     (PRIN1 (ASCII 2))
69:     (PRIN1 (ASCII 32))
70:     (PRIN1 'TUV-8)
71:     (PRIN1 (ASCII 32))
72:     (PRIN1 (ASCII 2))

73:     (PRIN1 (ASCII 32))
74:     (PRIN1 'WXYZ-9)
75:     (PRIN1 (ASCII 32))
76:     (PRIN1 (ASCII 2))
77:     (PRIN1 (ASCII 32))
78:     (PRIN1 '0)
79:     (PRIN1 (ASCII 32))
80:     (PRINT (ASCII 2))
81:     (PRIN1 (ASCII 32))
```

```
 97:      (PYGMIES) ))
 98:
 99: (DEFUN TREMBER (LAMBDA (OBJ LST)
100:    ((NULL LST) NIL)
101:    ((EQ OBJ (CADAR LST))
102:      (CDR LST) )
103:    (CONS (CAR LST) (TREMBER OBJ (CDR LST))) ))
104:
105: (DEFUN DRUMBER (LAMBDA (OBJ LST)
106:    ((NULL LST) NIL)
107:    ((EQUAL (UNPACK OBJ) (UNPACK (CAAR LST)))
108:      (CDR LST) )
109:    (CONS (CAR LST) (DRUMBER OBJ (CDR LST))) ))
110:
111: (DEFUN SECOND-REALM (LAMBDA NIL
112:    (COND
113:      ((TKSA-MEMBER NEW-ADDITION TWOS)
114:        (COND
115:          ((EQ (CAR (CDR NEW-ADDITION)) (CAR (CDR IGUANAS)))
116:            (LASSO-WORDS) )
117:          ((NOT (EQ (CAR (CDR NEW-ADDITION)) (CAR (CDR IGUANAS))))
118:            (SETQ IGUANAS (APPEND IGUANAS (CDR NEW-ADDITION)))
119:            (SETQ MATCHED-TWOS (APPEND MATCHED-TWOS (LIST IGUANAS)))
120:            (SETQ TWOS (DRUMBER (CAR NEW-ADDITION) TWOS))
121:            (LASSO-WORDS) ) ) )
122:      ((NOT (TKSA-MEMBER NEW-ADDITION TWOS))
123:        (SETQ TWOS (APPEND TWOS (LIST NEW-ADDITION)))
124:        (LASSO-WORDS) )
125:      (T 'SECOND-REALM-ERROR) ) ))
126:
127: (DEFUN THIRD-REALM (LAMBDA NIL
128:    (COND
129:      ((TKSA-MEMBER NEW-ADDITION THREES)
130:        (COND
131:          ((EQ (CAR (CDR NEW-ADDITION)) (CAR (CDR IGUANAS)))
132:            (LASSO-WORDS) )
133:          ((NOT (EQ (CAR (CDR NEW-ADDITION)) (CAR (CDR IGUANAS))))
134:            (SETQ IGUANAS (APPEND IGUANAS (CDR NEW-ADDITION)))
135:            (SETQ MATCHED-THREES (APPEND MATCHED-THREES (LIST IGUANA
136:            (SETQ THREES (DRUMBER (CAR NEW-ADDITION) THREES))
137:            (LASSO-WORDS) ) ) )
138:      ((NOT (TKSA-MEMBER NEW-ADDITION THREES))
139:        (SETQ THREES (APPEND THREES (LIST NEW-ADDITION)))
140:        (LASSO-WORDS) )
141:      (T 'THIRD-REALM-ERROR) ) ))
142:
143: (DEFUN FOURTH-REALM (LAMBDA NIL
144:    (COND
145:      ((TKSA-MEMBER NEW-ADDITION FOURS)
146:        (COND
147:          ((EQ (CAR (CDR NEW-ADDITION)) (CAR (CDR IGUANAS)))
148:            (LASSO-WORDS) )
149:          ((NOT (EQ (CAR (CDR NEW-ADDITION)) (CAR (CDR IGUANAS))))
150:            (SETQ IGUANAS (APPEND IGUANAS (CDR NEW-ADDITION)))
151:            (SETQ MATCHED-FOURS (APPEND MATCHED-FOURS (LIST IGUANAS)
152:            (SETQ FOURS (DRUMBER (CAR NEW-ADDITION) FOURS))
153:            (LASSO-WORDS) ) ) )
154:      ((NOT (TKSA-MEMBER NEW-ADDITION FOURS))
155:        (SETQ FOURS (APPEND FOURS (LIST NEW-ADDITION)))
156:        (LASSO-WORDS) )
157:      (T 'FOURTH-REALM-ERROR) ) ))
158:
159: (DEFUN FIFTH-REALM (LAMBDA NIL
160:    (COND
161:      ((TKSA-MEMBER NEW-ADDITION FIVES)
162:        (COND
163:          ((EQ (CAR (CDR NEW-ADDITION)) (CAR (CDR IGUANAS)))
164:            (LASSO-WORDS) )
165:          ((NOT (EQ (CAR (CDR NEW-ADDITION)) (CAR (CDR IGUANAS))))
166:            (SETQ IGUANAS (APPEND IGUANAS (CDR NEW-ADDITION)))
```

```
167:              (SETQ MATCHED-FIVES (APPEND MATCHED-FIVES (LIST IGUANAS)
168:              (SETQ FIVES (DRUMBER (CAR NEW-ADDITION) FIVES))

169:              (LASSO-WORDS) ) ) )
170:        ((NOT (TKSA-MEMBER NEW-ADDITION FIVES))
171:           (SETQ FIVES (APPEND FIVES (LIST NEW-ADDITION)))
172:           (LASSO-WORDS) )
173:        (T 'FIFTH-REALM-ERROR) ) ))
174:
175: (DEFUN SIXTH-REALM (LAMBDA NIL
176:     (COND
177:        ((TKSA-MEMBER NEW-ADDITION SIXES)
178:           (COND
179:              ((EQ (CAR (CDR NEW-ADDITION)) (CAR (CDR IGUANAS)))
180:                 (LASSO-WORDS) )
181:              ((NOT (EQ (CAR (CDR NEW-ADDITION)) (CAR (CDR IGUANAS))))
182:                 (SETQ IGUANAS (APPEND IGUANAS (CDR NEW-ADDITION)))
183:                 (SETQ MATCHED-SIXES (APPEND MATCHED-SIXES (LIST IGUANAS))
184:                 (SETQ SIXES (DRUMBER (CAR NEW-ADDITION) SIXES))
185:                 (LASSO-WORDS) ) ) )
186:        ((NOT (TKSA-MEMBER NEW-ADDITION SIXES))
187:           (SETQ SIXES (APPEND SIXES (LIST NEW-ADDITION)))
188:           (LASSO-WORDS) )
189:        (T 'SIXTH-REALM-ERROR) ) ))
190:
191: (DEFUN SEVENTH-REALM (LAMBDA NIL
192:     (COND
193:        ((TKSA-MEMBER NEW-ADDITION SEVENS)
194:           (COND
195:              ((EQ (CAR (CDR NEW-ADDITION)) (CAR (CDR IGUANAS)))
196:                 (LASSO-WORDS) )
197:              ((NOT (EQ (CAR (CDR NEW-ADDITION)) (CAR (CDR IGUANAS))))
198:                 (SETQ IGUANAS (APPEND IGUANAS (CDR NEW-ADDITION)))
199:                 (SETQ MATCHED-SEVENS (APPEND MATCHED-SEVENS (LIST IGUANAS)))
200:                 (SETQ SEVENS (DRUMBER (CAR NEW-ADDITION) SEVENS))
201:                 (LASSO-WORDS) ) ) )
202:        ((NOT (TKSA-MEMBER NEW-ADDITION SEVENS))
203:           (SETQ SEVENS (APPEND SEVENS (LIST NEW-ADDITION)))
204:           (LASSO-WORDS) )
205:        (T 'SEVENTH-REALM-ERROR) ) ))
206:
207: (DEFUN EIGHTH-REALM (LAMBDA NIL
208:     (COND
209:        ((TKSA-MEMBER NEW-ADDITION EIGHTS)
210:           (COND
211:              ((EQ (CAR (CDR NEW-ADDITION)) (CAR (CDR IGUANAS)))
212:                 (LASSO-WORDS) )
213:              ((NOT (EQ (CAR (CDR NEW-ADDITION)) (CAR (CDR IGUANAS))))
214:                 (SETQ IGUANAS (APPEND IGUANAS (CDR NEW-ADDITION)))
215:                 (SETQ MATCHED-EIGHTS (APPEND MATCHED-EIGHTS (LIST IGUANAS)))
216:                 (SETQ EIGHTS (DRUMBER (CAR NEW-ADDITION) EIGHTS))

217:*                (LASSO-WORDS) ) ) )
218:        ((NOT (TKSA-MEMBER NEW-ADDITION EIGHTS))
219:           (SETQ EIGHTS (APPEND EIGHTS (LIST NEW-ADDITION)))
220:           (LASSO-WORDS) )
221:        (T 'EIGHTH-REALM-ERROR) ) ))
222:
223: (DEFUN NINTH-REALM (LAMBDA NIL
224:     (COND
225:        ((TKSA-MEMBER NEW-ADDITION NINES)
226:           (COND
227:              ((EQ (CAR (CDR NEW-ADDITION)) (CAR (CDR IGUANAS)))
228:                 (LASSO-WORDS) )
229:              ((NOT (EQ (CAR (CDR NEW-ADDITION)) (CAR (CDR IGUANAS))))
230:                 (SETQ IGUANAS (APPEND IGUANAS (CDR NEW-ADDITION)))
231:                 (SETQ MATCHED-NINES (APPEND MATCHED-NINES (LIST IGUANAS)))
232:                 (SETQ NINES (DRUMBER (CAR NEW-ADDITION) NINES))
233:                 (LASSO-WORDS) ) ) )
234:        ((NOT (TKSA-MEMBER NEW-ADDITION NINES))
```

```
235:        (SETQ NINES (APPEND NINES (LIST NEW-ADDITION)))
236:         (LASSO-WORDS) )
237:      (T 'NINTH-REALM-ERROR) ) ))
238:
239: (DEFUN MULTIPLE-CHECK-TWOS (LAMBDA NIL
240:   ((MEMBER WORD IGUANAS)
241:      (LASSO-WORDS) )
242:   ((NOT (MEMBER WORD IGUANAS))
243:      (SETQ IGUANAS (APPEND IGUANAS (LIST WORD)))
244:      (SETQ MATCHED-TWOS (APPEND MATCHED-TWOS (LIST IGUANAS)))
245:      (SETQ MATCHED-TWOS (DRUMBER (CAR NEW-ADDITION) MATCHED-TWOS))
246:      (LASSO-WORDS) )
247:   (T 'ERROR-IN-MULTIPLE-CHECK-TWOS) ))
248:
249: (DEFUN MULTIPLE-CHECK-THREES (LAMBDA NIL
250:   ((MEMBER WORD IGUANAS)
251:      (LASSO-WORDS) )
252:   ((NOT (MEMBER WORD IGUANAS))
253:      (SETQ IGUANAS (APPEND IGUANAS (LIST WORD)))
254:      (SETQ MATCHED-THREES (APPEND MATCHED-THREES (LIST IGUANAS)))
255:      (SETQ MATCHED-THREES (DRUMBER (CAR NEW-ADDITION) MATCHED-THREES))
256:      (LASSO-WORDS) )
257:   (T 'ERROR-IN-MULTIPLE-CHECK-THREES) ))
258:
259: (DEFUN MULTIPLE-CHECK-FOURS (LAMBDA NIL
260:   ((MEMBER WORD IGUANAS)
261:      (LASSO-WORDS) )
262:   ((NOT (MEMBER WORD IGUANAS))
263:      (SETQ IGUANAS (APPEND IGUANAS (LIST WORD)))
264:      (SETQ MATCHED-FOURS (APPEND MATCHED-FOURS (LIST IGUANAS)))

265:      (SETQ MATCHED-FOURS (DRUMBER (CAR NEW-ADDITION) MATCHED-FOURS))
266:      (LASSO-WORDS) )
267:   (T 'ERROR-IN-MULTIPLE-CHECK-FOURS) ))
268:
269: (DEFUN MULTIPLE-CHECK-FIVES (LAMBDA NIL
270:   ((MEMBER WORD IGUANAS)
271:      (LASSO-WORDS) )
272:   ((NOT (MEMBER WORD IGUANAS))
273:      (SETQ IGUANAS (APPEND IGUANAS (LIST WORD)))
274:      (SETQ MATCHED-FIVES (APPEND MATCHED-FIVES (LIST IGUANAS)))
275:      (SETQ MATCHED-FIVES (DRUMBER (CAR NEW-ADDITION) MATCHED-FIVES))
276:      (LASSO-WORDS) )
277:   (T 'ERROR-IN-MULTIPLE-CHECK-FIVES) ))
278:
279: (DEFUN MULTIPLE-CHECK-SIXES (LAMBDA NIL
280:   ((MEMBER WORD IGUANAS)
281:      (LASSO-WORDS) )
282:   ((NOT (MEMBER WORD IGUANAS))
283:      (SETQ IGUANAS (APPEND IGUANAS (LIST WORD)))
284:      (SETQ MATCHED-SIXES (APPEND MATCHED-SIXES (LIST IGUANAS)))
285:      (SETQ MATCHED-SIXES (DRUMBER (CAR NEW-ADDITION) MATCHED-SIXES))
286:      (LASSO-WORDS) )
287:   (T 'ERROR-IN-MULTIPLE-CHECK-SIXES) ))
288:
289: (DEFUN MULTIPLE-CHECK-SEVENS (LAMBDA NIL
290:   ((MEMBER WORD IGUANAS)
291:      (LASSO-WORDS) )
292:   ((NOT (MEMBER WORD IGUANAS))
293:      (SETQ IGUANAS (APPEND IGUANAS (LIST WORD)))
294:      (SETQ MATCHED-SEVENS (APPEND MATCHED-SEVENS (LIST IGUANAS)))
295:      (SETQ MATCHED-SEVENS (DRUMBER (CAR NEW-ADDITION) MATCHED-SEVENS))
296:      (LASSO-WORDS) )
297:   (T 'ERROR-IN-MULTIPLE-CHECK-SEVENS) ))
298:
299: (DEFUN MULTIPLE-CHECK-EIGHTS (LAMBDA NIL
300:   ((MEMBER WORD IGUANAS)
301:      (LASSO-WORDS) )
302:   ((NOT (MEMBER WORD IGUANAS))
303:      (SETQ IGUANAS (APPEND IGUANAS (LIST WORD)))
```

```
304:       (SETQ MATCHED-EIGHTS (APPEND MATCHED-EIGHTS (LIST IGUANAS)))
305:       (SETQ MATCHED-EIGHTS (DRUMBER (CAR NEW-ADDITION) MATCHED-EIGHTS))
306:       (LASSO-WORDS) )
307:     (T 'ERROR-IN-MULTIPLE-CHECK-EIGHTS) ))
308:
309: (DEFUN MULTIPLE-CHECK-NINES (LAMBDA NIL
310:     ((MEMBER WORD IGUANAS)
311:       (LASSO-WORDS) )
312:     ((NOT (MEMBER WORD IGUANAS))

313:       (SETQ IGUANAS (APPEND IGUANAS (LIST WORD)))
314:       (SETQ MATCHED-NINES (APPEND MATCHED-NINES (LIST IGUANAS)))
315:       (SETQ MATCHED-NINES (DRUMBER (CAR NEW-ADDITION) MATCHED-NINES))
316:       (LASSO-WORDS) )
317:     (T 'ERROR-IN-MULTIPLE-CHECK-NINES) ))
318:
319: (DEFUN PRINT-THIS (LAMBDA (LST)
320:     ((NULL LST)
321:       (PRINT (ASCII 32)) )
322:     (PRIN1 (CAR LST))
323:     ((NOT (EQ (ASCII 8) (CAR LST)))
324:       (PRIN1 (ASCII 32))
325:       (PRINT-THIS (CDR LST)) )
326:     ((EQ (ASCII 8) (CAR LST))
327:       (PRINT-THIS (CDR LST)) ) ))
328:
329: (DEFUN EXCLAMATION (LAMBDA NIL
330:     (PRIN1 (ASCII 8))
331:     (PRIN1 (ASCII 33))
332:     (PRIN1 (ASCII 32))
333:     (PRIN1 (ASCII 32)) ))
334:
335: (DEFUN DOUBLE-QUOTE-MARK (LAMBDA NIL
336:     (PRIN1 (ASCII 8))
337:     (PRIN1 (ASCII 34))
338:     (PRIN1 (ASCII 32))
339:     (PRIN1 (ASCII 32)) ))
340:
341: (DEFUN NUMBER-SYMBOL (LAMBDA NIL
342:     (PRIN1 (ASCII 8))
343:     (PRIN1 (ASCII 35))
344:     (PRIN1 (ASCII 32))
345:     (PRIN1 (ASCII 32)) ))
346:
347: (DEFUN SEMICOLON (LAMBDA NIL
348:     (SETQ WORD (LIST (ASCII 8) (ASCII 59)))
349:     (LASSO-WORDS) ))
350:
351: (DEFUN QUESTION-MARK (LAMBDA NIL
352:     (PRIN1 (ASCII 8))
353:     (PRIN1 (ASCII 63))
354:     (PRIN1 (ASCII 32))
355:     (PRIN1 (ASCII 32)) ))
356:
357: (DEFUN PERIOD (LAMBDA NIL
358:     (SETQ WORD (LIST (ASCII 8) (ASCII 46) (ASCII 32)))
359:     (LASSO-WORDS) ))
360:

361: (DEFUN COMMA (LAMBDA NIL
362:     (SETQ WORD (LIST (ASCII 8) (ASCII 44)))
363:     (LASSO-WORDS) ))
364:
365: (DEFUN QUESTIONMARK (LAMBDA NIL
366:     (SETQ WORD (LIST (ASCII 8) (ASCII 63) (ASCII 32)))
367:     (LASSO-WORDS) ))
368:
369: (DEFUN COLON (LAMBDA NIL
370:     (SETQ WORD (LIST (ASCII 8) (ASCII 58)))
```

```
371:    (LASSO-WORDS) ))
372:
373: (DEFUN EXCLAMATIONPOINT (LAMBDA NIL
374:    (SETQ WORD (LIST (ASCII 8) (ASCII 33) (ASCII 32)))
375:    (LASSO-WORDS) ))
376:
377: (DEFUN APOSTROPHE (LAMBDA NIL
378:    (SETQ WORD (LIST (ASCII 8) (ASCII 39) (ASCII 8)))
379:    (LASSO-WORDS) ))
380:
381: (DEFUN QUOTESIGN (LAMBDA NIL
382:    (SETQ WORD (LIST (ASCII 34) (ASCII 8)))
383:    (LASSO-WORDS) ))
384:

385: (DEFUN PLUSSIGN (LAMBDA NIL
386:    (SETQ WORD (ASCII 43))
387:    (LASSO-WORDS) ))
388:
389: (DEFUN MINUSSIGN (LAMBDA NIL
390:    (SETQ WORD (ASCII 45))
391:    (LASSO-WORDS) ))
392:
393: (DEFUN HYPHEN (LAMBDA NIL
394:    (SETQ WORD (ASCII 45))
395:    (LASSO-WORDS) ))
396:
397: (DEFUN NUMBERSIGN (LAMBDA NIL
398:    (SETQ WORD (ASCII 35))
399:    (LASSO-WORDS) ))
400:
401: (DEFUN DOLLARSIGN (LAMBDA NIL
402:    (SETQ WORD (LIST (ASCII 36) (ASCII 8)))
403:    (LASSO-WORDS) ))
404:
405: (DEFUN PERCENTSIGN (LAMBDA NIL
406:    (SETQ WORD (LIST (ASCII 8) (ASCII 37)))
407:    (LASSO-WORDS) ))
408:

409: (DEFUN AMPERSAND (LAMBDA NIL
410:    (SETQ WORD (ASCII 38))
411:    (LASSO-WORDS) ))
412:
413: (DEFUN PUNCTUATION (LAMBDA NIL
414:    ((EQUAL OPEN-WORD (UNPACK '1737))
415:       (PERIOD) )
416:    ((EQUAL OPEN-WORD (UNPACK '1266))
417:       (COMMA) )
418:    ((EQUAL OPEN-WORD (UNPACK '1752))
419:       (SLASHMARK) )
420:    ((EQUAL OPEN-WORD (UNPACK '1783))
421:       (QUESTIONMARK) )
422:    ((EQUAL OPEN-WORD (UNPACK '1392))
423:       (EXCLAMATIONPOINT) )
424:    ((EQUAL OPEN-WORD (UNPACK '1736))
425:       (SEMICOLON) )
426:    ((EQUAL OPEN-WORD (UNPACK '1265))
427:       (COLON) )
428:    ((EQUAL OPEN-WORD (UNPACK '1276))
429:       (APOSTROPHE) )
430:    ((EQUAL OPEN-WORD (UNPACK '1487))
431:       (HYPHEN) )
432:    ((EQUAL OPEN-WORD (UNPACK '1786))

433:       (QUOTESIGN) )
434:    ((EQUAL OPEN-WORD (UNPACK '1758))
435:       (PLUSSIGN) )
436:    ((EQUAL OPEN-WORD (UNPACK '1768))
437:       (POUNDSIGN) )
```

```
438:    ((EQUAL OPEN-WORD (UNPACK '1365))
439:        (DOLLARSIGN) )
440:    ((EQUAL OPEN-WORD (UNPACK '1737))
441:        (PERCENTSIGN) )
442:    ((EQUAL OPEN-WORD (UNPACK '1267))
443:        (AMPERSAND) )
444:    ((EQUAL OPEN-WORD (UNPACK '1285))
445:        (BULLETSIGN) )
446:    ((EQUAL OPEN-WORD (UNPACK '1673))
447:        (OPENPAREN) )
448:    ((EQUAL OPEN-WORD (UNPACK '1256))
449:        (CLOSEPAREN) )
450:    ((EQUAL OPEN-WORD (UNPACK '1378))
451:        (EQUALSIGN) )
452:    ((EQUAL OPEN-WORD (UNPACK '1772))
453:        (SPACEBAR) )
454:    ((EQUAL OPEN-WORD (UNPACK '1546))
455:        (LINEFEED) )
456:    ((EQUAL OPEN-WORD (UNPACK '1738))

457:        (CR) )
458:    ((EQUAL OPEN-WORD (UNPACK '1822))
459:        (TAB) )
460:    ((EQUAL OPEN-WORD (UNPACK '1222))
461:        (LEFT) )
462:    ((EQUAL OPEN-WORD (UNPACK '1686))
463:        (NUMBER) )
464:    ((EQUAL OPEN-WORD (UNPACK '1786))
465:        (STOREWORK) )
466:    ((EQUAL OPEN-WORD (UNPACK '1346))
467:        (FINDWORK) )
468:    ((EQUAL OPEN-WORD (UNPACK '1639))
469:        (NEWPARAGRAPH) )
470:    ((EQUAL OPEN-WORD (UNPACK '1497))
471:        (HYPHEN) )
472:    (TKSA-NUMERALS) ))
473:
474: (DEFUN BULLETSIGN (LAMBDA NIL
475:    (SETQ WORD (ASCII 249))
476:    (LASSO-WORDS) ))
477:
478: (DEFUN ENDPARAGRAPH (LAMBDA NIL
479:    (SETQ WORD (TERPRI))
480:    (LASSO-WORDS) ))
481:
482: (DEFUN PYGMIES (LAMBDA NIL
483:    (PRINT-THIS PYGMIES)
484:    (PRIN1 BAR)
485:    (PRIN1 (ASCII 32))
486:    (PRIN1 BAR)
487:    (PRIN1 (ASCII 32))
488:    (PRIN1 BAR)
489:    (PRIN1 (ASCII 32))
490:    (PRIN1 BAR)
491:    (PRIN1 (ASCII 32))
492:    (PRIN1 BAR)
493:    (PRIN1 (ASCII 32))
494:    (PRIN1 BAR)
495:    (PRIN1 (ASCII 32))
496:    (PRIN1 BAR)
497:    (PRIN1 (ASCII 32))
498:    (PRIN1 BAR)
499:    (PRIN1 (ASCII 32))
500:    (PRIN1 BAR)
501:    (PRIN1 (ASCII 32))
502:    (PRIN1 BAR)
503:    (PRIN1 (ASCII 32))
504:    (PRIN1 BAR)
```

```
505:    (PRIN1 (ASCII 32))
506:    (PRINT BAR)
507:    (TERPRI)
508:    (INPUT-WORD) ))
509:
510: (DEFUN OPENPAREN (LAMBDA NIL
511:    (SETQ WORD (LIST (ASCII 40) (ASCII 8)))
512:    (LASSO-WORDS) ))
513:
514: (DEFUN CLOSEPAREN (LAMBDA NIL
515:    (SETQ WORD (LIST (ASCII 8) (ASCII 41)))
516:    (LASSO-WORDS) ))
517:
518: (DEFUN EQUALSIGN (LAMBDA NIL
519:    (SETQ WORD (ASCII 61))
520:    (LASSO-WORDS) ))
521:
522: (DEFUN SPACEBAR (LAMBDA NIL
523:    (SETQ WORD (ASCII 32))
524:    (LASSO-WORDS) ))
525:
526: (DEFUN INPUT-WORD (LAMBDA (RDS)
527:    (PRINT "Input word:")
528:    (TERPRI)
529:    (SETQ OPEN-WORD (UNPACK (RATOM)))
530:    (cond
531:      ((MEMBER (CAR OPEN-WORD) '(a b c d e f g h i j k l m n o p q r s t u v w
532:         x y z))
533:        (PRINT (LIST 'PLEASE 'USE 'CAPS))
534:        (INPUT-WORD) )
535:      ((MEMBER (CAR OPEN-WORD) (UNPACK '123456789))
536:        (PUNCTUATION) )
537:      ((MEMBER (CAR OPEN-WORD) '(A B C D E F G H I J K L M N O P Q R S T U V W
538:         X Y Z))
539:        (END-CHECK) )
540:      (T (PRINT (LIST 'PLEASE 'TRY 'AGAIN)) (INPUT-WORD)) ) ))
541:
542: (DEFUN CR (LAMBDA NIL
543:    (SETQ WORD (ASCII 13))
544:    (LASSO-WORDS) ))
545:
546: (DEFUN LINEFEED (LAMBDA NIL
547:    (SETQ WORD (ASCII 10))
548:    (LASSO-WORDS) ))
549:
550: (DEFUN TAB (LAMBDA NIL
551:    (SETQ WORD (LIST (ASCII 32) (ASCII 32) (ASCII 32)))
552:    (LASSO-WORDS) ))

553:
554: (DEFUN NUMBER (LAMBDA (RDS)
555:    (PRINT-THIS '(INPUT NUMBER))
556:    (SETQ WORD (RATOM))
557:    (LASSO-WORDS) ))
558:
559:
560: (DEFUN LASSO-WORDS (LAMBDA NIL
561:    ((NOT (ATOM WORD))
562:      (SETQ PYGMIES (APPEND PYGMIES WORD))
563:      (LIFTOFF) )
564:    ((ATOM WORD)
565:      (SETQ PYGMIES (APPEND PYGMIES (LIST WORD)))
566:      (LIFTOFF) ) ))
567:
568: *(DEFUN BACKSPACE (LAMBDA (NUM)
569:    ((ZEROP NUM))
570:    (LOOP
```

```
571:      (PRIN1 BS)
572:     ((OR
573:        (NOT (NUMBERP NUM))
574:        (EQ NUM 1) ))
575:     (SETQ NUM (SUB1 NUM)) ) ))
576:

577: (DEFUN DEFUN (NLAMBDA EXP$
578:    ((OR
579:       (ATOM EXP$)
580:       (ATOM (CDR EXP$))
581:       (NOT (ATOM (CAR EXP$))) ) NIL)
582:    ( ((NAME (CADR EXP$))
583:       ((OR
584:          (EQ (CADR EXP$) 'LAMBDA)
585:          (EQ (CADR EXP$) 'NLAMBDA) ))
586:       (SETQ EXP$ (CONS (CAR EXP$) (CONS 'LAMBDA (CDR EXP$)))) )
587:     ((OR
588:        (NUMBERP (CADR EXP$))
589:        (EQ (CAADR EXP$) 'LAMBDA)
590:        (EQ (CAADR EXP$) 'NLAMBDA) )
591:      (SETQ EXP$ (CONS (CAR EXP$) (CADR EXP$))) )
592:     (SETQ EXP$ (CONS (CAR EXP$) (CONS 'LAMBDA (CDR EXP$)))) )
593:    ((EQUAL (GETD (CAR EXP$)) (CDR EXP$)))
594:    (PUTD (CAR EXP$) (CDR EXP$))
595:    (CAR EXP$) ))
596:
597: *
598: (DEFUN LEFT (LAMBDA NIL
599:    (SETQ WORD (ASCII 8))
600:    (LASSO-WORDS) ))

601:
602:
603: (DEFUN DELETE-BACKSPACE (LAMBDA NIL
604:    (SETQ PYGMIES (REMBER (CAR (LAST PYGMIES)) PYGMIES))
605:    (LIFTOFF) ))
606:
607: (DEFUN REMBER (LAMBDA (OBJ LST)
608:    ((NULL LST) NIL)
609:    ((EQUAL OBJ (CAR LST))
610:       (CDR LST) )
611:    (CONS (CAR LST) (REMBER OBJ (CDR LST))) ))
612:
613: (DEFUN TAB (LAMBDA NIL
614:    (SETQ WORD (LIST (ASCII 32) (ASCII 32) (ASCII 32)))
615:    (LASSO-WORDS) ))
616:
617: (DEFUN PERIOD (LAMBDA NIL
618:    (SETQ WORD (LIST (ASCII 8) (ASCII 46) (ASCII 32)))
619:    (LASSO-WORDS) ))
620:
621: (DEFUN STORE-WORK (LAMBDA NIL
622:    ((EQ FLAG 'A)
623:       (SETQ SAVEONE PYGMIES)
624:       (SETQ FLAG 'B)
625:       (BEGIN-AGAIN) )
626:    ((EQ FLAG 'B)
627:       (SETQ SAVETWO PYGMIES)
628:       (SETQ FLAG 'C)
629:       (BEGIN-AGAIN) )
630:    ((EQ FLAG 'C)
631:       (SETQ SAVETHREE PYGMIES)
632:       (SETQ FLAG 'D)
633:       (BEGIN-AGAIN) )
634:    ((EQ FLAG 'D)
635:       (SETQ SAVEFOUR PYGMIES)
636:       (SETQ FLAG 'E)
637:       (BEGIN-AGAIN) )
```

```
638:    ((EQ FLAG 'E)
639:       (SETQ SAVEFIVE PYGMIES)
640:       (SETQ FLAG 'F)
641:       (BEGIN-AGAIN) )
642:    ((EQ FLAG 'F)
643:       (SETQ SAVESIX PYGMIES)
644:       (SETQ FLAG 'G)
645:       (BEGIN-AGAIN) )
646:    ((EQ FLAG 'G)
647:       (SETQ SAVESEVEN PYGMIES)
648:       (SETQ FLAG 'H)

649:       (BEGIN-AGAIN) )
650:    ((EQ FLAG 'H)
651:       (SETQ SAVEEIGHT PYGMIES)
652:       (SETQ FLAG 'I)
653:       (BEGIN-AGAIN) )
654:    ((EQ FLAG 'I)
655:       (SETQ SAVENINE PYGMIES)
656:       (SETQ FLAG 'J)
657:       (BEGIN-AGAIN) )
658:    ((EQ FLAG 'J)
659:       (SETQ SAVETEN PYGMIES)
660:       (SETQ FLAG 'A)
661:       (PRIN1 'NO-MORE-ROOM-TO-SAVE-WORK) ) ))
662:
663:
664: (DEFUN BEGIN-AGAIN (LAMBDA NIL
665:    (SETQ PYGMIES NIL)
666:    (LASSO-WORDS) ))
667:
668: (DEFUN PRINT-THIS (LAMBDA (LST)
669:    ((NULL LST)
670:       (PRINT (ASCII 32)) )
671:    (PRIN1 (CAR LST))
672:    ((NOT (EQ (ASCII 8) (CAR LST)))
673:       (PRIN1 (ASCII 32))
674:       (PRINT-THIS (CDR LST)) )
675:    ((EQ (ASCII 8) (CAR LST))
676:       (PRINT-THIS (CDR LST)) ) ))
677:
678: (DEFUN TENNIS-PYGMIES (LAMBDA (RDS)
679:    (CLRSCRN)
680:    (ASCII 32)
681:    (ASCII 32)
682:    (PRINT BLOCK-1)
683:    (ASCII 32)
684:    (ASCII 32)
685:    (PRINT BLOCK-2)
686:    (ASCII 32)
687:    (ASCII 32)
688:    (PRINT BLOCK-3)
689:    (PRINT-THIS PYGMIES)
690:    (PRIN1 BAR)
691:    (PRIN1 (ASCII 32))
692:    (PRIN1 BAR)
693:    (PRIN1 (ASCII 32))
694:    (PRIN1 BAR)
695:    (PRIN1 (ASCII 32))
696:    (PRIN1 BAR)

697:    (PRIN1 (ASCII 32))
698:    (PRIN1 BAR)
699:    (PRIN1 (ASCII 32))
700:    (PRIN1 BAR)
701:    (PRIN1 (ASCII 32))
702:    (PRIN1 BAR)
703:    (PRIN1 (ASCII 32))
```

```
704:     (PRIN1 BAR)
705:     (PRIN1 (ASCII 32))
706:     (PRIN1 BAR)
707:     (PRIN1 (ASCII 32))
708:     (PRINT BAR)
709:     (TERPRI)
710:     (PRINT (LIST 'IS RACKET 'THE 'WORD 'YOU 'INTENDED? 'Y/N))
711:     (SETQ QUERY (RATOM))
712:     (COND
713:        ((EQUAL QUERY 1)
714:           (SETQ WORD RACKET)
715:           (LASSO-WORDS) )
716:        ((EQUAL QUERY 0)
717:           (TENNIS-COURT) )
718:        (T 'ERROR-IN-TENNIS-PYGMIES) ) ))
719:
720: (DEFUN CHECKLIST (LAMBDA (NUM LST)
721:     ((NULL LST)
722:        (CHECK-MATCHES NUM LST) )
723:     ((EQUAL NUM (UNPACK (CAAR LST)))
724:        (SETQ WORD (CAR (CDR (CAR LST))))
725:        (LASSO-WORDS) )
726:     (CHECKLIST NUM (CDR LST)) ))
727:
728: (DEFUN FIND-WORK (LAMBDA (RDS)
729:     (PRINT-THIS '(READ WHICH ONE?))
730:     (SETQ CHOICE (RATOM))
731:     (STOREWORK PYGMIES)
732:     ((EQ CHOICE 'ONE)
733:        (SETQ PYGMIES SAVEONE)
734:        (LIFTOFF) )
735:     ((EQ CHOICE 'TWO)
736:        (SETQ PYGMIES SAVETWO)
737:        (LIFTOFF) )
738:     ((EQ CHOICE 'THREE)
739:        (SETQ PYGMIES SAVETHREE)
740:        (LIFTOFF) )
741:     ((EQ CHOICE 'FOUR)
742:        (SET PYGMIES SAVEFOUR)
743:        (LIFTOFF) )
744:     ((EQ CHOICE 'FIVE)
745:        (SETQ PYGMIES SAVEFIVE)
746:        (LIFTOFF) )
747:     ((EQ CHOICE 'SIX)
748:        (SETQ PYGMIES SAVESIX)
749:        (LIFTOFF) )
750:     ((EQ CHOICE 'SEVEN)
751:        (SETQ PYGMIES SAVESEVEN)
752:        (LIFTOFF) )
753:     ((EQ CHOICE 'EIGHT)
754:        (SETQ PYGMIES SAVEEIGHT)
755:        (LIFTOFF) )
756:     ((EQ CHOICE 'NINE)
757:        (SETQ PYGMIES SAVENINE)
758:        (LIFTOFF) )
759:     ((EQ CHOICE 'TEN)
760:        (SETQ PYGMIES SAVETEN)
761:        (LIFTOFF) )
762:     (PRINT-THIS '(TRY AGAIN - YOUR CHOICES ARE ONE TWO THREE FOUR FIVE SIX
763:           SEVEN EIGHT NINE OR TEN)) ))
764:
765: (DEFUN COMMA (LAMBDA NIL
766:     (SETQ WORD (LIST (ASCII 8) (ASCII 44)))
767:     (LASSO-WORDS) ))
```

```
768:
769: (DEFUN SLASHMARK (LAMBDA NIL
770:    (SETQ WORD (LIST (ASCII 8) (ASCII 47) (ASCII 8)))
771:    (LASSO-WORDS) ))
772:
773: (DEFUN QUESTIONMARK (LAMBDA NIL
774:    (SETQ WORD (LIST (ASCII 8) (ASCII 63) (ASCII 32)))
775:    (LASSO-WORDS) ))
776:
777: (DEFUN EXCLAMATIONPOINT (LAMBDA NIL
778:    (SETQ WORD (LIST (ASCII 8) (ASCII 33) (ASCII 32)))
779:    (LASSO-WORDS) ))
780:
781: (DEFUN APOSTROPHE (LAMBDA NIL
782:    (SETQ WORD (LIST (ASCII 8) (ASCII 39) (ASCII 8)))
783:    (LASSO-WORDS) ))
784:
785: (DEFUN QUOTESIGN (LAMBDA NIL
786:    (SETQ WORD (LIST (ASCII 34) (ASCII 8)))
787:    (LASSO-WORDS) ))
788:
789: (DEFUN POUNDSIGN (LAMBDA NIL
790:    (SETQ WORD (ASCII 35))
791:    (LASSO-WORDS) ))
792:
793: (DEFUN DOLLARSIGN (LAMBDA NIL
794:    (SETQ WORD (LIST (ASCII 36) (ASCII 8)))
795:    (LASSO-WORDS) ))
796:
797: (DEFUN PERCENTSIGN (LAMBDA NIL
798:    (SETQ WORD (LIST (ASCII 8) (ASCII 37)))
799:    (LASSO-WORDS) ))
800:
801: (DEFUN OPENPAREN (LAMBDA NIL
802:    (SETQ WORD (LIST (ASCII 40) (ASCII 8)))
803:    (LASSO-WORDS) ))
804:
805: (DEFUN CLOSEPAREN (LAMBDA NIL
806:    (SETQ WORD (LIST (ASCII 8) (ASCII 41)))
807:    (LASSO-WORDS) ))
808:
809: (DEFUN ENDP (LAMBDA NIL
810:    (SETQ WORD (LIST (ASCII 10) (ASCII 13) (TAB)))
811:    (LASSO-WORDS) ))
812:
813: (DEFUN NEWPARAGRAPH (LAMBDA NIL
814:    (SETQ WORD (LIST (ASCII 10) (ASCII 10) (ASCII 13) (TAB)))
815:    (LASSO-WORDS) ))
816:
817: (DEFUN END-CHECK (LAMBDA NIL
818:    (COND
819:      ((EQUAL (ASCII 46) OPEN-WORD)
820:        (LASSO-WORDS) )
821:      ((EQ 'LOGOFF (PACK OPEN-WORD))
822:        'END-PROGRAM-EXECUTION )
823:      ((EQ 'END (PACK OPEN-WORD))
824:        'END-PROGRAM-EXECUTION )
825:      ((EQ 'STOP (PACK OPEN-WORD))
826:        'END-PROGRAM-EXECUTION )
827:      (T (RETRO-ROCKET)) ) ))
828:
829: (DEFUN NUMBER (LAMBDA (RDS)
830:    (PRINT-THIS '(INPUT NUMBER))
831:    (SETQ WORD (RATOM))
832:    (LASSO-WORDS) ))
833:
834: (DEFUN HYPHEN (LAMBDA NIL
835:    (SETQ WORD (ASCII 45))
```

```
836:      (LASSO-WORDS) ))
837:
838: (SETQQ TWOS (("223" BAD)
839:      ("26479" ANGRY)
840:      ("27696" BROWN)
841:      ("25663" ALONE)
842:      ("266666" COMMON)
843:      ("2686879" COUNTRY)
844:      ("2" A)
845:      ("255" ALL)
846:      ("2663" COME)
847:      ("243" AID)
848:      ("277537" APPLES)
849:      ("263" AND)
850:*     ("27" AS)
851:      ("28" AT)
852:      ("288" BUT)
853:      ("26" AM)
854:      ("226" CAN)
855:      ("22688" ABOUT)
856:      ("269" ANY)
857:      ("26" AN)
858:      ("283" ATE)
859:      ("2226868" ACCOUNT)
860:      ("273" ARE)
861:      ("22747" BASIS)
862:      ("26678837" COMPUTER)
863:      ("24728487" CIRCUITS)
864:      ("23" BE) ))
865:
866: (SETQQ THREES (("38379" EVERY)
867:      ("3337" DEEP)
868:      ("36" DO)
869:      ("367" FOR)
870:      ("3447" EGGS)
871:      ("36464" DOING)
872:      ("363" END)
873:      ("3335" FEEL)
874:      ("3787872833" FRUSTRATED)
875:      ("369" FOX)
876:      ("35374268" ELEPHANT)
877:      ("386" FUN)
878:      ("32822273" DATABASE)
879:      ("3532876642" ELECTRONIC)
880:      ("376979" DROWSY)
881:      ("329" DAY)
882:*     ("39248464" EXCITING) ))
883:
884: (SETQQ FOURS (("4843" HUGE)
885:      ("46" IN)
886:      ("48" IT)
887:      ("43" IF)
888:      ("4283" HAVE)
889:      ("437" HER)
890:      ("423" HAD)
891:      ("446" HIM)
892:      ("438" GET)
893:      ("4" I)
894:      ("4673" HOPE)
895:      ("48377" GUESS)
896:      ("44" HI)
897:      ("469" HOW)
898:      (47 IS)
899:      ("46939" HOWDY)
900:      ("4686" INTO)
```

```
901:    ("4976843737" HYPOTHESES)
902:    ("468" HOT)
903:    ("468357" HOVELS)
904:    ("4273" HARD) ))
905:
906: (SETQQ FIVES (("522" LAB)
907:    (538837 LETTER)
908:    ("5646" JOHN)
909:    ("586733" JUMPED)
910:    ("5683" LOVE)
911:    ("56442" LOGIC)

912:    ("5644225" LOGICAL)
913:    ("5664" LONG)
914:    ("548464" LIVING)
915:    ("5326" JEAN)
916:    ("5483" LIVE)
917:    ("5669" KNOW) ))
918:
919: (SETQQ SIXES (("63" OF)
920:    ("669" NOW)
921:    ("636" MEN)
922:    ("663376" MODERN)
923:    ("668" NOT)
924:    ("69" MY)
925:    ("687" OUR)
926:    ("663" ONE)
927:    ("645" NIL)
928:    ("666" MOM)
929:    ("6824" MUCH)
930:    ("6673" MORE)
931:    ("6678" MOST)
932:*   ("645537" MILLER)
933:    ("686237" NUMBER)
934:    ("642378" NICEST)
935:    ("6423" NICE)

936:    ("628436284225" MATHEMATICAL)
937:    ("66" ON)
938:    ("6659" ONLY) ))
939:
940: (SETQQ SEVENS (("76" SO)
941:    ("743" SHE)
942:    ("78425" QUICK)
943:    ("788743" STUPID)
944:    ("738876" RETURN)
945:    ("7243623" SCIENCE)
946:    ("7468528466" SIMULATION)
947:    ("746753" SIMPLE)
948:    ("736753" PEOPLE)
949:    ("78278464" STARVING)
950:    ("7243" SAID)
951:    ("74388" RHETT)
952:    ("76548359" POLITELY)
953:    ("7" S)
954:    ("76857" SOULS)
955:    ("736426566" SEMICOLON) ))
956:
957: (SETQQ EIGHTS (("8463" TIME)
958:    ("82253" TABLE)
959:    ("8428" THAT)

960:    ("8447" THIS)
961:    ("8379" VERY)
962:    ("8439" THEY)
963:    ("86" TO)
964:    ("84347" THEIR)
965:    ("866" TOO)
966:    ("843679" THEORY)
967:    ("82537" TAKES)
968:    ("8737" USES)
```

```
969:    ("8378" TEST)
970:    ("843" THE)
971:    ("84733" THREE)
972:    ("8696" TOWN)
973:    ("87328473" TREATISE)
974:    ("84637" TIMES)
975:    ("879" TRY)
976:    ("82937" TAXES)
977:    ("8253" TAKE)
978:    ("86844" TOUGH) ))
979:
980: (SETQQ NINES (("93272" ZEBRA)
981:    ("968" YOU)
982:    ("93" WE)
983:    ("9687" YOUR)

984:    ("9455" WILL)
985:    ("927" WAS)
986:    ("9484" WITH)
987:    ("96853" WOULD)
988:    ("9436" WHEN)
989:    ("966337385" WONDERFUL)
990:    ("96757" WORKS)
991:    ("9675" WORK)
992:    ("966337" WONDER)
993:    ("96737" WORDS)
994:    ("94424" WHICH)
995:    ("9463" WIND) ))
996:
997: (SETQQ MATCHED-TWOS NIL)
998:
999: (SETQQ MATCHED-THREES (("3" E F)))
1000:
1001: (SETQQ MATCHED-FOURS ((4663 GOOD HOME GONE HONE)))
1002:
1003: (SETQQ MATCHED-FIVES NIL)
1004:
1005: (SETQQ MATCHED-SIXES NIL)
1006:
1007: (SETQQ MATCHED-SEVENS NIL)

1008:
1009: (SETQQ MATCHED-EIGHTS (("84373" THERE THESE)))
1010:
1011: (SETQQ MATCHED-NINES NIL)
1012:
1013: (DEFUN PRINT-ROWS (LAMBDA (LST)
1014:    ((NULL LST)
1015:       (ASCII 32) )
1016:    (PRINT (CAR LST))
1017:    (PRINT-ROWS (CDR LST)) ))
1018:
1019: (DEFUN PRINT-THIS (LAMBDA (LST)
1020:    ((NULL LST)
1021:       (PRINT (ASCII 32)) )
1022:    (PRIN1 (CAR LST))
1023:    ((NOT (EQ (ASCII 8) (CAR LST)))
1024:       (PRIN1 (ASCII 32))
1025:       (PRINT-THIS (CDR LST)) )
1026:    ((EQ (ASCII 8) (CAR LST))
1027:       (PRINT-THIS (CDR LST)) ))
1028:
1029: (RDS)
```

SMITH Joseph B COL 822 Oak Dr Lanham . . . 777-7777 becomes

SMITH_JLANMD SMITH JOSEPH B COL 822 OAK DR LANHAM MD 777-7777 then becomes

764840552663 SMITH JOSEPH B COL 822 OAK DR LANHAM MD 777-7777

Appendix B

```
 1: *; File: SMITH.LIB
 2:
 3: (DEFUN CLRSCRN (LAMBDA NIL
 4:    (HOME)
 5:    (PRIN1 ESC)
 6:    (PRIN1 '"[2J")
 7:    (ASCII 32) ))
 8:
 9: (DEFUN ASK-NAME (LAMBDA NIL
10:    (PRIN1 (ASCII 9))
11:    (PRIN1 (ASCII 9))
12:    (PRINT-THIS (LIST BAR 'There are now (PLUS (LENGTH NUMBER-PUSHERS)
13:       (LENGTH SINGLETS)) 'possibilities BAR))
14:    (PRIN1 (ASCII 16))
15:    (PRIN1 (ASCII 32))
16:    (PRINT-STOP '(Please type in the person's first name))
17:    (SETQ NOMBRE (RATOM))
18:    (CONFABULATOR) ))
19:
20: (DEFUN ASSESS-TROOPS (LAMBDA (LST)
21:    ((NULL LST)
22:       ((NULL SINGLETS)
23:          (PRINT-THIS (LIST (ASCII 16) 'No 'possibilities 'left))
24:          (GO-ON) )
25:       ((NONNULL SINGLETS)
26:          (INITIALS-ONLY) ) )
27:    ((EQUAL 1 (PLUS (LENGTH LST) (LENGTH SINGLETS)))
28:       (PRIN1 (ASCII 9))
29:       (PRIN1 (ASCII 9))
30:       (PRINT-THIS (LIST BAR 'There 'is 'now 'only 'one 'possibility BAR))
31:       (READ-THEM LST) )
32:    ((LESSP (LENGTH LST) 5)
33:       (PRIN1 (ASCII 9))
34:       (PRIN1 (ASCII 9))
35:       (PRINT-THIS (LIST BAR 'There 'are 'now (PLUS (LENGTH LST) (LENGTH
36:          SINGLETS)) 'possibilities BAR))
37:       (READ-THEM LST) )
38:    ((EQUAL MARKER 'B)
39:       (SETQ MARKER 'C)
40:       (FIRST-INITIAL LST) )
41:    ((EQUAL MARKER 'A)
42:       (SETQ MARKER 'B)
43:       (SETQ TEST-LOCALITY (NTH 8 (CAR LST)))
44:       (TEST-LOCALITY LST) )
45:    ((EQUAL MARKER 'C)
46:       (SETQ MARKER 'D)
47:       (SEPARATE-SINGLETS LST) )
48:    ((EQUAL MARKER 'D)
49:       (SETQ MARKER 'E)
50:       (ELIMINATOR LST) ) ))
51:
52: (SETQQ BAR ~V~V~V~V)
53:
54: (DEFUN BLOCK-20 (LAMBDA NIL
55:    (PRINT (PACK (LIST (ASCII 219) (ASCII 219) (ASCII 219) (ASCII 219)
```

```
56:        (ASCII 219) (ASCII 219) (ASCII 219) (ASCII 219) (ASCII 219)
57:           (ASCII 219) (ASCII 219) (ASCII 219) (ASCII 219) (ASCII
58:       219) (ASCII 219) (ASCII 219) (ASCII 219) (ASCII 219) (ASCII
59:       219) (ASCII 219) (ASCII 219) (ASCII 219) (ASCII 219) (ASCII
60:       219) (ASCII 219) (ASCII 219) (ASCII 219) (ASCII 219) (ASCII
61:       219) (ASCII 219) (ASCII 219) (ASCII 219) (ASCII 219) (ASCII
62:       219) (ASCII 219) (ASCII 219) (ASCII 219) (ASCII 219) (ASCII
63:       219) (ASCII 219) (ASCII 219) (ASCII 219) (ASCII 219) (ASCII
64:       219) (ASCII 219) (ASCII 219) (ASCII 219) (ASCII 219) (ASCII
65:       219) (ASCII 219) (ASCII 219) (ASCII 219) (ASCII 219) (ASCII
66:       219) (ASCII 219) (ASCII 219) (ASCII 219) (ASCII 219) (ASCII
67:       219) (ASCII 219) (ASCII 219) (ASCII 219) (ASCII 219) (ASCII
68:       219) (ASCII 219) (ASCII 219) (ASCII 219) (ASCII 219)(ASCII 219)
69:        (ASCII 219) (ASCII 219) (ASCII 219) (ASCII 219) (ASCII 219)
70:        (ASCII 219) (ASCII 219) (ASCII 219) )))))
71:
72: (DEFUN BOOSTER-HOUSEHOLD (LAMBDA NIL
73:    ((NULL LETTER)
74:      (POP NUMERALS)
75:      (SETQ NUMERALS (LIST (PACK NUMERALS)))
76:      (SETQ NEW-ONE (APPEND NUMERALS (CAR ELEPHANTS)))
77:      (SETQ NUMBER-PUSHERS (APPEND NUMBER-PUSHERS (LIST NEW-ONE)))
78:      (POP ELEPHANTS)
79:      (RETRO-HOUSEHOLD) )
80:    ((NONNULL LETTER)
81:      (SETQ NUMERALS (APPEND NUMERALS (LIST (NUMERIFY LETTER))))
82:      (SETQ LETTER (POP OPEN-WORD))
83:      (BOOSTER-HOUSEHOLD) ) ))
84:
85: (DEFUN CONFABULATOR (LAMBDA NIL
86:    ((NULL NUMBER-PUSHERS)
87:      (ASSESS-TROOPS HOMBRES) )
88:    ((EQUAL (UNPACK NOMBRE) (UNPACK (CAAR NUMBER-PUSHERS)))
89:      (SETQ HOMBRES (APPEND HOMBRES (LIST (CAR NUMBER-PUSHERS))))
90:      (POP NUMBER-PUSHERS)
91:      (CONFABULATOR) )
92:    ((NOT (EQUAL (UNPACK NOMBRE) (UNPACK (CAAR NUMBER-PUSHERS))))
93:      (POP NUMBER-PUSHERS)
94:      (CONFABULATOR) )
95:    (T 'TROUBLE-WITH-CONFABULATOR) ))
96:
97: (DEFUN DIRECTORY-ASSISTANCE (LAMBDA (RDS)
98:    (CLRSCRN)
99:    (TERPRI)
100:   (FANCY-BOX)
101:   (SETQ MMARKER NIL)
102:   (SETQ LOCALITIES NIL)
103:   (SETQ THE-LOCALITY NIL)
104:   (SETQ SINGLETS NIL)
105:   (SETQ FULL-BODIES NIL)
106:   (SETQ TEMP NIL)
107:   (SETQ ELEPHANTS NIL)
108:   (SETQ NUMBER-PUSHERS NIL)
109:   (SETQ HOMBRES NIL)
110:   (SETQ SMALLER NIL)
111:   (SETQ POSSIBILITIES NIL)
112:   (PRINT-THIS '(This service can assist you if you will type in))
113:   (PRINT-STOP '(the first six letters of the person's last name --))
114:   (SETQ SIX-LAST (UNPACK (RATOM)))
115:   ((MEMBER (CAR SIX-LAST) (UNPACK 'ABCDEFGHIJKLMNOPQRSTUVWXYZ))
116:      (PRINT-THIS '(PLEASE USE THE NUMBERS CORRESPONDING TO THE LETTERS))
117:      (GO-ON) )
118:*(PRINT-STOP '(Thank you - What is the first letter of the first name?))
119:   (SETQ FIRST-FIRST (UNPACK (RATOM)))
120:   (PRINT-STOP '(Thank you - What are the first three letters of the
121:      locality?))
```

```
122:    (SETQ THREE-LOCALITY (UNPACK (RATOM)))
123:    (PRINT-STOP '(Thank you - What is the two-letter state code?))
124:    (SETQ TWO-STATE (UNPACK (RATOM)))
125:    (SETQ SIX-LAST (APPEND SIX-LAST (LIST 0 0 0 0 0 0)))
126:    (SETQ FIND-THIS (LIST (CAR SIX-LAST) (CADR SIX-LAST) (CADDR SIX-LAST)
127:        (NTH 3 SIX-LAST) (NTH 4 SIX-LAST) (NTH 5 SIX-LAST) (CAR FIRST-FIRST)
128:        (CAR TWO-STATE) (CADR TWO-STATE) (CAR THREE-LOCALITY)
129:        (CADR THREE-LOCALITY) (CADDR THREE-LOCALITY)))
130:    (SETQ FIND-THIS (UNPACK (PACK FIND-THIS)))
131:    (TERPRI)
132:    (FIND-NEEDLES FIND-THIS PHONE-LIST) ))
133:
134: (DEFUN ELIMINATOR (LAMBDA (LST)
135:    ((NULL LST)
136:      (RETRO-HOUSEHOLD) )
137:    (SETQ ELEPHANTS (CONS (CDAR LST) ELEPHANTS))
138:    (ELIMINATOR (CDR LST)) ))
139:
140: (DEFUN FANCY-BOX (LAMBDA NIL
141:    (PRINT-THIS (PACK (LIST (ASCII 9)(ASCII 9)(ASCII 32)(ASCII 32)(ASCII
142:        32)(ASCII 218)(ASCII 196)(ASCII 196)(ASCII 196)(ASCII 196)(ASCII
143:        196)(ASCII 196)(ASCII 196)(ASCII 196)(ASCII 196)(ASCII 196)(ASCII
144:        196)(ASCII 196)(ASCII 196)(ASCII 196)(ASCII 196)(ASCII 196)(ASCII
145:        196)(ASCII 196)(ASCII 196)(ASCII 196)(ASCII 196)(ASCII 196)(ASCII
146:        196)(ASCII 196)(ASCII 196)(ASCII 196)(ASCII 196)(ASCII 196)(ASCII
147:        196)(ASCII 196)(ASCII 196)(ASCII 196)(ASCII 196)(ASCII 196)(ASCII
148:        196)(ASCII 196)(ASCII 196)(ASCII 196)(ASCII 196)(ASCII 191))))
149:    (PRINT-STOP (PACK (LIST (ASCII 9) (ASCII 32) (ASCII 32) (ASCII 9))))
150:    (PRINT-STOP (LIST (ASCII 32) (ASCII 179)))
151:    (PRINT-STOP '(YOU HAVE REACHED DIRECTORY ASSISTANCE))
152:    (PRINT (ASCII 179))
153:    (PRINT-THIS (PACK (LIST (ASCII 9)(ASCII 9)(ASCII 32)(ASCII 32)(ASCII
154:        32)(ASCII 192)(ASCII 196)(ASCII 196)(ASCII 196)(ASCII 196)(ASCII
155:        196)(ASCII 196)(ASCII 196)(ASCII 196)(ASCII 196)(ASCII 196)(ASCII
156:        196)(ASCII 196)(ASCII 196)(ASCII 196)(ASCII 196)(ASCII 196)(ASCII
157:        196)(ASCII 196)(ASCII 196)(ASCII 196)(ASCII 196)(ASCII 196)(ASCII
158:        196)(ASCII 196)(ASCII 196)(ASCII 196)(ASCII 196)(ASCII 196)(ASCII
159:        196)(ASCII 196)(ASCII 196)(ASCII 196)(ASCII 196)(ASCII 196)(ASCII
160:        196)(ASCII 196)(ASCII 196)(ASCII 196)(ASCII 196)(ASCII 217))))
161:    (PRINT (ASCII 32)) ))
162:
163: (DEFUN FIND-NEEDLES (LAMBDA (NUM LST)
164:    ((NULL LST)
165:      (SETQ MARKER 'A)
166:      (ASSESS-TROOPS POSSIBILITIES) )
167:    ((EQUAL NUM (UNPACK (CAAR LST)))
168:      (SETQ POSSIBILITIES (CONS (CAR LST) POSSIBILITIES))
169:      (FIND-NEEDLES NUM (CDR LST)) )
170:    (FIND-NEEDLES NUM (CDR LST)) ))
171:
172: (DEFUN FIRST-INITIAL (LAMBDA (LST)
173:    (PRIN1 (ASCII 9))
174:    (PRIN1 (ASCII 9))
175:    (PRINT-THIS (LIST BAR 'There 'are 'now (PLUS (LENGTH LST) (LENGTH
176:        SINGLETS)) 'possibilities BAR))
177:    (PRIN1 (ASCII 16))
178:    (PRIN1 (ASCII 32))
179:    (PRINT-STOP (LIST 'Does 'the 'first 'name 'begin 'with 'the 'letter
180:        'A 'as 'in 'ALPHA?))
181:    (SETQ LETTER-CHECK (RATOM))
182:    ((EQUAL LETTER-CHECK 9)
183:      (SETQ FIRST-INITIAL 'A)
184:      (REDUCE-BY-INITIAL POSSIBILITIES) )
185:    (PRIN1 (ASCII 16))
186:    (PRIN1 (ASCII 32))
187:    (PRINT-STOP (LIST 'Does 'it 'begin 'with 'the
188:        'letter 'B 'as 'in 'BRAVO?))
189:    (SETQ LETTER-CHECK (RATOM))
```

```
190:    ((EQ LETTER-CHECK 9)
191:       (SETQ FIRST-INITIAL 'B)
192:       (REDUCE-BY-INITIAL POSSIBILITIES) )

193:    (PRIN1 (ASCII 16))
194:    (PRIN1 (ASCII 32))
195:    (PRINT-STOP (LIST 'Does 'it 'begin 'with 'C 'as 'in 'CHARLIE?))
196:    (SETQ LETTER-CHECK (RATOM))
197:    ((EQ LETTER-CHECK 9)
198:       (SETQ FIRST-INITIAL 'C)
199:       (REDUCE-BY-INITIAL POSSIBILITIES) )
200:    (PRINT-THIS (LIST (ASCII 16) 'An 'error 'has 'crept 'in 'somehow '-
201:       'we 'will 'have 'to 'begin 'again))
202:    (GO-ON) ))
203:
204: (DEFUN GO-ON (LAMBDA NIL
205:    (TERPRI)
206:    (PRINT-THIS '(GO ON?))
207:    (SETQ FORK-IN-ROAD (RATOM))
208:    ((EQ FORK-IN-ROAD 'Y)
209:       (DIRECTORY-ASSISTANCE) )
210:    ((EQUAL FORK-IN-ROAD 9)
211:       (DIRECTORY-ASSISTANCE) )
212:    ('NO) ))
213:
214: (DEFUN INITIALS-ONLY (LAMBDA (LST)
215:    (PRIN1 (ASCII 9))
216:    (PRIN1 (ASCII 9))

217:    (PRINT-THIS (LIST BAR 'There 'are 'now (PLUS (LENGTH LST) (LENGTH
218:       SINGLETS)) 'possibilities BAR))
219:    (INITIALS-ONLY-B) ))
220:
221: (DEFUN INITIALS-ONLY-B (LAMBDA (RDS)
222:    ((NULL SINGLETS)
223:       (PRIN1 (ASCII 16))
224:       (PRIN1 (ASCII 32))
225:       (PRINT-THIS '(No possibilities left))
226:       (GO-ON) )
227:    ((NONNULL SINGLETS)
228:       (PRIN1 (ASCII 127))
229:       (PRIN1 (ASCII 32))
230:       (PRINT-THIS '(Do you need the number for))
231:       (PRINT-RECORD (CAR SINGLETS))
232:       (PRINT-STOP '?)
233:       (PRIN1 (ASCII 9))
234:       (SETQ REJOINDER (RATOM))
235:       ((MEMBER REJOINDER (UNPACK 'ABCDEFGHIJKLMNOPQRSTUVWXYZ))
236:          (PRIN1 (ASCII 16))
237:          (PRIN1 (ASCII 32))
238:          (PRINT-THIS '(Please use numerals))
239:          (INITIALS-ONLY-B) )
240:       ((EQUAL REJOINDER 9)

241:          (BLOCK-20)
242:          (BLOCK-20)
243:          (TERPRI)
244:          (PRIN1 (ASCII 9))
245:          (PRIN1 (ASCII 9))
246:          (PRIN1 (ASCII 9))
247:          (PRIN1 (ASCII 9))
248:          (PRINT (CAR (LAST (CAR SINGLETS))))
249:          (TERPRI)
250:          (BLOCK-20)
251:          (BLOCK-20)
252:          (TERPRI)
253:          (GO-ON) )
254:       (POP SINGLETS)
255:       (INITIALS-ONLY-B) ) ))
256:
```

```
257:  (DEFUN NUMERIFY (LAMBDA (xx)
258:     (COND
259:        ((EQ a xx) 2)
260:        ((EQ b xx) 2)
261:        ((EQ c xx) 2)
262:        ((EQ d xx) 3)
263:        ((EQ e xx) 3)
264:        ((EQ f xx) 3)

265:        ((EQ g xx) 4)
266:        ((EQ h xx) 4)
267:        ((EQ i xx) 4)
268:        ((EQ j xx) 5)
269:        ((EQ k xx) 5)
270:        ((EQ l xx) 5)
271:        ((EQ m xx) 6)
272:        ((EQ n xx) 6)
273:        ((EQ o xx) 6)
274:        ((EQ p xx) 7)
275:        ((EQ q xx) 7)
276:        ((EQ r xx) 7)
277:        ((EQ s xx) 7)
278:        ((EQ t xx) 8)
279:        ((EQ u xx) 8)
280:        ((EQ v xx) 8)
281:        ((EQ w xx) 9)
282:        ((EQ x xx) 9)
283:        ((EQ y xx) 9)
284:        ((EQ z xx) 9)
285:        ((EQ A xx) 2)
286:        ((EQ B xx) 2)
287:        ((EQ C xx) 2)
288:        ((EQ D xx) 3)

289:        ((EQ E xx) 3)
290:        ((EQ F xx) 3)
291:        ((EQ G xx) 4)
292:        ((EQ H xx) 4)
293:        ((EQ I xx) 4)
294:        ((EQ J xx) 5)
295:        ((EQ K xx) 5)
296:        ((EQ L xx) 5)
297:        ((EQ M xx) 6)
298:        ((EQ N xx) 6)
299:        ((EQ O xx) 6)
300:        ((EQ P xx) 7)
301:        ((EQ Q xx) 7)
302:        ((EQ R xx) 7)
303:        ((EQ S xx) 7)
304:        ((EQ T xx) 8)
305:        ((EQ U xx) 8)
306:        ((EQ V xx) 8)
307:        ((EQ W xx) 9)
308:        ((EQ X xx) 9)
309:        ((EQ Y xx) 9)
310:        ((EQ Z xx) 9)
311:        ((EQ 0 xx) 0)
312:        (T 'ERROR) ) ))

313:
314:
315: (DEFUN PRINT-RECORD (LAMBDA (LST)
316:    ((NULL MMARKER)
317:       (PRINT-SPACE (NTH 2 LST))
318:       (SETQ MMARKER A)
319:       (PRINT-RECORD LST) )
320:    ((EQ MMARKER A)
321:       (SETQ MMARKER B)
322:       ((NOT (EQUAL (CAR (UNPACK '0)) (CAR (UNPACK (NTH 3 LST))))))
```

```
323:        (PRINT-SPACE (NTH 3 LST))
324:        (PRINT-RECORD LST) )
325:      (PRINT-RECORD LST) )
326:    ((EQ MMARKER B)
327:      (SETQ MMARKER C)
328:      (PRINT-SPACE (CADR LST))
329:      (PRINT-RECORD LST) )
330:    ((EQ MMARKER C)
331:      (SETQ MMARKER D)
332:      ((NOT (EQUAL (CAR (UNPACK '0)) (CAR (UNPACK (NTH 4 LST)))))
333:        (PRINT-SPACE (LIST (NTH 4 LST)))
334:        (PRINT-RECORD LST) )
335:      (PRINT-RECORD LST) )
336:    ((EQ MMARKER D)
337:      (SETQ MMARKER E)
338:      (PRINT-STOP '(of))
339:      (PRINT-RECORD LST) )
340:    ((EQ MMARKER E)
341:      (SETQ MMARKER F)
342:      ((NOT (EQUAL (CAR (UNPACK '0)) (CAR (UNPACK (NTH 5 LST)))))
343:        (PRINT-SPACE (NTH 5 LST))
344:        (PRINT-RECORD LST) )
345:      (PRINT-RECORD LST) )
346:    ((EQ MMARKER F)
347:      (SETQ MMARKER G)
348:      ((NOT (EQUAL (CAR (UNPACK '0)) (CAR (UNPACK (NTH 6 LST)))))
349:        (PRINT-SPACE (NTH 6 LST))
350:        (PRINT-RECORD LST) )
351:      (PRINT-RECORD LST) )
352:    ((EQ MMARKER G)
353:      (SETQ MMARKER H)
354:      ((NOT (EQUAL (CAR (UNPACK '0)) (CAR (UNPACK (NTH 7 LST)))))
355:        (PRINT-SPACE (NTH 7 LST))
356:        (PRINT-RECORD LST) )
357:      (PRINT-RECORD LST) )
358:    ((EQ MMARKER H)
359:      (SETQ MMARKER I)
360:      ((NOT (EQUAL (CAR (UNPACK '0)) (CAR (UNPACK (NTH 6 LST)))))
361:        (PRINT-STOP '(in))
362:        (PRINT-RECORD LST) )
363:      (PRINT-RECORD LST) )
364:      (PRINT-SPACE (NTH 8 LST))
365:    ((EQ MMARKER I)
366:      (SETQ MMARKER NIL)
367:      (PRIN1 (NTH 9 LST))
368:      (ASCII 32) ) ))
369:
370: (DEFUN PRINT-THIS (LAMBDA (LST)
371:    ((NULL LST)
372:      (PRINT (ASCII 32)) )
373:    (PRIN1 (CAR LST))
374:    ((NOT (EQ (ASCII 8) (CAR LST)))
375:      (PRIN1 (ASCII 32))
376:      (PRINT-THIS (CDR LST)) )
377:    ((EQ (ASCII 8) (CAR LST))
378:      (PRINT-THIS (CDR LST)) ) ))
379:
380: (DEFUN PRINT-SPACE (LAMBDA (OBJ)
381:      (PRIN1 OBJ)
382:      (PRIN1 (ASCII 32)) ))
383:
384: (DEFUN PRINT-STOP (LAMBDA (LST)
385:    ((NULL LST)
386:      (ASCII 32) )
387:    (PRIN1 (CAR LST))
388:    ((NOT (EQ (ASCII 8) (CAR LST)))
389:      (PRIN1 (ASCII 32))
```

```
390:       (PRINT-STOP (CDR LST)) )
391:     ((EQ (ASCII 8) (CAR LST))
392:       (PRINT-STOP (CDR LST)) ) ))
393:
394: (DEFUN READ-THEM (LAMBDA (LST RDS)
395:     ((NULL LST)
396:       (ASSESS-TROOPS) )
397:     (PRIN1 (ASCII 127))
398:     (PRIN1 (ASCII 32))
399:     (PRINT-THIS '(Do you need the number for))
400:     (PRINT-RECORD (CAR LST))
401:     (PRIN1 '?)
402:     (PRIN1 (ASCII 9))
403:     (SETQ REJOINDER (RATOM))
404:     ((MEMBER REJOINDER (UNPACK 'ABCDEFGHIJKLMNOPQRSTUVWXYZ))
405:       (PRIN1 (ASCII 16))
406:       (PRIN1 (ASCII 32))
407:       (PRINT-THIS '(Please use numerals))
408:       (READ-THEM) )

409:     ((EQUAL REJOINDER 9)
410:       (BLOCK-20)
411:       (BLOCK-20)
412:       (TERPRI)
413:       (PRIN1 (ASCII 9))
414:       (PRIN1 (ASCII 9))
415:       (PRIN1 (ASCII 9))
416:       (PRIN1 (ASCII 9))
417:       (PRINT (CAR (LAST (CAR LST))))
418:       (TERPRI)
419:       (BLOCK-20)
420:       (BLOCK-20)
421:       (TERPRI)
422:       (GO-ON) )
423:     (POP LST)
424:     (READ-THEM LST) ))
425:
426: (DEFUN REDUCE-BY-INITIAL (LAMBDA (LST)
427:     ((NULL LST)
428:       (ASSESS-TROOPS SMALLER) )
429:     ((EQUAL FIRST-INITIAL (CAR (UNPACK (CADDR (CAR LST)))))
430:       (SETQ SMALLER (CONS (CAR LST) SMALLER))
431:       (REDUCE-BY-INITIAL (CDR LST)) )
432:     (REDUCE-BY-INITIAL (CDR LST)) ))

433:
434: (DEFUN REDUCE-BY-LOCALITY (LAMBDA (LST RDS)
435:     ((NULL LST)
436:       (ASSESS-TROOPS LOCALITIES) )
437:     ((NULL THE-LOCALITY)
438:       (PRIN1 (ASCII 16))
439:       (PRIN1 (ASCII 32))
440:       (PRINT-STOP (LIST 'Is 'the 'locality (NTH 8 (CAR LST)) '?))
441:       (SETQ LOCALITY-CHECK (RATOM))
442:       ((EQUAL LOCALITY-CHECK 9)
443:         (SETQ THE-LOCALITY (NTH 8 (CAR LST)))
444:         (SETQ LOCALITIES (LIST (CAR LST)))
445:         (REDUCE-BY-LOCALITY (CDR LST)) )
446:       ((NOT (EQUAL LOCALITY-CHECK 9))
447:         (SETQ WRONG-ONE (NTH 8 (CAR LST)))
448:         (POP LST)
449:         (SETQ TEMP NIL)
450:         (RREMOVE LST) ) )
451:     ((EQ THE-LOCALITY (NTH 8 (CAR LST)))
452:       (SETQ LOCALITIES (CONS (CAR LST) LOCALITIES))
453:       (REDUCE-BY-LOCALITY (CDR LST)) )
454:     ((NOT (EQ THE-LOCALITY (NTH 8 (CAR LST))))
455:       (POP LST)
456:       (REDUCE-BY-LOCALITY (CDR LST)) )
```

```
457:    (REDUCE-BY-LOCALITY (CDR LST)) ))
458:
459: (DEFUN RREMOVE (LAMBDA (LST)
460:    ((NULL LST)
461:       (SETQ THE-LOCALITY NIL)
462:       (REDUCE-BY-LOCALITY TEMP) )
463:    ((EQ WRONG-ONE (NTH 8 (CAR LST)))
464:       (POP LST)
465:       (RREMOVE LST) )
466:    ((NOT (EQ WRONG-ONE (NTH 8 (CAR LST))))
467:       (SETQ TEMP (CONS (CAR LST) TEMP))
468:       (POP LST)
469:       (RREMOVE LST) ) ))
470:
471: (DEFUN RETRO-HOUSEHOLD (LAMBDA NIL
472:    ((NULL ELEPHANTS)
473:       (ASK-NAME) )
474:    (SETQ NUMERALS '(A))
475:    (SETQ OPEN-WORD (UNPACK (NTH 1 (CAR ELEPHANTS))))
476:    (SETQ LETTER (POP OPEN-WORD))
477:    (BOOSTER-HOUSEHOLD) ))
478:
479: (DEFUN SEPARATE-SINGLETS (LAMBDA (LST)
480:    ((NULL LST)
*
479: (DEFUN SEPARATE-SINGLETS (LAMBDA (LST)
480:    ((NULL LST)
*481,504L
481:       (ASSESS-TROOPS FULL-BODIES) )
482:    ((EQUAL 1 (LENGTH (UNPACK (NTH 2 (CAR LST)))))
483:       (SETQ SINGLETS (CONS (CAR LST) SINGLETS))
484:       (SEPARATE-SINGLETS (CDR LST)) )
485:    ((GREATERP (LENGTH (UNPACK (NTH 2 (CAR LST)))) 1)
486:       (SETQ FULL-BODIES (CONS (CAR LST) FULL-BODIES))
487:       (SEPARATE-SINGLETS (CDR LST)) ) ))
488:
489: (DEFUN TEST-LOCALITY (LAMBDA (LST)
490:    ((NULL LST)
491:       (PRIN1 (ASCII 16))
492:       (PRIN1 (ASCII 32))
493:       (PRIN1 (NTH 8 (CAR POSSIBILITIES)))
494:       (PRINT ':)
495:       (ASSESS-TROOPS POSSIBILITIES) )
496:    ((EQUAL TEST-LOCALITY (NTH 8 (CAR LST)))
497:       (TEST-LOCALITY (CDR LST)) )
498:    ((NOT (EQUAL TEST-LOCALITY (NTH 8 (CAR LST))))
499:       (REDUCE-BY-LOCALITY LST) ) ))
500:
501: (RDS)
*
```

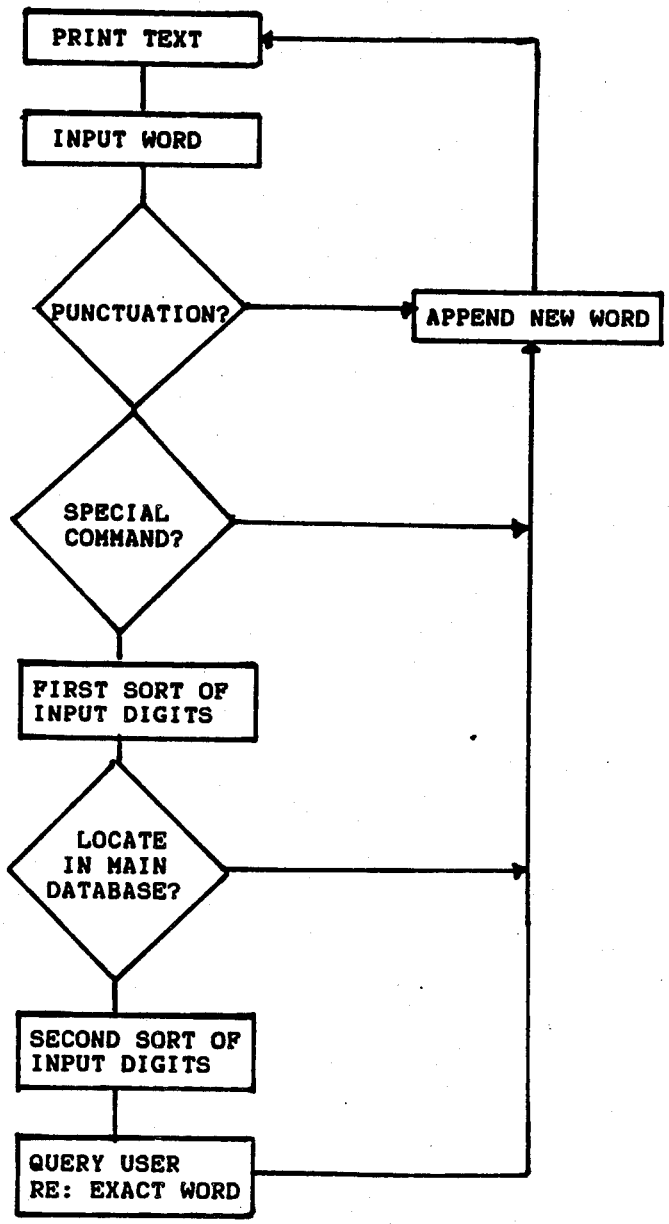

Appendix C

```
(SETQQ PHONE-LIST ((NIL)
  (764840263745 SMITH A 0 0 2116 BELVEDERE BLVD SILVERSPRING MD
        "681-8099")
  (764840263732 SMITH A 0 0 5615 EAGLE ST SEATPLEASANT MD "336-6376")
  (764840263633 SMITH A 0 0 2667 EVERGREEN RD ODENTON MD "858-0348")
  (764840263367 SMITH A 0 0 0 0 0 FORTWASHINGTON MD "292-7161")
  (764840263696 SMITH A 0 0 8428 INDIANHEAD HWY OXONHILL MD "839-7223")
  (764840263526 SMITH A 0 0 7602 INGRID PL LANDOVER MD "350-0811")
  (764840263424 SMITH A 0 0 17825 LAYTONSVILLE RD GAITHERSBURG MD
        "963-4578")
  (764840263825 SMITH A 0 0 7520 MAPLE AV TAKOMAPARK MD "270-4686")
  (764840263226 SMITH A 0 0 5431 MORRIS AV CAMPSPRINGS MD "899-7498")
  (764840263825 SMITH A 0 0 8201 ROANOKE AV TAKOMAPARK MD "587-4229")
  (764840263745 SMITH A 0 0 9039 SLIGOCREEK PKWY SILVERSPRING MD
        "588-7729")
  (764840263492 SMITH A 0 0 3421 TOLEDO TERR HYATTSVILLE MD "559-7995")
  (764840263668 SMITH A 0 0 4202 "28TH" ST MOUNTRANIER MD "927-0342")
  (764840263265 SMITH A B 0 5113 LAKELAND RD COLLEGEPARK MD "345-3985")
  (764840263243 SMITH A B 0 3115 ROLLING RD CHEVYCHASE MD "654-4224")
  (764840263424 SMITH A C 0 728 CLOPPER RD GAITHERSBURG MD "921-9149")
```

(764840263527 SMITH A C O 201 HARRYSTRUMAN DR LARGO MD "350-8292")
(764840263227 SMITH A C O 7 SULTAN AV CAPITOLHEIGHTS MD "350-1983")
(764840263233 SMITH A D O 9200 EDWARDS WY ADELPHI MD "445-2997")
(764840263648 SMITH A D O 12064 HALLANDALE TERR MITCHELVILLE MD
   "249-3592")
(764840863648 SMITH T C O 12064 HALLANDALE TERR MITCHELVILLE MD
   "249-3592")
(764840263825 SMITH A D O 7201 HOLLY V TAKOMAPARK MD "588-2926")
(764840263656 SMITH A DALE O 3709 OLDBALTIMORE DR OLNEY MD "774-6936")
(764840263233 SMITH A DIANE O 1836 METZEROTT RD ADELPHI MD "434-5721")
(764840263528 SMITH A E O 13400 FINSBURY CT LAUREL MD "498-7610")
(764840263745 SMITH A E O 8926 PINEYBRANCH RD SILVERSPRING MD
   "445-0747")
(764840263745 SMITH A E O 8926 PINEYBRANCH RD SILVERSPRING MD
   "445-0407")
(764840263424 SMITH A E JR 26 NORTHSUMMIT DR GAITHERSBURG MD
   "963-2194")
(764840263696 SMITH A F O 4545 WHEELER RD OXONHILL MD "630-9794")
("764840263836" SMITH A G O 2955 BRINKLEY RD TEMPLEHILLS MD
   "630-9043")
("764840263762" SMITH A G O 14007 COVE LN ROCKVILLE MD "340-8037")
("764840263424" SMITH A G O 517 SOUTHFREDERICK AV GAITHERSBURG MD
   "977-3698")
("764840263347" SMITH A J O 7806 BEECHNUT RD DISTRICTHEIGHTS MD
   "336-1797")
("764840263656" SMITH A J O 17624 MACDUFF AV OLNEY MD "774-4974")
("764840263527" SMITH A J O 10602 NARROWLEAF CT LARGO MD "336-4736")
("764840263276" SMITH A J O 1029 SHIRE CT CROFTON MD "721-9608")
("764840263526" SMITH A J O 8342 "12TH" AV LANGLEYPARK MD "439-5614")
("764840263243" SMITH A K O 3412 CHEVERLY AV CHEVERLY MD "322-1944")
("764840263825" SMITH A L O 7112 CENTRAL AV TAKOMAPARK MD "270-6454")
("764840263424" SMITH A L O 951 CLOPPER RD GAITHERSBURG MD "948-0199")
("764840263238" SMITH A L O 4400 EASTWEST HWY BETHESDA MD "986-1592")
("764840263265" SMITH A L O 6209 GREENBLADEGARTH O COLUMBIA MD
   "997-5605")
("764840263276" SMITH A L O 1623 REIDEL RD CROFTON MD "721-7503")
("764840263424" SMITH A L J 7 PRAIRIEROSE LN GAITHERSBURG MD
   "258-7346")
("764840263463" SMITH A M O O O O INDIANHEAD MD "743-7661")
("764840263745" SMITH A MCD O 8505 SPRINGVALE RD SILVERSPRING MD
   "588-5474")
("764840263768" SMITH A P O 7616 HACKMORE DR POTOMAC MD "983-0787")
("764840263238" SMITH A P O 10524 WESTLAKE DR BETHESDA MD "365-1480")
("764840263639" SMITH A R O 7913 LEGATON RD NEWCARROLTON MD
   "577-5480")
("764840263265" SMITH A R O 6397 WEATHERWISE WAY COLUMBIA MD
   "997-3364")
("764840563265" SMITH J L O 6397 WEATHERWISE WAY COLUMBIA MD
   "997-3364")
("764840263238" SMITH A S O 5508 CHARLCOTE RD BETHESDA MD "657-3435")
("764840263762" SMITH A S O 199 ROLLINS AV ROCKVILLE MD "468-8886")
("764840263762" SMITH A W O 1006 DEBECK DR ROCKVILLE MD "340-2395")
(764840263000 SMITH A WAYNE O O ETCHISON O O MD "253-2492")
("764840263526" SMITH A Y O 1803 DUTCHVILLAGE DR LANDOVER MD
   "386-5693")
("764840263233" SMITH AARON D O 1836 METZORETT RD ADELPHI MD
   "445-4577")
("764840263768" SMITH ABRAHAM O O 12840 HUNTSMAN WAY POTOMAC MD
   "424-4849")
("764840263762" SMITH ADALINE C O 12408 VILLAGESQUARE TERR
   ROCKVILLE MD "984-9518")
("764840263639" SMITH ADELBERT N O 6008 "85TH" PL NEWCARROLTON MD
   "577-6182")
("764840263332" SMITH ADELE E J O O O DEALE MD "867-4857")
("764840263777" SMITH ADELE E MRS 5306 KENNILWORTH AV
   SPRINGBROOKTERRACE MD "927-4176")
("764840263568" SMITH ADELL O MRS O O O LOTHIAN MD "867-1407")
("764840263836" SMITH ADRINE O O 2545 COLBROOK DR TEMPLEHILLS MD
   "894-6746")
("764840263745" SMITH AGNES O O 8709 ARLISS ST SILVERSPRING MD
   "439-2939")

("764840263745" SMITH AL O O 8811 COLESVILLE RD SILVERSPRING MD
"587-6709")
("764840263745" SMITH AL E O 11605 LEBARON TERR SILVERSPRING MD
"593-7921")
("764840263492" SMITH AL LINWOOD O 6412 ELLIOTT PL HYATTSVILLE MD
"270-6286")
("764840263265" SMITH ALAN O O 9329 ANGELINA CIR COLUMBIA MD
"995-1094")
("764840263627" SMITH ALAN O O 5612 MASSACHUSETTS AV
MASSACHUSETTSAVENUEHILLS MD "229-1204")
("764840263944" SMITH ALAN O O O O O WHITEPLAINS MD "645-5252")
("764840263877" SMITH ALAN D O 9520 SHERWOOD DR UPPERMARLBORO MD
"599-1910")
("764840263265" SMITH ALAN E O 7274 CANDLESHINE CT COLUMBIA MD
"730-8537")
("63367" SMITH ALAN R O O FORTWASHINGTONMARINA O FORTWASHINGTON
ID "292-7131")
("263696" SMITH ALAN W O 8902 OLDFIELD CT OXONHILL MD
"248-5620")
("764840263254" SMITH ALAN W MD 9131 PISCATAWAY RD CLINTON MD
"868-7000")
("764840263877" SMITH ALAN W MD 9440 PENNSYLVANIA AV UPPERMARLBORO MD
"599-1600")
("764840263272" SMITH ALASTAIR L O 7902 KNOLLWOOD DR BRANDYWINE MD
"372-8631")
("764840263526" SMITH ALBERT O O 5508 BARKER PL LANHAM MD "577-6999")
("764840363526" SMITH DONNA O O 5508 BARKER PL LANHAM MD "577-6999")
("764840263836" SMITH ALBERT O O 5802 REHLING O TEMPLEHILLS MD
"894-6391")
("764840263492" SMITH ALBERT O O 1782 VILLAGEGREEN R HYATTSVILLE MD
"322-2521")
("764840263648" SMITH ALBERT A O 15400 MOUNTOAK RD MITCHELVILLE MD
"249-2019")
("764840263424" SMITH ALBERT F O 16637 SOUTHWESTLAND DR GAITHERSBURG
MD "948-6624")
("764840263745" SMITH ALBERT J O 14533 MACBETH DR SILVERSPRING MD
"598-2008")
("764840263745" SMITH BETTY O O 14533 MACBETH DR SILVERSPRING MD
"598-2008")
("764840263742" SMITH ALBERT J O 4745 OAK DR SHADYSIDE MD "261-5759")
("764840263745" SMITH ALBERT J O 12707 SPRINGTREE DR SILVERSPRING MD
"622-2636")
("764840263333" SMITH ALBERT J O 7801 SUTHARD DR DEERWOOD MD
"840-2149")
("764840263424" SMITH ALBERT L JR 107 ROLLING D GAITHERSBURG MD
"977-1237")
("764840463424" SMITH GAIL E O 107 ROLLING RD GAITHERSBURG MD
"977-1237")
("764840263745" SMITH ALBERT T O 2304 BLUEVALLEY DR SILVERSPRING MD
"384-8072")
("764840263825" SMITH ALBERT T O 7212 SPRUCE AV TAKOMAPARK MD
"270-6084")
("764840263238" SMITH ALBERT V O 6203 WEDGEWOOD RD BETHESDA MD
"229-6742")
("764840263254" SMITH ALBERT W SR 6300 FLORENCE CT CLINTON MD
"868-6449")
("764840263276" SMITH ALDEN W O 1721 REYNOLDS O CROFTON MD "721-7932")
("764840263784" SMITH ALEASE O O 3827 SAINTBARNABAS RD SUITLAND MD
"423-5181")
("764840263437" SMITH ALEX O O 19550 CRYSTALROCK DR GERMANTOWN MD
"972-3984")
("764840263526" SMITH ALEX J O 5408 BARKER PL LANHAM MD "577-9486")
("764840263784" SMITH ALEX V O 3505 PEARL DR SUITLAND MD "568-1296")
("764840263243" SMITH ALEXANDER E O 6813 GEORGIA AV CHEVYCHASE MD
"652-4651")
("764840263925" SMITH ALEXANDER E O 516 UNIVERSITY DR WALDORF MD
"843-0207")
("764840263492" SMITH ALFRED O JR 404 GREENLAWN DR HYATTSVILLE MD
"270-0210")
("764840263877" SMITH ALFRED BRUCE O 3106 MARCANDO LN UPPERMARLBORO MD
"627-3345")

("764840263943" SMITH ALFRED E O 3028 BELPRE RD WHEATON MD "460-7854")
("764840263492" SMITH ALFRED E O 6105 "40TH" AV HYATTSVILLE MD
    "864-1318")
("764840263745" SMITH ALFRED G O 3240 HEWITT AV SILVERSPRING MD
    "460-7408")
("764840263877" SMITH ALFRED H O 4110 MELWOOD RD UPPERMARLBORO MD
    "735-8034")
("764840263265" SMITH ALFRED J O 5576 OAKLANDMILLS RD COLUMBIA MD
    "730-7521")
("764840263445" SMITH ALFRED R JR 4006 "22ND" AV HILLCRESTHEIGHTS MD
    "630-4937")
("764840263486" SMITH ALFREDA O O O O O HUNTINGTOWN MD "855-7396")
("764840263639" SMITH ALICE E MRS 5299 "85TH" AV NEWCARROLLTON MD
    "459-3185")
("764840263227" SMITH ALICE L MRS 900 OPUS AV CAPITOLHEIGHTS MD
    "420-1505")
("764840263762" SMITH ALICE M MISS 10401 GROSVENOR PL ROCKVILLE MD
    "493-9316")
("764840263528" SMITH ALISON O O 9368 CANTERBURYRIDING O LAUREL MD
    "725-7855")
("764840263762" SMITH ALLAN O O 5520 DOWGATE CT ROCKVILLE MD
    "984-9584")
("764840263269" SMITH ALLAN O O 2901 NEEDLEWOOD LN BOWIE MD
    "249-7228")
("764840263745" SMITH ALLAN C O 13209 BANBURY PL SILVERSPRING MD
    "384-8128")
("764840463745" SMITH HELEN B O 13209 BANBURY PL SILVERSPRING MD
    "384-8128")
("764840263877" SMITH ALLAN RICHARD MAJ 12200 WHEELING V UPPERMARLBORO
    MD "627-6487")
("764840263367" SMITH ALLAN T O 12511 PARKTON ST FORTWASHINGTON MD
    "292-0520")
("764840263269" SMITH ALLAN W O 2901 NEEDLEWOOD LN BOWIE MD
    "249-5851")
("764840863269" SMITH VALERIA B O 2901 NEEDLEWOOD LN BOWIE MD
    "249-5851")
("764840263925" SMITH ALLEN O O 2644 HAMILTON PL WALDORF MD
    "843-0949")
("764840263243" SMITH ALLEN C O 2312 ASHBORO DR CHEVYCHASE MD
    "588-2163")
("764840263492" SMITH ALLEN K MRS 2029 ROANOKE O HYATTSVILLE MD
    "422-3779")
("764840263252" SMITH ALLEN L O 11385 JOHNHOPKINS RD CLARKSVILLE MD
    "776-3697")
("764840263269" SMITH ALLEN N O 2703 FEDERAL LA BOWIE MD "262-1706")
("764840263334" SMITH ALLEN R O 4198 CARRSRIDGE RD EDGEWATER MD
    "798-1774")
("764840263696" SMITH ALLEN T O 1111 KENEBEC ST OXONHILL MD
    "839-5164")
("764840263263" SMITH ALLEN T O "4266-2" WILMINGTON DR
    ANDREWSAIRFORCEBASE MD "599-8948")
("764840263745" SMITH ALONZO O "JR LT COL" 12504 KUHL RD SILVERSPRING
    MD "949-2934")
("764840263276" SMITH ALONZO I O O PALISADES O CROWNSVILLE MD
    "923-3253")
("764840263745" SMITH ALVAN M O 401 UNIVERSITY BLVD SILVERSPRING MD
    "439-0470")
("764840263748" SMITH ALVIN O O 6317 LONGFELLOW ST RIVERDALE MD
    "277-3891")
("764840263784" SMITH ALYCE R O 3901 SUITLAND RD SUITLAND MD
    "967-6476")
("764840263745" SMITH AMELIA L MRS 9314 SUDBURY RD SILVERSPRING MD
    "589-3373")
("764840263696" SMITH ANDREW O O 1100 OWENS RD OXONHILL MD "567-3256")
("764840263762" SMITH ANDREW O "AND KIM" 13207 TWINBROOK PKWY
    ROCKVILLE MD "468-1972")
("764840263424" SMITH ANDREW B O 15714 ANCIENTOAK DR GAITHERSBURG MD
    "963-3133")
("764840263642" SMITH ANDREW H O 1515 JONATHAN O MICHIGANPARKHILLS MD
    "559-3244")
("764840263424" SMITH ANDREW J O 19528 BRASSIE PL GAITHERSBURG MD
    "963-1297")

("764840263877" SMITH ANDREW J O 9805 TAMOSHANTER DR UPPERMARLBORO MD
"868-6771")
("764840263243" SMITH ANDREW M O 3705 THORNAPPLE O CHEVYCHASE MD
"654-3083")
("764840263337" SMITH ANDREW P O 15752 BUENAVISTA DR DERWOOD MD
"977-4186")
("764840263526" SMITH ANGELA R O 3990 WARNER AV LANDOVER MD
"772-3622")
("764840263925" SMITH ANITA R MRS O O O WALDORF MD "645-7785")
("764840263745" SMITH ANN O "AND RAY" 1220 EASTWEST HWY SILVERSPRING
MD "588-8863")
("764840263745" SMITH ANN O O 8802 LANIER DR SILVERSPRING MD
"588-5708")
("764840263742" SMITH ANN L O 5210 ALJONES DR SHADYSIDE MD "261-9226")
("764840263745" SMITH ANN ROWE MRS 8712 COLESVILLE RD SILVERSPRING MD
"588-9359")
("764840263367" SMITH ANNE O "AND FRANK COLONEL" 4544 ENGLISH V
FORTMEADE MD "674-5126")
("764840263784" SMITH ANNIE B O 4603 NAVYDAY PL SUITLAND MD
"568-8591")
("764840263696" SMITH ANNIE C O 7720 LOUDON DR OXONHILL MD "248-5123")
("764840263347" SMITH ANNIE L O 6700 ALPINE ST DISTRICTHEIGHTS MD
"568-1175")
("764840263367" SMITH ANNIE R O 3209 WALTERS LN FORESTVILLE MD
"735-6057")
("764840263762" SMITH ANSON B CPA 6406 NEEDLELEAF DR ROCKVILLE MD
"984-9653")
("764840263265" SMITH ANTHONY O O 11226 AVALANCHE WAY COLUMBIA MD
"730-9444")
("764840263349" SMITH ANTHONY A "BRIG GEN" 5717 ABERDEEN RD BETHESDA
MD "951-9527")
("764840263836" SMITH ANTHONY L O 5947 FISHER D TEMPLEHILLS MD
"630-7870")
("764840263745" SMITH ANTHONY N "AND YOLANDE" 818 MIDLAND RD
SILVERSPRING MD "384-4910")
("764840263526" SMITH ARCHIBALD O O 6810 TREXLER RD LANHAM MD
"345-1641")
("764840263877" SMITH ARCHIE L O 12614 SHOLTON ST UPPERMARLBORO MD
"249-7316")
("764840263265" SMITH ARDEN N O 11001 WILLOWBOTTOM DR COLUMBIA MD
"997-2765")
("764840263877" SMITH ART O O 2300 CRAIN HWY UPPERMARLBORO MD
"952-0991")
("764840263762" SMITH ART O O 905 LEVERTON RD ROCKVILLE MD "424-7838")
("764840263745" SMITH ARTHUR A MRS 3242 GLENEGLASS DR SILVERSPRING MD
"598-7758")
("764840263452" SMITH ARTHUR D O 9856 FIREWATER RD IJAMSVILLE MD
"831-8684")
("764840263762" SMITH ARTHUR D O 321 TAYLOR AV ROCKVILLE MD
"340-0977")
("764840263762" SMITH ARTHUR D O 321 TAYLOR AV ROCKVILLE MD
"340-0977")
("764840263732" SMITH ARTHUR E O 6914 DRYLOG O SEATPLEASANT MD
"336-4275")
("764840263694" SMITH ARTHUR E O O O O OWINGS MD "855-8317")
("764840263268" SMITH ARTHUR H O 4142 BUNKERHILL RD COTTAGECITY MD
"277-7499")
("764840263328" SMITH ARTHUR H O 731 PETERSBURG DR DAVIDSONVILLE MD
"789-1962")
("764840263243" SMITH ARTHUR J O 7000 VALLEY PL CHEVYCHASE MD
"654-1087")
("764840263238" SMITH ARTHUR JENSON O 6008 WYNNWOOD RD BETHESDA MD
"229-8710")
("764840263526" SMITH ARTHUR JOS JR O O O LANHAM MD "552-3221")
("764840263762" SMITH ARTHUR M O 12103 OTIS DR ROCKVILLE MD
"984-5736")
("764840263732" SMITH ARTHUR M O 1111 WATERFORD DR SEATPLEASANT MD
"336-7452")
("764840263925" SMITH ARTHUR R O 1201 TRUMAN CT WALDORF MD "843-6003")
("764840263526" SMITH ARTHUR T O 7012 TAYLOR O LANDOVERHILLS MD
"772-2974")

("764840263424" SMITH ASBURY O REV 401 RUSSELL AV GAITHERSBURG MD
    "948-4939")
("764840263762" SMITH ASHBY W MD 14519 FARADAY RD ROCKVILLE MD
    "871-6311")
("764840263745" SMITH ASHLEY E "AND CARL M" 13401 CANYON TERR
    SILVERSPRING MD "384-3633")
("764840263463" SMITH AUBREY B O O SOUTHPOPLAR LA INDIANHEAD MD
    "743-3742")
("764840263265" SMITH AUBREY W O 3508 MARLBORO WAY COLLEGEPARK MD
    "935-2893")
("764840263745" SMITH AUDREY O O 691 CONCERTO LN SILVERSPRING MD
    "593-4958")
("764840263473" SMITH AUDREY O O 122 WESTWAY DR GREENBELT MD
    "474-0487")
("764840263745" SMITH AUDREY C O 1925 ROSEMARYHILLS DR SILVERSPRING MD
    "587-1707")
("764840263243" SMITH AUGUSTINE "V P" O 3722 MANOR RD CHEVYCHASE MD
    "656-4841")
("764840263745" SMITH AURELIA J O 11200 LOCKWOOD DR SILVERSPRING MD
    "681-8018")
("764840263727" SMITH AUSTIN C O 1400 LEGATION RD SARGENTKNOLLS MD
    "559-4027")
("764840263279" SMITH B O O 21 BOXWOOD CIR BRYANSROAD MD "283-2377")
("764840263276" SMITH B O O 6450 BROOKS LN BROOKEPARK MD "229-7166")
("764840263745" SMITH B O O 2408 COLSTON DR SILVERSPRING MD
    "588-7360")
("764840263473" SMITH B O O "28-A" CRESCENT RD GREENBELT MD
    "474-7136")
("764840263243" SMITH B O O 4918 DORSET AV CHEVYCHASE MD "657-3409")
("764840263745" SMITH B O O 10610 DUNMOOR DR SILVERSPRING MD
    "593-8480")
("764840263784" SMITH B O O 2914 EAST AV SUITLAND MD "735-0477")
("764840263227" SMITH B O O 1204 FOYER AV CAPITOLHEIGHTS MD
    "736-6692")
("764840263528" SMITH B O O 3575 FORTMEADE RD LAUREL MD "776-1575")
("764840263492" SMITH B O O 503 GREENLAWN DR HYATTSVILLE MD
    "270-5312")
("764840263748" SMITH B O O 6203 GREENVALE PKWY RIVERDALE MD
    "699-5131")
("764840263745" SMITH B O O 1420 HAMPSHIRE CT SILVERSPRING MD
    "434-8563")
("764840263696" SMITH B O O 1140 KENEBEC ST OXONHILL MD "567-9441")
("764840263745" SMITH B O O 11993 OLDCOLUMBIA PIKE SILVERSPRING MD
    "622-9455")
("764840263473" SMITH B O O "15-C" PARKWAY RD GREENBELT MD "474-8021")
("764840263424" SMITH B O O 3 REDKILN CT GAITHERSBURG MD "869-4617")
("764840263424" SMITH B O O 447 WESTDIAMOND AV GAITHERSBURG MD
    "963-4274")
("764840263243" SMITH B O O 3125 WINNETT RD CHEVYCHASE MD "654-9221")
("764840263367" SMITH B A O 2130 BROOKS DR FORESTVILLE MD "736-0745")
("764840263243" SMITH B O O 3710 "29TH" ST CHESAPEAKEBEACH MD
    "855-8563")
("764840263265" SMITH B A O 10528 CROSSFOX LN COLUMBIA MD "997-0682")
("764840263326" SMITH B A O 10013 DORANGO DR DAMASCAS MD "253-4718")
("764840263326" SMITH B A O 23700 PLEASANTVIEW LA DAMASCAS MD
    "253-3572")
("764840263864" SMITH B A O 4409 TUCKERMAN O UNIVERSITYPARK MD
    "927-3234")
("764840263347" SMITH B C O 5296 MARLBORO PIKE DISTRICTHEIGHTS MD
    "420-7245")
("764840263745" SMITH B C O 1605 MYRTLE RD SILVERSPRING MD "681-7380")
("764840263648" SMITH B DEAN O 11907 PROGRESS LN,MITCHELVILLE MD
    "464-8741")
("764840263745" SMITH B E O 2308 GLENMONT CIR SILVERSPRING MD
    "933-5461")
("764840263745" SMITH B E O 11709 MENTONE RD SILVERSPRING MD
    "933-1458")
("764840263265" SMITH B F O 9216 SAINTANDREWS PL COLLEGEPARK MD
    "935-5597")
("764840263768" SMITH B G O 9301 BENTRIDGE AV POTOMAC MD "251-0639")
("764840263696" SMITH B G O 721 CRAWFORD O OXONHILL MD "839-3587")

("764840263463" SMITH B H O O BRYANS RD INDIANHEADMANOR MD "375-9121")
("764840263263" SMITH B H O "5121-B" JABARA CT ANDREWSAFB MD
    "599-1452")
("764840263762" SMITH B H O 118 MONROE ST ROCKVILLE MD "340-9724")
("764840263668" SMITH B J O 201 LOOKOUT AV MOUNTAIRY MD "831-5176")
("764840263694" SMITH B J O O O O OWINGS MD "855-8271")
("764840263762" SMITH B J O 5906 VANDEGRAFT AV ROCKVILLE MD
    "984-0898")
("764840263748" SMITH B J O 5610 "54TH" AV RIVERDALE MD "779-5289")
("764840263492" SMITH B J O 5025 "54TH" PL HYATTSVILLE MD "864-8358")
("764840263745" SMITH B J "LT COL" 3439 LEISUREWORLD BLVD
    SILVERSPRING MD "598-7125")
("764840263287" SMITH B L O 3913 BLACKBURN D BURTONSVILLE MD
    "421-1531")
("764840263745" SMITH B L O 10708 GLENHAVEN DR SILVERSPRING MD
    "649-1754")
("764840263227" SMITH B L O 1310 KAREN BLVD CAPITOLHEIGHTS MD
    "350-5141")
("764840263492" SMITH B L O 2723 NICHOLSON LN HYATTSVILLE MD
    "853-2561")
("764840263424" SMITH B L O 28 NORTHSUMMIT AV GAITHERSBURG MD
    "963-3780")
("764840263762" SMITH B L O 5116 PARKLAWN TERR ROCKVILLE MD
    "468-1188")
("764840263668" SMITH B L O 5319 POMMEL DR MOUNTAIRY MD "831-7564")
("764840263696" SMITH B L O 9013 TAYLOR LN OXONHILL MD "567-3375")
("764840263943" SMITH B M O 2220 DRURY RD WHEATON MD "924-2382")
("764840263492" SMITH B R O 3540 MADISON ST HYATTSVILLE MD "559-3660")
("764840263745" SMITH B S O 11469 COLUMBIA PIKE SILVERSPRING MD
    "681-6853")
("764840263242" SMITH B T O 1306 FARMINGDALE AV CHAPELOAKS MD
    "772-3829")
("764840263367" SMITH B T O "7628-B" PALMER CT FORTMEADE MD
    "672-3720")
("764840263263" SMITH B W O 4625 MAPLE CT ANDREWSAFB MD "599-6758")
("764840263334" SMITH B W O 3963 RAMSEY DR EDGEWATER MD "798-1630")
("764840263745" SMITH B WINFORD O 504 ELDERWOOD RD SILVERSPRING MD
    "384-6640")
("764840263367" SMITH BARBARA O O 2505 CORNING V FORTWASHINGTON MD
    "894-6476")
("764840263424" SMITH BARBARA A O 18431 LOSTKNIFE CIR GAITHERSBURG MD
    "926-4671")
("764840263367" SMITH BARBARA A O 9411 CASTLE DR FORESTVILLE MD
    "568-8042")
("764840263334" SMITH BARBARA A O 1871 EDGEWATER DR EDGEWOOD MD
    "676-9481")
("764840263925" SMITH BARBARA A O O O O WALDORF MD "843-8329")
("764840263425" SMITH BARBARA ANN O O O O GALESVILLE MD "261-5787")
("764840263768" SMITH BARBARA B O 8709 FALLS RD POTOMAC MD "299-4110")
("764840263254" SMITH BARBARA H O 8704 BRAZKE CT CLINTON MD
    "856-2982")
("764840263762" SMITH BARBARA K MRS 7753 SCOTLAND DR ROCKVILLE MD
    "299-7942")
("764840263925" SMITH BARBRA E O 1301 WILSON RD WALDORF MD "645-4920")
("764840263528" SMITH BARRETT G O 9718 WHISKEY RUN LAUREL MD
    "776-8433")
("764840263367" SMITH BARRY O O "8424-E" DODD CT FORTMEADE MD
    "674-4188")
("764840263424" SMITH BARRY B "AND CAROLYN" 9736 WHETSTONE DR
    GAITHERSBURG MD "840-1095")
("764840263528" SMITH BARRY D O 12206 VALERIE LN LAUREL MD "776-3983")
("764840263473" SMITH BARRY E O "7-D" RESEARCH RD GREENBELT MD
    "474-5826")
("764840263265" SMITH BARRY J O 5246 HAYLEDGE CT COLUMBIA MD
    "982-1485")
("764840263492" SMITH BASCOM D O 5015 "38TH" AV HYATTSVILLE MD
    "864-9321")
("764840263668" SMITH BEA PACE O 3400 RHODEISLAND AV MOUNTRANIER MD
    "864-6755")
("764840263222" SMITH BEAMON O O O FARMINGTON RD ACCOKEEK MD
    "292-5402")

("764840263732" SMITH BEATRICE O O 6408 GREIG ST SEATPLEASANT MD
    "925-4164")
("764840263762" SMITH BEATRICE O O 702 STONESTRUT AV ROCKVILLE MD
    "762-1918")
("764840263745" SMITH BEATRICE D O 1111 ARCOLA AV SILVERSPRING MD
    "649-5380")
("764840263235" SMITH BELINDA G O O O O BELALTON MD "932-1252")
("764840263768" SMITH BELLE D O 12840 HUNTSMAN WAY POTOMAC MD
    "424-4849")
("764840263526" SMITH BEN O O 7525 NEWBURY LN LANHAM MD "552-1302")
("764840263238" SMITH BEN O "& REGINA" 5605 OAKMONT AV BETHESDA MD
    "530-6769")
("764840263745" SMITH BEN M O 1110 FIDLER LN SILVERSPRING MD
    "589-4834")
("764840263745" SMITH BENJAMIN O O 8750 GEORGIA AV SILVERSPRING MD
    "588-5726")
("764840263656" SMITH BENJAMIN J O 3900 QUEENMARY DR OLNEY MD
    "774-2438")
("764840263696" SMITH BENNY O O 826 SHELBY DR OXONHILL MD "567-6873")
("764840263526" SMITH BERL L O 6602 CIPRIANO RD LANHAM MD "552-3621")
("764840263269" SMITH BERNADINE C MRS 3044 TRAYMORE N BOWIE MD
    "262-8054")
("764840263254" SMITH BERNARD O O 9502 BEVERLY AV CLINTON MD
    "868-0761")
("764840263784" SMITH BERNARD O O 2303 BROOKS DR SUITLAND MD
    "967-2936")
("764840263437" SMITH BERNARD H O 18622 MATENEY RD GERMANTOWN MD
    "428-3310")
("764840263762" SMITH BERNARD J O 1103 HIGHWOOD D ROCKVILLE MD
    "424-4177")
("764840263639" SMITH BERNARD J O 6210 "87TH" AV NEWCARROLLTON MD
    "577-0238")
("764840263745" SMITH BERNARD P JR 10606 DUNMOR DR SILVERSPRING MD
    "593-6081")
("764840263784" SMITH BERNICE O O 2309 WYNGATE RD SUITLAND MD
    "736-3963")
("764840263252" SMITH BERNICE L O 4249 "58TH" AV BLADENSBURG MD
    "699-9533")
("764840263745" SMITH BERNIE O O 3215 HEWITT AV SILVERSPRING MD
    "460-1197")
("764840263272" SMITH BERTHA A O 3915 ALTON ST BRADBURYHEIGHTS MD
    "568-734")
("764840263424" SMITH BERTHA M MRS 17803 MORNINGVIEW DR GAITHERSBURG
    MD "926-0836")
("764840263784" SMITH BERTHA O O 2140 BROOKS DR SUITLAND MD
    "568-6425")
("764840263424" SMITH BERTRAM A O 907 CLOPPER RD GAITHERSBURG MD
    "926-7879")
("764840263492" SMITH BESSIE O O 3801 WARNER AV HYATTSVILLE MD
    "322-3932")
("764840263445" SMITH BESSIE L MRS 3801 "28TH" AV HILLCRESTHEIGHTS MD
    "423-8456")
("764840263252" SMITH BESSIE W O 4115 "54TH" PL BLADENSBURG MD
    "864-0954")
("764840263745" SMITH BETH O O 11514 STEWART LN SILVERSPRING MD
    "622-4853")
("764840263696" SMITH BETTIE L O 1407 POTOMACHEIGHTS DR OXONHILL MD
    "248-8072")
("764840263243" SMITH BETTY O MRS 3535 CHEVYCHASELAKE DR CHEVYCHASE MD
    "642-7540")
("764840263745" SMITH BETTY J O 11502 BUCKNELL DR SILVERSPRING MD
    "933-0329")
("764840263242" SMITH BETTY J O 1306 CHAPEL LN CHAPELOAKS MD
    "773-0324")
("764840263424" SMITH BETTY L O 25413 JARL DR GAITHERSBURG MD
    "253-3693")
("764840263437" SMITH BEVERLY O O 20300 FREDERICK RD GERMANTOWN MD
    "972-4363")
("764840263453" SMITH BEVERLY A O 6432 WISCASSET RD GLENECHO MD
    "229-3416")

("764840263836" SMITH BEVERLY E O 2613 IVERSON ST TEMPLEHILLS MD
        "899-0769")
("764840263836" SMITH BEVERLY ROGERS O 1913 COLBROOK DR TEMPLEHILLS
        MD "394-1725")
("764840263784" SMITH BILL O O 3820 SWANN RD SUITLAND MD "420-0683")
("764840263445" SMITH BILL O O 3506 "27TH" AV HILLCRESTHEIGHTS MD
        "894-5481")
("764840263424" SMITH BILL G O 9250 HUMMINGBIRD TERR GAITHERSBURG MD
        "840-9096")
("764840263528" SMITH BILL M O 3341 OLDLINE AV LAUREL MD "725-8528")
("764840263437" SMITH BILLY O "AND KATHY" 19515 FREDERICK RD
        GERMANTOWN MD "972-4513")
("764840263536" SMITH BILLY R O 3320 GLENWAY DR KENSINGTON MD
        "949-0120")
("764840263877" SMITH BILLY R MAJ 8409 THORNBRY DR UPPERMARLBORO MD
        "627-6056")
("764840263265" SMITH BILLYE D O 8865 ROLLRIGHT CT COLUMBIA MD
        "596-4699")
("764840263492" SMITH BLAIR HANNA OFC 5303 BALTIMORE AV HYATTSVILLE
        MD "277-2700")
("764840263745" SMITH BLAKE O "AND KAREN" 13009 BRAHMS TERR
        SILVERSPRING MD "890-6372")
("764840263943" SMITH BOB O "AND TERRIE" 3909 PALMIRA LN WHEATON MD
        "946-7465")
("764840263424" SMITH BOB G O 811 QUINCEORCHARD BLVD GAITHERSBURG MD
        "926-6543")
("764840263536" SMITH BOBBI O "AND STAN" 3405 OBERON ST KENSINGTON MD
        "942-5034")
("764840263265" SMITH BOBBY O "AND TISH" 9922 EVERGREEN AV COLUMBIA
        MD "596-5152")
("764840263238" SMITH BOBBY W O 7005 CLARENDON RD BETHESDA MD
        "656-1307")
("764840263254" SMITH BOLLING W O 5400 TRENT ST CLINTON MD "868-1525")
("764840263492" SMITH BONNIE O O 1913 ERIE ST HYATTSVILLE MD
        "431-4654")
("764840263668" SMITH BOYCE A O 3109 ARUNDEL RD MOUNTRANIER MD
        "277-0790")
("764840263444" SMITH BOYD C O 13805 USROUTE108 O HIGHLAND MD
        "924-4060")
("764840263745" SMITH BRADLEY B O 1809 SHERWOOD RD SILVERSPRING MD
        "681-5255")
("764840263254" SMITH BRADLEY P O 6915 GROVETON DR CLINTON MD
        "868-7719")
("764840263925" SMITH BRADLEY W O 4226 QUIGLEY CT WALDORF MD
        "645-5276")
("764840263656" SMITH BRANDON R O 17649 PRINCEEDWARD DR OLNEY MD
        "774-3021")
("764840263773" SMITH BRANSON S O 16201 BATSON RD SPENCERVILLE MD
        "421-9821")
("764840263342" SMITH BRENDA O O 21045 BIGWOODS RD DICKERSON MD
        "972-7459")
("764840263367" SMITH BRENDA O O 5503 MARLBORO PIKE FORESTVILLE MD
        "420-9138")
("764840263768" SMITH BRENDA D MAJ 10821 HOBNAIL CT POTOMAC MD
        "229-2078")
("764840263745" SMITH BRENDA J MRS 2016 CRADOCK O SILVERSPRING MD
        "384-4018")
("764840263668" SMITH BRENT O O 3201 BUNKERHILL RD MOUNTRANIER MD
        "699-9130")
("764840263925" SMITH BRIAN O "AND GAYLE" 569 CAPTAINDEMENT DR
        WALDORF MD "843-0416")
("764840263437" SMITH BRIAN O O 20400 FREDERICK AV GERMANTOWN MD
        "972-9530")
("764840263745" SMITH BRIAN O O 1004 OSAGE ST SILVERSPRING MD
        "445-4626")
("764840263367" SMITH BRIAN O O 4435 RENA RD FORESTVILLE MD
        "568-6992")
("764840263492" SMITH BRIAN A O 4410 OGLETHORPE ST HYATTSVILLE MD
        "779-2592")
("764840263424" SMITH BRIAN C O 923 CLOPPER RD GAITHERSBURG MD
        "869-0534")

("764840263943" SMITH BRIAN D O 2403 LINDELL ST WHEATON MD "949-7365")
("764840263265" SMITH BRIAN E O 9352 CHERRYHILL RD COLLEGEPARK MD
    "345-1294")
("764840263265" SMITH BRIAN F O "246-9" LEONARDTOWN HALL COLLEGEPARK
    MD "277-8973")
("764840263437" SMITH BRIAN L O 18713 WINDINGCREEK PL GERMANTOWN MD
    "428-0304")
("764840263437" SMITH BRIAN L O 18713 WINDINGCREEK PL GERMANTOWN MD
    "428-0304")
("764840263745" SMITH BRIAN P O 25 WAYNE AV SILVERSPRING MD
    "589-2939")
("764840263473" SMITH BRIAN P O 9156 SPRINGHELL CT GREENBELT MD
    "345-7396")
("764840263745" SMITH BRIAN R O 8002 PARKCREST DR SILVERSPRING MD
    "587-1721")
("764840263745" SMITH BRIAN S O 8515 BRADFORD RD SILVERSPRING MD
    "585-0109")
("764840263269" SMITH BRIAN T O 2232 PRINCEOFWALES CT BOWIE MD
    "249-2588")
("764840263528" SMITH BRIAN W O O GORMAN RD LAUREL MD "490-5964")
("764840263424" SMITH BRINTON T O 10 DUNLITH CT GAITHERSBURG MD
    "251-6230")
("764840263238" SMITH BRITTON H O 10004 BROAD ST BETHESDA MD
    "530-0736")
("764840263762" SMITH BRUCE O "AND ANN" 12917 PENROSE O ROCKVILLE MD
    "942-8980")
("764840263745" SMITH BRUCE O O 8407 "16TH" ST SILVERSPRING MD
    "588-4546")
("764840263367" SMITH BRUCE A O "7342-E" BROWNELL AV FORTMEADE MD
    "674-7835")
("764840263463" SMITH BRUCE A O 23 GREENWOOD AV INDIANHEAD MD
    "743-7030")
("764840263226" SMITH BRUCE E "AND MARSHA G" 5103 BRINKLEY RD
    CAMPSPRINGS MD "449-6893")
("764840263937" SMITH BRUCE E O 5272 CHALKPOINT RD WESTRIVER MD
    "867-3518")
("764840263773" SMITH BRUCE E O 15716 THOMPSON RD SPENCERVILLE MD
    "384-0491")
("764840263238" SMITH BRUCE M O 5104 BATTERY LN BETHESDA MD
    "652-6498")
("764840263528" SMITH BRYAN C O 11730 LAUREL DR LAUREL MD "490-8928")
("764840263528" SMITH BRYAN J O 7010 BOCK RD LAUREL MD "567-7974")
("764840263762" SMITH BRYON O O 11400 STRAND DR ROCKVILLE MD
    "984-7224")
("764840263528" SMITH BURDETT O O O STANFIELD RD LAUREL MD "498-1894")
("764840263473" SMITH BURL O O "13-Q" HILLSIDE O GREENBELT MD
    "474-7291")
("764840263237" SMITH BURNACE S O 2910 UPLAND AV BERKSHIRE MD
    "736-5420")
("764840263424" SMITH BURTON O JR 10324 APPLERIDGE DR GAITHERSBURG MD
    "869-7158")
("764840263745" SMITH BURTON E O 2605 RANDOLPH RD SILVERSPRING MD
    "942-2336")
("764840263424" SMITH BYRON O O 722 CLOPPER RD GAITHERSBURG MD
    "963-4435")
("764840263243" SMITH BYRON O O 4701 WILLARD AV CHEVYCHASE MD
    "986-0129")
("764840263745" SMITH BYRON A O 2202 MARK CT SILVERSPRING MD
    "588-2542")
("764840263745" SMITH BYRON C O 54 CATOCTIN CT SILVERSPRING MD
    "598-5919")
("764840263528" SMITH C O O 9655 BALTIMORE AV LAUREL MD "776-3709")
("764840263825" SMITH C O O 725 BOUNDARY AV TAKOMAPARK MD "589-7734")
("764840263925" SMITH C O O 1506 BRYAN CT WALDORF MD "645-1036")
("764840263424" SMITH C O O 7413 CHROMEMINE RD GAITHERSBURG MD
    "253-4093")
("764840263233" SMITH C O O 902 CYPRESSTREE PL CEDARHEIGHTS MD
    "925-4837")
("764840263492" SMITH C O O 3622 DEAN DR HYATTSVILLE MD "559-1095")
("764840263227" SMITH C O O 523 DRUM AV CAPITOLHEIGHTS MD "967-3951")
("764840263745" SMITH C O O 5 FEATHERWOOD CT SILVERSPRING MD
    "622-4104")

```
("764840263745" SMITH C O O 14347 GEORGIA AV SILVERSPRING MD
    "460-4757")
("764840263254" SMITH C O O 5809 GWYNDLE PL CLINTON MD "599-6739")
("764840263486" SMITH C O O O O O HUNTINGTOWN MD "579-6251")
("764840263696" SMITH C O O 7819 KARLA LN OXONHILL MD "567-5753")
("764840263347" SMITH C O O 5002 LEEJAY DR DISTRICTHEIGHTS MD
    "735-3817")
("764840263347" SMITH C O O 5533 MARLBORO PIKE DISTRICTHEIGHTS MD
    "967-2682")
("764840263762" SMITH C O O 4208 NORBECK RD ROCKVILLE MD "929-1213")
("764840263437" SMITH C O O 212 PINERIDGE CT GERMANTOWN MD "972-4357")
("764840263492" SMITH C O O 1521 RAY RD HYATTSVILLE MD "559-3781")
("764840263473" SMITH C O O 404 RIDGE RD GREENBELT MD "474-4174")
("764840263745" SMITH C O O 2422 ROSS RD SILVERSPRING MD "589-3850")
("764840263528" SMITH C O "AND K" 104 SHARON CT LAUREL MD "776-0407")
("764840263745" SMITH C O O 626 SILVERSPRING AV SILVERSPRING MD
    "588-3986")
("764840263528" SMITH C O O O WELSHTRAILERPARK O LAUREL MD "776-5013")
("764840263445" SMITH C O O 4032 "23RD" PKWY HILLCRESTHEIGHTS MD
    "630-1703")
("764840263492" SMITH C O O 5735 "29TH" AV HYATTSVILLE MD "559-0209")
("764840263877" SMITH C O JR 800 CARRY PL UPPERMARLBORO MD "350-0787")
("764840263696" SMITH C A O 2218 ALICE AV OXONHILL MD "894-3768")
("764840263367" SMITH C A O O BUILDING-9804 O FORTMEADE MD "672-1879")
("764840263668" SMITH C A O 3310 BUCHANNON ST MOUNTRANIER MD
    "927-1032")
("764840263484" SMITH C A O O O O HUGHESVILLE MD "870-2355")
("764840263367" SMITH C A O 7317 LANHAM LN FORTWASHINGTON MD
    "449-4149")
("764840263748" SMITH C A O 5600 LONGFELLOW ST RIVERDALE MD
    "277-1431")
("764840263233" SMITH C A O 7980 NEWRIGGS RD ADELPHI MD "439-4108")
("764840263269" SMITH C A O 4404 OLANDO LN BOWIE MD "464-0029")
("764840263696" SMITH C A O 12220 PARKTON ST OXONHILL MD "292-3078")
("764840263745" SMITH C A O 9115 PROVIDENCE AV SILVERSPRING MD
    "585-4409")
("764840263424" SMITH C D O 19411 BRASSIE PL GAITHERSBURG MD
    "963-0251")
("764840263473" SMITH C D O 5923 CHERRYWOOD TERR GREENBELT MD
    "474-9117")
("764840263528" SMITH C D O 9037 CONTEE RD LAUREL MD "490-1551")
("764840263762" SMITH C D O 118 MONROE ST ROCKVILLE MD "340-3389")
("764840263745" SMITH C D O 8860 PINEYBRANCH RD SILVERSPRING MD
    "445-4931")
("764840263762" SMITH C D O 12229 VILLAGESQUARE TERR ROCKVILLE MD
    "468-6520")
("764840263745" SMITH C DOERR O 11412 STEWART LN SILVERSPRING MD
    "622-0719")
("764840263877" SMITH C E O 9300 CROOMACRES TERR UPPERMARLBORO MD
    "952-1213")
("764840263825" SMITH C E O 8514 GREENWOOD AV TAKOMAPARK MD
    "589-9326")
("764840263825" SMITH C E O 502 TULIP AV TAKOMAPARK MD "270-6190")
("764840263944" SMITH C F O O SPRINGVALLEY O WHITEPLAINS MD
    "843-6585")
("764840263745" SMITH C G O 3726 RALPH RD SILVERSPRING MD "946-1596")
("764840263492" SMITH C H O 5321 CHESAPEAKE RD HYATTSVILLE MD
    "277-1947")))
    (RDS)
```

Appendix D

```
$ TWOS
((2 A) (255 ALL) (27 AS) (28 AT) (26 AM) (26 AN) (263 AND) (273 ARE) (2576
ALSO) (2866 ATOM) (2843 AVID) (2929 AWAY) (2947 AXIS) (2223 BABE) (2225 BACK)
(224 BAG) (2248 BAIT) (2253 BAKE) (2264 BANG) (2265 BANK) (2272 BARB) (2276
BARN) (22742 BASIC) (2295 BAWL) (2323 BEAD) (2328 BEAT) (2336 BEEN) (2337 BEER
) (2338 BEET) (234 BEG) (23446 BEGIN) (2358 BELT) (2363 BEND) (2378 BEST) (238
BET) (238837 BETTER) (2437 BIER) (244 BIG) (2453 BIKE) (2463 BIND) (2473 BIRD)
(248 BIT) (2522 BLAB) (2562 BLOB) (2569 BLOW) (2587 BLUR) (2639 BODY) (2645
BOIL) (2655 BOLL) (2656 BOLO) (2658 BOLT) (2669 BONY) (2668 BOOT) (2677 BOSS)
(2684 BOTH) (2688 BOUT) (2723 BRAD) (2726 BRAN) (2744 BRIG) (2746 BRIM) (2825
BUCK) (284 BUG) (2852 BULB) (2867 BUMP) (2865 BUNK) (2876 BURN) (2874 BUSH) (
2888 BUTT) (289 BUY) (2899 BUZZ) (29 BY) (222 CAB) (2243 CAGE) (2268 CANT) (
2274 CASH) (2283 CAVE) (2428 CHAT) (2433 CHEF) (2439 CHEW) (2442 CHIC) (2447
CHIP) (2467 CHOP) (2469 CHOW) (2484 CHUG) (2526 CLAM) (2527 CLAP) (2529 CLAW)
(2533 CLEF) (2547 CLIP) (2563 CLOD) (2564 CLOG) (2582 CLUB) (2628 COAT) (2626
COCO) (2667 COOP) (267 COP) (2679 COPY) (2675 CORK) (2678 COST) (268 COT) (
2699 COZY) (2722 CRAB) (2724 CRAG) (2742 CRIB) (2767 CROP) (279 CRY) (2823
CUBE) (282 CUB) (2872 CURB) (2875 CURL) (2883 CUTE) (2978 CYST) (2927 CZAR) (
2686879 COUNTRY) (27696 BROWN)))

$

MATCHED-TWOS
((23 BE AD) (228 ACT BAT) (2326 BEAM BEAN) (2327 AFAR BEAR) (2325 BEAK BECK) (
233 ADD BED BEE) (243 AID AGE BID) (246 AGO BIN) (262 BOA BOB) (2663 COME BOND
BONE) (2666 BOOM BOON) (286 BUM BUN) (2879 BURY BUSY) (223 BAD CAD) (2253 ABLE
BAKE BALD BALE CAKE CALF) (2255 BALK BALL CALK CALL) (2256 BALM CALM) (226 CAN
CAM) (2263 BAND CANE) (227 BAR CAR CAP) (2277 BASS CARP) (2273 CARE CASE BASE
CARD BARE CAPE) (2275 BARK BASK CASK) (2278 CART CAST) (229 BAY CAW) (2333
BEEF CEDE) (2355 BELL CELL) (2368 BENT CENT) (2427 BIAS CHAP CHAR) (2483 BITE
CITE) (2568 BLOT CLOT) (2583 BLUE CLUE) (2625 COAL COCK) (2633 CODE BODE) (264
BOG COG) (2653 BOLD COLD COKE) (2662 COMA COMB COKE) (266 BOO CON COO) (2665
BOOK COOK COOL) (2673 BORE COPE CORD) (269 ANY BOY BOX BOW COW COY) (2729 BRAY
CRAW) (2739 BREW CREW) (2769 BROW CROW) (283 ATE BUD CUE CUD) (2833 BUFF CUFF)
(2855 BULK BULL CULL) (287 BUS CUP CUR) (2878 BUST CURT) (2877 BURR CUSP CUSS)
(288 BUT CUT))
THREES
((3227 DABS) (3237 DADS) (3232 DADA) (3236 DADO) (3238 DAFT) (3266 DAMN) (3265
DANK) (3274 DASH) (329 DAY) (3297 DAYS) (3293 DAZE) (332 DEB) (3333 DEED) (
3338 DEFT) (3368 DENT) (3369 DENY) (3399 DEWY) (3469 DHOW) (3427 DIBS) (343
DIE) (3437 DIES) (3438 DIET) (3467 DIMS) (3464 DING) (3465 DINK) (3468 DINT) (
347 DIP) (3477 DIPS) (3472 DISC) (3475 DISK) (3625 DOCK) (3636 DODO) (3633
DOFF) (3658 DOLT) (366 DON) (3664 DONG) (3666 DOOM) (3696 DOWN) (3693 DOZE) (
3722 DRAB) (3724 DRAG) (3739 DREW) (3747 DRIP) (3784 DRUG) (3786 DRUM) (3797
DRYS) (382 DUB) (3827 DUBS) (3828 DUCT) (3838 DUET) (384 DUG) (3853 DUKE) (
3862 DUMB) (3859 DULY) (3867 DUMP) (3864 DUNG) (3865 DUNK) (3875 DUSK) (3878
DUST) (3889 DUTY) (3923 DYAD) (3224 EACH) (3277 EARS) (3279 EASY) (3287 EATS)
(3343 EDGE) (3348 EDIT) (334 EEG) (3557 ELLS) (356 ELM) (3573 ELSE) (3648 EMIT
) (3742 EPIC) (372 ERA) (3727 ERAS) (373 ERE) (3746 ERGO) (3743 ERIE) (3866
ETON) (3836 EVEN) (3845 EVIL) (39 EX) (3926 EXAM) (3932 EXEC) (3948 EXIT) (
3223 FACE) (3228 FACT) (3233 FADE) (3245 FAIL) (3255 FALL) (3264 FANG) (324
FBI) (3358 FELT) (3335 FEEL) (3363 FEND) (3376 FERN) (3383 FEUD) (342 FIB) (
348 FIT) (3456 FILM) (3476 FIRM) (349 FIX) (3499 FIZZ) (3522 FLAB) (3524 FLAG)
(3525 FLAK) (3527 FLAP) (3528 FLAT) (3532 FLEA) (3533 FLEE) (3539 FLEX) (3547
FLIP) (3548 FLIT) (3564 FLOG) (3569 FLOW) (358 FLU) (3582 FLUB) (3589 FLUX) (
359 FLY) (3626 FOAM) (3649 FOGY) (3645 FOIL) (3668 FOOT) (3665 FOOL) (367 FOR)
(3675 FORK) (3676 FORM) (3678 FORT) (3685 FOUL) (369 FOX) (3728 FRAT) (3733
FREE) (3738 FRET) (3764 FROG) (3766 FROM) (387 FUR) (3879 FURY) (3877 FUSS) (
3899 FUZZ))

$
```

$ MATCHED-THREES
(((3 E F) (3267 DAMP DAMS) (3282 DATA DAUB) (3323 DEAD DEAF) (3325 DEAL DECK) (
3326 DEAN DECO) (3337 DEEP DEER) (3425 DIAL DICK) (3667 DONS DOOR) (3683 DOTE
DOVE) (3825 DUAL DUCK) (3833 DUDE DUFF) (3275 DARK EARL) (3276 DARN EARN) (322
DAB EBB) (3339 DEFY EDDY) (3336 DEEM EDEN) (3423 DIAD DICE EGAD) (353 EKE ELF)
(355 ELK ELL) (35 DJ EL) (3647 DOGS EMIR) (368 DOT EMU) (3767 DROP EROS) (377
ERR ESP) (383 DUE EVE) (3837 DUES EVER) (393 DYE EWE EYE) (3937 DYES EYES) (
323 DAD FAD) (3246 ECHO FAIN) (3247 DAIS FAIR) (3253 DALE FAKE) (3263 DAME
DANE FAME) (326 DAM FAN) (327 EAR FAR) (3273 DARE EASE FARE) (3296 DAWN FAWN)
(3278 DART EAST FAST) (328 EAT EAU FAT) (3283 DATE EAVE FATE) (3327 DEAR FEAR)
(3328 DEBT FEAT) (333 FED FEE) (3355 DELL FELL) (339 DEW FEW) (344 DIG EGG FIG
) (3447 DIGS FIGS) (3453 DIKE FILE) (3455 DILL FILL) (346 DIM DIN EGO FIN) (
3463 DIME DINE FIND FINE) (3473 DIRE FIRE) (3474 DISH FISH) (3478 DIRT FIST) (
3483 DIVE FIVE) (3526 ELAN FLAM) (3529 FLAW FLAX) (36 DO EN FM) (362 DNA FOB)
(363 DOE EMF FOE) (3637 DOER DOES ENDS FOES) (364 DOG FOG) (3655 DOLL FOLK) (
3653 DOLE FOLD) (3663 DOME DONE FOND) (3673 DOPE DOSE FORD FORE) (3687 DOTS
DOUR FOUR) (3726 DRAM FRAN) (3729 DRAW FRAY) (379 DRY FRY) (3855 DULL FULL) (
386 DUN DUO FUN) (3863 DUNE FUME FUND) (3873 DUPE FUSE))
FOURS
((4843 HUGE) (48 IT) (437 HER) (438 GET) (4 I) (44 HI) (469 HOW) (47 IS) (4686
INTO) (422 GAB) (4233 GAFF) (4243 GAGE) (4246 GAIN) (4248 GAIT) (4252 GALA) (
4269 GAMY) (4272 GARB) (433 GEE) (4363 GENE) (4387 GETS) (4423 GIBE) (4438
GIFT) (444 GIG) (4475 GIRL) (4478 GIST) (4533 GLEE) (4536 GLEN) (4542 GLIB) (
4562 GLOB) (4569 GLOW) (4583 GLUE) (4586 GLUM) (4588 GLUT) (4623 GOAD) (4625
GOAL) (462 GOB) (4664 GONG) (4679 GORY) (4696 GOWN) (4722 GRAB) (4726 GRAM) (
4729 GRAY) (4739 GREW) (4743 GRID) (4748 GRIT) (4769 GROW) (4782 GRUB) (4853
GULF) (4857 GULP) (496 GYM) (4225 HACK) (4238 HAFT) (4245 HAIL) (4256 HALO) (
4258 HALT) (426 HAM) (4275 HARK) (4276 HARM) (428 HAT) (4285 HAUL) (4299 HAZY)
(4323 HEAD) (4325 HEAL) (4328 HEAT) (4333 HEED) (4335 HEEL) (4338 HEFT) (4347
HEIR) (4355 HELL) (4356 HELM) (4357 HELP) (4367 HEMP) (4372 HERB) (4377 HERS)
(4433 HIDE) (4444 HIGH) (4463 HIND) (4468 HINT) (447 HIS) (4477 HISS) (448 HIT
) (4487 HITS) (464 HOG) (4668 HOOT) (467 HOP) (4676 HORN) (4678 HOST) (4687
HOUR) (4695 HOWL) (482 HUB) (483 HUE) (4833 HUFF) (484 HUG) (4837 HUES) (4847
HUGS) (4864 HUNG) (4865 HUNK) (4868 HUNT) (4966 HYMN) (4976 HYPO) (4239 IBEX)
(4237 ICES) (4332 IDEA) (4365 IDOL) (455 ILL) (4624 INCH) (465 INK) (4682 IOTA
) (473 IRE) (475 IRK) (4766 IRON) (487 ITS))

$

MATCHED-FOURS
((4273 HARD GAPE) (446 HIM GIN) (46 IN GO) (4628 GNAT GOAT) (468 HOT GNU GOT)
(4746 GRIM GRIN) (424 GAG HAG) (4253 GALE HALE HALF) (4255 GALL HALL) (4263
GAME HAND) (4264 GANG HANG) (427 GAP GAS HAS) (4274 GASH HASH) (4277 GASP HARP
HASP) (4283 HAVE GATE GAVE HATE) (4295 GAWK HAWK) (4293 GAZE HAZE) (43 IF HE)
(4327 GEAR HEAP HEAR) (436 GEM HEM HEN) (4373 HERD HERE) (4376 GERM HERO) (439
HEW HEX HEY) (4453 GILD HIKE) (4455 GILL HILL) (4458 GILT HILT) (4473 GIRD
HIRE) (4483 GIVE HIVE) (4629 GNAW HOAX) (463 GOD HOD HOE) (4653 GOLD GOLF HOLD
HOLE) (4663 GOOD HOME GONE HONE GOOF HOOD HOOF) (4665 HONK HOOK) (4673 HOPE
GORE HOSE) (4855 GULL HULK HULL) (486 GUM GUN HUM) (4867 HUMS HUMP) (4878 GUST
HURT) (4874 GUSH HUSH) (4875 HURL HUSK) (488 GUT HUT) (4247 GAGS HAIR IBIS) (
423 HAD ICE) (429 HAY ICY) (4353 HELD IDLE) (4659 HOLY INKY) (466 INN ION) (
4667 HOOP INNS IONS) (4747 GRIP IRIS) (489 GUY IVY))

$
FIVES
((522 JAB) (5227 JABS) (5233 JADE) (5245 JAIL) (526 JAM) (5297 JAWS) (5355
JELL) (5375 JERK) (542 JIB) (544 JIG) (5627 JOBS) (5653 JOKE) (5695 JOWL) (
5859 JULY) (5863 JUNE) (5865 JUNK) (5879 JURY) (5878 JUST) (588 JUT) (5887
JUTS) (5336 KEEN) (5357 KELP) (536 KEN) (539 KEY) (5426 KHAN) (5455 KILL) (546
KIN) (5464 KING) (5487 KITS) (5494 KIWI) (5648 KNIT) (5662 KNOB) (5223 LACE) (
5229 LACY) (523 LAD) (5237 LADS) (5239 LADY) (524 LAG) (5243 LAID) (5246 LAIN)
(5262 LAMB) (5265 LANK) (5273 LARD) (5275 LARK) (5274 LASH) (5278 LAST) (5284
LATH) (5282 LAVA) (5325 LEAK) (5326 LEAN) (5327 LEAP) (5335 LEEK) (5338 LEFT)
(5363 LEND) (5367 LENS) (5377 LESS) (5389 LEVY) (5427 LIAR) (5438 LIFT) (5453
LIKE) (5458 LILT) (5459 LILY) (5462 LIMB) (5467 LIMP) (5468 LINT) (5466 LION)
(547 LIP) (5472 LIRA) (5478 LIST) (56 LO) (5625 LOCK) (5638 LOFT) (564 LOG) (

5647 LOGS) (5655 LOLL) (5663 LONE) (5664 LONG) (5665 LOOK) (5676 LORN) (5677 LOSS) (5678 LOST) (5684 LOTH) (5697 LOWS) (5847 LUGS) (5855 LULL) (5864 LUNG) (5873 LURE) (5875 LURK) (5874 LUSH) (593 LYE) (5969 LYNX) (5973 LYRE) (566733 JUMPED))

$

MATCHED-FIVES
((5456 KILN KILO) (5225 JACK LACK) (5247 LAGS LAIR) (5253 KALE LAKE) (5267 JAMS LAMP) (5263 LAME LAND LANE) (527 JAR LAP) (5277 JARS LAPS) (5283 LATE LAUD) (529 JAW JAY LAW LAX LAY) (5299 JAZZ LAZY) (5323 LEAD LEAF) (533 LED LEE) (5337 JEER KEEP LEER LEES) (534 KEG LEG) (5347 KEGS LEGS) (5378 JEST KEPT LEST) (538 JET LET) (5387 JETS LETS) (5423 JIBE LICE) (5425 KICK LICK) (543 KID LID LIE) (5437 KIDS LIES) (5433 LIED LIFE) (5469 JINX LIMY) (5463 KIND LIME LINE) (5465 KINK LINK) (5477 KISS LISP) (548 KIT LIT) (5483 KITE LIVE) (5626 LOAM LOAN) (562 JOB LOB) (5623 LOAD LOAF LOBE) (5646 JOIN LOIN) (5666 LOOM LOON) (5668 KNOT LOOT) (5673 LOPE LORD LORE LOSE) (568 JOT LOT) (5687 JOTS LOTS) (5683 LOUD LOVE) (569 JOY LOW) (584 JUG LUG) (5867 JUMP LUMP) (5883 JUTE LUTE))

$

SIXES
((636 MEN) (62 MA) (6223 MACE) (6233 MADE) (6243 MAID) (6258 MALT) (626 MAN) (6269 MANY) (6274 MASH) (6287 MATS) (6283 MATE) (6285 MAUL) (6293 MAZE) (6323 MEAD) (6326 MEAN) (6335 MEEK) (6338 MEET) (6358 MELT) (6363 MEND) (6373 MERE) (6372 MESA) (6374 MESH) (6377 MESS) (6383 METE) (6422 MICA) (643 MID) (6436 MIEN) (6465 MINK) (6468 MINT) (6473 MIRE) (6478 MIST) (6483 MITE) (6488 MITT) (649 MIX) (6626 MOAN) (6628 MOAT) (662 MOB) (6625 MOCK) (6658 MOLT) (666 MOO) (6663 MOOD) (6678 MOST) (6684 MOTH) (683 MUD) (6853 MULE) (6874 MUSH) (6883 MUTE) (6888 MUTT) (6984 MYTH) (622 NAB) (6227 NABS) (624 NAG) (6247 NAGS) (6289 NAVY) (6297 NAYS) (6327 NEAR) (6366 NEON) (6397 NEWS) (6398 NEXT) (642 NIB) (6425 NICK) (6444 NIGH) (647 NIP) (6635 NOEL) (6665 NOOK) (668 NOT) (6683 N) (6855 NULL) (6862 NUMB) (686 NUN) (6867 NUNS) (6887 NUTS) (6239 OBEY) (6337 ODDS) (6367 ODOR) (64 OH) (6457 OILS) (6459 OILY) (65 OK) (6529 OKAY) (653 OLD) (6648 OMIT) (6623 ONCE) (6659 ONLY) (6736 OPEN) (6787 OPUS) (67 OR) (672 ORB) (673 ORE) (687 OUR) (6836 OVEN) (6837 OVER) (693 OWE) (6937 OWES) (695 OWL) (696 OWN) (639 NEW))

$

MATCHED-SIXES
((6246 MAIM MAIN) (6253 MAKE MALE) (6275 MARK MASK) (6278 MART MAST) (63 OF ME) (6368 MENT MENU) (6423 NICE MICE) (6455 MILK MILL) (6653 MOLD MOLE) (6667 MOOS MOOR) (6677 MOPS MOSS) (6683 MOTE MOVE) (6875 MURK MUSK) (6245 MAIL NAIL) (6277 MARS MASS NAPS) (6273 MARE NAPE) (629 MAW MAY NAY) (6328 MEAT NEAT) (6325 MEAL NECK) (6463 MIND MINE NINE) (6477 MISS NIPS) (6633 MODE NODE) (6666 MONO MOON NOON) (667 MOP NOR) (6676 MORN NORM) (6673 MORE NOSE) (669 NOW M) (6833 MUFF NUDE) (623 MAD OAF) (625 MAL OAK) (627 MAP MAR NAP OAR) (628 MAT OAT) (6284 MATH OATH) (6263 MANE NAME OBOE) (633 NEE ODD ODE) (638 MET NET OFT) (6453 MILD MILE OGLE) (645 NIL OIL) (66 NO ON) (663 ONE NOD) (6637 NODS ONES) (6686 NOUN ONTO) (6725 OPAL ORAL) (6824 MUCH OUCH) (6877 MUSS OURS) (6878 MUST OUST) (688 NUT OUT) (6825 MUCK OVAL) (69 MY OX))

$ $ SEVENS
((72 PA) (7228 PACT) (7237 PADS) (725 PAL) (7257 PALS) (7255 PALL) (7256 PALM)
(7272 PAPA) (7275 PARK) (7284 PATH) (7328 PEAT) (734 PEG) (7347 PEGS) (7358
PELT) (736 PEN) (7367 PENS) (7366 PEON) (7377 PEPS) (7375 PERK) (7376 PESO) (
74 PI) (7437 PIER) (7447 PIGS) (7532 PLEA) (7563 PLOD) (7636 POEM) (7675 PORK)
(7679 POSY) (77377 PRESS) (776 PRO) (7763 PROD) (7862 PUMA) (7872 PUPA) (7849
QUIZ) (7229 RACY) (7238 RAFT) (7252 RAJA) (7287 RATS) (7293 RAZE) (7299 RAZZ)
(73 RE) (7323 READ) (7346 REIN) (7359 RELY) (742 RIB) (7427 RIBS) (7424 RICH)
(7475 RISK) (7626 ROAM) (7688 ROUT) (7846 RUIN) (7853 RULE) (7878 RUST) (7887
RUTS) (793 RYE) (7 S) (722 SAC) (7233 SAFE) (7242 SAGA) (7258 SALT) (7222 SCAB
) (7226 SCAN) (7227 SCAR) (7269 SCOW) (7286 SCUM) (7353 SELF) (7355 SELL) (
7373 SERF) (7426 SHAM) (7466 SHOO) (7469 SHOW) (7486 SHUN) (7444 SIGH) (7458
SILT) (7483 SITE) (7493 SIZE) (754 SKI) (7543 SKID) (7522 SLAB) (7524 SLAG) (
7527 SLAP) (7539 SLEW) (7548 SLIT) (7567 SLOP) (7624 SNAG) (7647 SNIP) (7662
SNOB) (7682 SNUB) (76 SO) (766 SON) (7685 SOUL) (7726 SPAN) (7727 SPAR) (7728
SPAT) (7748 SPIT) (7768 SPOT) (7779 SPRY) (7786 SPUN) (7787 SPUR) (7822 STAB)
(7836 STEM) (7839 STEW) (7882 STUB) (7886 STUN) (789 STY) (7838 SUET) (7922
SWAB) (7927 SWAP) (7928 SWAT) (7929 SWAY) (7946 SWIM) (72789 PARTY) (78425
QUICK))

$ MATCHED-SEVENS
((737 PEP PER) (7453 PIKE PILE) (7767 PROS PROP) (7877 PUPS PURR) (787 PUP PUS
) (7223 PACE RACE) (7247 PAIR RAGS) (7246 PAIN RAIN) (7267 PANS RAMS RAMP) (
726 PAN RAM RAN) (7264 PANG RANG) (7278 PART RAPT) (7273 PARE RAPE RARE) (7277
PASS RAPS RASP) (7378 PERT PEST REST) (744 PIG RIG) (7623 ROAD ROBE) (7655
POLL ROLL) (7665 POOL ROOK) (768 POT ROT) (7683 ROTE ROVE) (7833 PUFF RUDE) (
784 PUG RUG) (7868 PUNT RUNT) (7874 PUSH RUSH) (788 PUT RUT) (7225 PACK RACK
SACK) (723 PAD SAD) (724 RAG SAG) (7243 PAGE PAID RAGE RAID SAGE SAID) (7245
PAIL RAIL SAIL) (7253 PALE RAKE SAKE SALE) (7263 PANE SAME SAND SANE) (7265
RANK SANK) (727 PAP PAR RAP SAP) (7274 RASH SARI SASH) (728 PAT RAT SAT) (7283
PATE PAVE RATE RAVE SAVE) (729 PAW PAY RAW RAY SAW SAY) (7297 RAYS SAYS) (7268
PANT SCOT) (732 PEA SEA) (7325 PEAK PEAL PECK REAL SEAL) (7326 REAM SEAM) (
7327 PEAS PEAR REAP REAR SEAS SEAR) (733 RED SEE) (7333 REED REEF SEED) (7335
PEEK PEEL REEK REEL SEEK) (7336 REDO SEEM SEEN) (7337 PEEP PEER SEES SEEP) (
7363 REND SEND) (7368 PENT RENT SENT) (738 PET REV SET) (7387 PETS REVS SETS)
(7397 PEWS SEWS) (739 PEW SEW SEX) (7423 RICE SHAD) (743 PIE SHE) (7463 PINE
RIND SHOE) (7468 PINT RIOT SHOT) (7425 PICK SICK) (7433 PIED RIDE RIFE SHED
SIDE) (7438 RIFT SIFT) (7446 SHIN SIGN) (7455 SILK SILL) (746 PIN RIM SIN) (
7467 RIMS SHOP SINS) (7464 RING SING) (7465 PINK RINK SINK) (747 PIP RIP SIP
SIR) (7473 PIPE RIPE RISE SIRE) (7477 RIPS SIPS) (748 PIT SIT) (7487 PITS SITS
) (749 SHY SIX) (7526 PLAN SLAM) (7528 PLAT SLAT SLAV) (7529 PLAY SLAY) (7533
PLED SLED) (7546 SKIM SKIN SLIM) (7547 SKIP SLIP) (7568 PLOT SLOT) (7569 PLOW
SLOW) (7584 PLUG SLUG) (7586 PLUM SLUM) (7587 PLUS SLUR) (759 PLY SKY SLY) (
7669 PONY SNOW) (7684 SMUG SNUG) (762 ROB SOB) (7627 ROAR ROBS SNAP SOAP SOAR
SOBS) (7625 POCK ROCK SOAK SOCK) (763 POD ROD ROE SOD) (7637 RODS SODS) (7632
SODA SOFA) (7638 POET SOFT) (7645 ROIL SOIL) (7653 POKE POLE ROLE SOLD SOLE) (
7656 POLO SOLO) (7663 POND ROOF SOME) (7667 POOR ROMP SONS) (7664 POOH SMOG
SONG) (7666 ROOM SOON) (7668 ROOT SOOT) (767 POP SOP) (7677 POPS SOPS) (7673
POPE PORE POSE ROPE ROSE SORE) (7678 PORT POST SORT) (7687 POTS POUR ROTS SOUP
) (769 ROW SOW) (7697 ROWS SOWS) (7729 PRAY SPAY) (7739 PREY SPEW) (7746 PRIM
SPIN) (779 PRY SPY) (7827 RUBS STAR) (7829 QUAY RUBY STAY) (7847 RUGS STIR) (
7869 PUNY STOW) (782 RUB SUB) (7824 STAG SUCH) (7825 PUCK SUCK) (783 RUE SUE)
(7837 STEP SUDS SUES) (7848 QUIT SUIT) (7855 PULL SULK) (786 RUN PUN SUM SUN)
(7867 PUMP PUNS RUMP RUNS SUMS SUNS) (7864 RUNG SUNG) (7865 PUNK SUNK) (7873
PURE RUSE SURE SURF) (7926 SWAM SWAN))

EIGHTS
((8 T) (822 TAB) (8225 TACK) (8228 TACT) (824 TAG) (8247 TAGS) (8245 TAIL) (
8252 TALC) (8264 TANG) (8265 TANK) (8275 TASK) (8288 TAUT) (829 TAX) (8294
TAXI) (832 TEA) (8326 TEAM) (8327 TEAR) (8328 TEAT) (8355 TELL) (836 TEN) (
8367 TENS) (8398 TEXT) (8426 THAN) (8428 THAT) (8429 THAW) (8446 THIN) (8447
THIS) (8483 THUD) (8484 THUG) (8455 TILL) (8458 TILT) (8467 TINS) (847 TIP) (
8477 TIPS) (848 TIT) (86 TO) (8623 TOAD) (863 TOE) (8637 TOES) (8642 TOGA) (
8647 TOGS) (8645 TOIL) (8653 TOLD) (8655 TOLL) (8662 TOMB) (8667 TONS) (8663
TONE) (8668 TOOT) (867 TOP) (8673 TORE) (8676 TORN) (8696 TOWN) (8726 TRAM) (
8727 TRAP) (8729 TRAY) (8735 TREK) (8747 TRIP) (8768 TROT) (8783 TRUE) (879
TRY) (8797 TRYS) (882 TUB) (8827 TUBS) (8822 TUBA) (8823 TUBE) (8825 TUCK) (

8838 TUFT) (884 TUG) (8847 TUGS) (8862 TUNA) (8863 TUNE) (8873 TURF) (8876 TURN) (88 TV) (8946 TWIN) (8948 TWIT) (896 TWO) (8967 TWOS) (8953 TYKE) (8973 TYPE) (844 UGH) (8459 UGLY) (8648 UNIT) (8686 UNTO) (8766 UPON) (8743 URGE) ( 876 URN) (8767 URNS) (873 USE) (8737 USES) (8246 VAIN) (8279 VARY) (828 VAT) ( 8287 VATS) (8337 VEER) (8345 VEIL) (8346 VEIN) (8353 VELD) (8372 VERB) (8379 VERY) (838 VET) (8387 VETS) (8386 VETO) (839 VEX) (842 VIA) (8423 VICE) (8643 VOID) (8658 VOLT) (84347 THEIR) (843 THE))

$ MATCHED-EIGHTS
((8255 TALL TALK) (827 TAP TAR) (8277 TAPS TARS) (8336 TEEM TEEN) (8376 TERM TERN) (8436 THEM THEN) (8433 TIDE TIFF) (8468 THOU TINT) (8487 THUS TITS) (866 TON TOO) (8665 TOOK TOOL) (8677 TOPS TOSS) (868 TNT TOT) (8687 TOTS TOUR) ( 8746 TRIM TRIO) (8875 TURK TUSK) (87 US U) (8733 TREE USED) (8253 TAKE TALE VALE) (826 TAN VAN) (8267 TAMP TANS VANS) (8263 TAME VANE) (8273 TAPE VASE) ( 8278 TART VAST) (8325 TEAK TEAL VEAL) (8363 TEND VEND) (8368 TENT VENT) (8378 TEST VEST) (8425 TICK VIAL) (8437 TIER VIES) (8439 THEY VIEW) (8453 TILE VILE) (846 TIN VIM) (8463 TIME TINE VINE) (8473 TIRE VISE) (8683 TOTE VOTE) (869 TOW TOY VOW) (8697 TOWS TOYS VOWS))

$

NINES
((923 WAD) (9237 WADS) (9233 WADE) (9238 WAFT) (924 WAG) (9247 WAGS) (9245 WAIL) (9248 WAIT) (9253 WAKE) (9268 WANT) (9279 WARY) (9274 WASH) (9288 WATT) (9283 WAVE) (9289 WAVY) (9299 WAXY) (9297 WAYS) (93 WE) (9326 WEAN) (9333 WEED ) (9335 WEEK) (9337 WEEP) (9353 WELD) (9358 WELT) (9363 WEND) (9368 WENT) ( 9373 WERE) (9387 WETS) (9428 WHAT) (9436 WHEN) (9438 WHET) (9439 WHEW) (9446 WHIM) (9448 WHIT) (9449 WHIZ) (9466 WHOM) (949 WHY) (9425 WICK) (944 WIG) ( 9455 WILL) (9458 WILT) (9459 WILY) (9467 WINS) (9465 WINK) (9479 WIRY) (9474 WISH) (948 WIT) (9487 WITS) (9484 WITH) (963 WOE) (9662 WOMB) (9668 WONT) ( 9667 WOOS) (9665 WOOL) (9675 WORK) (9683 WOVE) (9727 WRAP) (9736 WREN) (9748 WRIT) (979 WRY) (9 X) (925 YAK) (9265 YANK) (9295 YAWL) (9296 YAWN) (9357 YELP ) (936 YEN) (937 YES) (9655 YOLK) (968 YOU) (9687 YOUR) (96877 YOURS) (9695 YOWL) (9853 YULE) (9269 ZANY) (9376 ZERO) (9462 ZINC) (9666 ZOOM))

$ MATCHED-NINES
((9243 WAGE WAIF) (9255 WALK WALL) (9263 WAND WANE) (9277 WARP WASP) (929 WAX WAY) (933 WED WEE) (9433 WIDE WIFE) (9447 WHIP WHIR WIGS) (9453 WILD WILE) ( 946 WHO WIN) (9463 WIND WINE) (9473 WIPE WIRE WISE) (9676 WORM WORN) (926 WAN YAM) (927 WAR YAP) (9273 WARD WARE YARD) (9276 WARM WARN YARN) (932 WEB YEA) ( 9327 WEAR YEAR) (9355 WELL YELL) (938 WET YET) (9653 WOKE WOLF YOKE) (9673 WORD WORE YORE) (9325 WEAK ZEAL) (9378 WEPT WEST ZEST) (9464 WING ZING) (947 YIP ZIP) (9477 WISP ZIPS) (9663 WOOD WOOF ZONE) (966 WON WOO YON ZOO))

$

Appendix E 8-19-8.

SPANISH $ TWOS
((2 A) (2223 ABAD) (222 ACA) (2286 ACTO) (2346 AFIN) (2445 AGIL) (244 AHI) 2473 AIRE) (2527 AJAR) (254 AJI) (256 AJO) (25 AL) (2522 ALBA) (2526 ALBO) 2542 ALGA) (2546 ALGO) (2586 ALTO) (2583 ALUD) (2592 ALZA) (2552 ALLA) (255· ALLI) (262 AMA) (2627 AMAR) (2667 AMOR) (2645 ANIL) (2786 APTO) (2784 AQUI) 2265 ABOL) (2722 ARCA) (2723 ARCE) (2773 ARO) (2773 ARRE) (2783 ARTE) (27 AS 2729 ASAZ) (2736 ASEO) (274 ASI) (2747 ASIR) (2766 ASNO) (2782 ASTA) (2827 ATAR) (2843 AUGE) (286 AUN) (283 AVE) (2842 AVIA) (292 AYA) (2937 AYER) (29: AZAR) (2985 AZUL) (227 BAR) (2283 BATE) (2285 BAUL) (2323 BEBE) (2332 BEFA) 2436 BIEN) (2632 BODA) (2633 BOFE) (2642 BOGA) (2682 BOTA) (2692 BOYA) (269( BOZO) (2839 BUEY) (2853 BUJE) (2226 CABO) (2232 CADA) (2237 CAER) (2233 CAFI (2246 CAGO) (225 CAL) (226 CAN) (2267 CAOS) (2274 CASI) (2333 CEDE) (2342 CI

) (2356 CELO) (2362 CENA) (2366 CENO) (2462 CINC) (2463 CINE) (2623 COCE) (
2636 CODO) (2643 COGE) (265 COL) (2662 COMA) (2663 COME) (2673 COSE) (2686
COTO) (269 COZ) (2742 CRIA) (2789 CRUZ) (2825 CUAL) (2822 CUBA) (2856 CULO)
2862 CUNA) (2873 CUPE) (2876 CUPO) (289 CUZ) (2425 CHAL) (243 CHE))

$

MATCHED-TWOS
((252 AJA ALA) (272 ARA ASA) (2727 ARAR ASAR) (2726 ARCO ASCO) (2772 ARPA AS
) (2886 ATUN AUTO) (2273 ACRE BASE) (2562 ALMA BLOC) (2683 ANTE BOTE) (2732
AREA ASEA BREA) (2836 ATEO BUEN) (2846 AVIO BUHO) (2852 AULA BULA) (2222 BAE
CACA) (2252 BAJA BALA CAJA CALA) (2256 BAJO CALO) (2262 BANA CAMA CANA) (226
BANO CANO) (2272 ABRA ACRA BASA CAPA CARA CASA) (2276 CARO CASO) (2282 BATA
CATA CAVA) (2292 BAYA CAZA) (2296 BAYO BAZO CAYO CAZO) (2322 BECA CEBA) (232
AFAN CEBO) (2352 CEJA CELA) (2372 BESA CEPA CERA) (2376 BESO CEPO CERO) (24E
AGUA CITA) (2622 ANCA BOCA COBA COCA) (2626 BOBO COCO) (2656 BOLO COJO) (265
BOLA COLA) (266 AMO ANO CON) (2666 BONO COMO CONO) (2676 BORO COPO CORO) (26
COPA COSA) (2746 APIO BRIO CRIN) (2762 ARMA CROA) (2826 CUBO CUCO) (2872 AUR
CURA) (2896 BUZO CUYO))

$

THREES
((3222 DACA) (3236 DADO) (3266 DANO) (327 DAR) (32 DA) (3282 DATA) (3286 DATO)
(3324 DECI) (3352 DEJA) (3356 DEJO) (335 DEL) (342 DIA) (3453 DIJE) (3467 DIOS
) (349 DIZ) (366 DON) (3745 DRIL) (3832 DUDA) (3872 DURA) (3876 DURO) (326 ECO
) (353 EJE) (35 EL) (3552 ELLA) (3556 ELLO) (3633 ENDE) (3772 ERRA) (373 ESE)
(376 ESO) (3782 ESTA) (3783 ESTE) (3837 ETER) (3252 FAJA) (3256 FAJO) (3276
FARO) (3273 FASE) (329 FAZ) (336 FEO) (3427 FIAR) (3435 FIEL) (3452 FILA) (346
FIN) (3466 FINO) (3567 FLOR) (3589 FLUX) (3622 FOCA) (3626 FOCO) (3636 FOFO) (
3672 FOSA) (3686 FOTO) (3729 FRAY) (3734 FREI) (3746 FRIO) (3856 FULO) (3842
FUGA))

$ $ MATCHED-THREES
((3662 DOMA DONA) (3242 DAGA ECHA) (3323 DEBE EDAD) (3336 DEDO EDEN) (36 DO EN
) (3683 DOTE ENTE) (372 EPA ERA) (3262 DAMA DANA FAMA) (33 DE FE) (3456 FIJO
FILO) (3676 FORO FOSO) (3862 DUNA FUMA))

$

FOURS
((4253 GAJE) (4256 GAJO) (4252 GALA) (4262 GANA) (427 GAS) (4272 GASA) (4362
GEMA) (4422 GIBA) (4472 GIRA) (4623 GOCE) (46736 GORDO) (4682 GOTA) (4726 GRAN
) (4739 GREY) (4782 GRUA) (4842 GUIA) (4852 GULA) (4222 HABA) (42 HA) (4826
HUBO) (4223 HACE) (4232 HADA) (4236 HADO) (43 HE) (4352 HELA) (4366 HENO) (
4376 HERO) (439 HEZ) (4435 HIEL) (4446 HIGO) (4486 HITO) (4672 HORA) (469 HOZ)
(4847 HUIR) (4853 HULE) (4866 HUMO) (4876 HUSO) (432 IDA) (4332 IDEA) (4336
IDEM) (47 IR) (472 IRA) (4752 ISLA) (4927 IZAR) (492 IZA))

$ MATCHED-FOURS
((4286 GATO HATO) (4292 GAZA HAYA) (429 HAY HAZ) (4452 HIJA HILA) (4456 HIJO
HILO) (4476 GIRO HIPO) (4652 HOJA HOLA) (4696 GOZO HOYO) (4692 HOYA HOZA) (
4747 GRIS IRIS))

$ $ FIVES
((5239 JAEZ) (524 JAI) (5272 JARA) (5333 JEFE) (5422 JIBA) (5682 JOTA) (5836
JUDO) (5839 JUEZ) (5842 JUGA) (5846 JUGO) (5872 JURA) (5876 JURO) (52 LA) (
5236 LADO) (5246 LAGO) (5252 LAJA) (5262 LANA) (5296 LAZO) (53 LE) (5325 LEAL)
(5346 LEGO) (5356 LELO) (537 LES) (5383 LEVE) (539 LEY) (5427 LIAR) (5442 LIGA
) (5462 LIMA) (546 LIO) (5476 LISO) (56 LO) (5627 LOAR) (5636 LODO) (5676 LORO
) (567 LOS) (5672 LOSA) (5856 LUJO) (5862 LUNA) (5886 LUTO) (589 LUZ))

$ MATCHED-FIVES
((5456 KILN KILO) (5225 JACK LACK) (5247 LAGS LAIR) (5253 KALE LAKE) (5267
JAMS LAMP) (5263 LAME LAND LANE) (5277 JARS LAPS) (5283 LATE LAUD) (529 JAW
JAY LAW LAX LAY) (5299 JAZZ LAZY) (5323 LEAD LEAF) (533 LED LEE) (5337 JEER
KEEP LEER LEES) (534 KEG LEG) (5347 KEGS LEGS) (5378 JEST KEPT LEST) (538 JET
LET) (5387 JETS LETS) (5423 JIBE LICE) (5425 KICK LICK) (543 KID LID LIE) (
5437 KIDS LIES) (5433 LIED LIFE) (5469 JINX LIMY) (5463 KIND LIME LINE) (5465
KINK LINK) (5477 KISS LISP) (548 KIT LIT) (5483 KITE LIVE) (562 JOB LOB) (5623
LOAD LOAF LOBE) (564 JOG LOG) (5646 JOIN LOIN) (5668 KNOT LOOT) (5673 LOPE
LORD LORE LOSE) (568 JOT LOT) (5687 JOTS LOTS) (569 JOY LOW) (584 JUG LUG) (
5867 JUMP LUMP) (5883 JUTE LUTE) (5222 JACA LACA) (527 JAR LAP LAS) (5282 LATA
LAVA) (5362 LEMA LENA) (5366 LENO LEON) (5382 JETA LEVA) (5452 LIJA LILA) (
5466 LIMO LINO) (5472 JIRA LIRA) (5626 LOAM LOAN LOBO LOCO) (5666 LOOM LOON
LOMO) (5662 LOMA LONA) (5683 LOUD LOVE LOTE) (5692 JOYA LOZA))

$ $ SIXES
((6249 MAIZ) (625 MAL) (6264 MANI) (6266 MANO) (63 ME) (6327 MEAR) (6336 MEDO)
(6368 MENU) (6376 MERO) (637 MES) (6372 MESA) (6382 META) (6428 MIAU) (6426
MICO) (6435 MIEL) (6437 MIES) (6442 MIGA) (646 MIO) (6474 MISI) (6486 MITO) (
6626 MOCO) (6636 MODO) (6646 MOHO) (6652 MOJA) (6653 MOLE) (6662 MONA) (6672
MORA) (6676 MORO) (6683 MOTE) (6696 MOZO) (6832 MUDA) (6852 MULA) (6872 MUSA)
(689 MUY) (6226 NABO) (6232 NADA) (6342 NEGA) (6362 NENA) (6366 NEON) (6386
NETO) (66 NO) (666 NON) (6823 NUBE) (6822 NUCA) (6839 NUEZ) (6286 NATO) (68 NU
) (6 O) (6263 OBOE) (6273 OCRE) (6346 ODIO) (6373 ODRE) (6476 OGRO) (647 OIR)
(6525 OJAL) (656 OJO) (652 OLA) (653 OLE) (6536 OLEO) (6537 OLER) (6552 OLLA)
(672 ORA) (6725 ORAL) (6723 ORBE) (6752 ORLA) (6825 OVAL))

$ MATCHED-SIXES
((6256 MAJO MALO) (627 MAR MAS) (6292 MAYA MAZA) (6296 MAYO MAZO) (6472 MIRA
MISA) (6262 MAMA MANA NANA) (6282 MATA NATA) (6283 MATE NAVE) (64 MI NI) (6462
MINA NINA) (6466 MIMO NINO) (6682 MOTA NOTA) (6836 MUDO NUDO) (6856 MULO NULO)
(6666 MONO NONO) (6272 MASA OBRA) (6246 MAGO OCIO) (632 MEA ODA) (6436 NIDO
OIDO) (6567 OJOS OLOR) (6632 MODA MOFA ONDA) (6692 MOZA ONZA) (6746 OPIO ORIN)
(6727 ORAR OSAR) (676 ORO OSO) (6876 MURO OTRO))

$ $ SEVENS
((7223 PACE) (7242 PAGA) (7246 PAGO) (7247 PAIS) (7253 PAJE) (729 PAZ) (7322
PECA) (7334 PEDI) (7336 PEDO) (7363 PENE) (7367 PEOR) (7425 PIAL) (7427 PIAR)
(7423 PIBE) (7422 PICA) (743 PIE) (7452 PILA) (7473 PISE) (7476 PISO) (7482
PITA) (7526 PLAN) (7634 PODI) (7683 POTE) (776 PRO) (7762 PROA) (782 PUA) (
7837 PUES) (7852 PUJA) (7856 PULO) (7873 PURE) (7892 PUYA) (7237 RAER) (7249
RAIZ) (7296 RAYO) (7347 REIR) (736 RED) (742 RIA) (7432 RIFA) (7492 RIZA) (
7496 RIZO) (7623 ROCE) (7637 ROER) (7662 RONA) (7686 ROTO) (7692 ROZA) (7836
RUDO) (7846 RUIN) (7222 SACA) (725 SAL) (7332 SEDA) (7333 SEDE) (74 SI) (7436
SIEN) (7456 SILO) (76 SO) (7639 SOEZ) (7642 SOGA) (765 SOL) (7896 SUYO))

$

MATCHED-SEVENS
(((7372 PEPA PERA PESA) (767 POR POS) (7696 POYO POZO) (7256 PALO RALO) (7272
PAPA PARA PASA RAPA) (7273 PASE RAPE) (727 PAR RAS) (7282 PATA PAVA RATA) (
7286 PATO PAVO RATO) (7292 RAYA RAZA) (7325 PEAL REAL) (7342 PEGA REGA) (7352
PELA REJA) (7356 PELO REJO) (7353 PEJE RELE) (739 PEZ REY) (7426 PICO RICO) (
7435 PIEL RIEL) (7626 POCO ROBO) (7876 PURO RUSO) (7882 PUTA RUTA) (73 RE SE)
(7226 RABO SACO) (7252 PAJA PALA RAJA SALA) (726 PAN SAN) (7262 PANA RAMA RANA
SANA) (7266 PANO RAMO SANO) (7276 PARO PASO RARO RASO SAPO) (7326 SEBO SECO) (
733 RED SED) (7366 PEON REMO RENO SENO) (7362 PENA REMA SENA) (737 RES SER) (
7376 PERO PESO SESO) (7382 RETA SETA) (7386 RETO SETO) (7396 REZO SEXO) (7462
PINA RIMA RINA SIMA) (746 PIO RIO SIN) (7466 PINO SINO) (7472 PIPA PISA RISA
SISA) (7486 PITO RITO SITO) (7622 ROCA SOBA) (7632 PODA RODA SOFA) (7656 POLO
ROJO SOLO) (766 RON SON) (7672 POPA POSA ROPA ROSA SOPA SOSA) (7676 PORO SOSO)
(7682 ROTA SOTA) (7824 RUBI SUBI) (783 QUE SUD) (7862 PUMA SUMA) (7866 PUNO
SUMO) (787 PUS SUR)))

$

EIGHTS
(((862 UNA) (8226 TACO) (8256 TAJO) (825 TAL) (8252 TALA) (826 TAN) (8282 TATA)
(8292 TZA) (83 TE) (8363 TEME) (84 TI) (8426 TICO) (8436 TIFO) (8452 TILA) (
8462 TINA) (846 TIO) (8472 TIRA) (8492 TIZA) (8622 TOCA) (8636 TODO) (8642
TOGA) (866 TON) (8672 TOPA) (8673 TOPE) (867 TOS) (8692 TOZA) (8736 TREN) (
8765 TROJ) (88 TU) (8826 TUBO) (8836 TUFO) (885 TUL) (8862 TUNA) (8872 TUSA) (
8896 TUYO) (8273 UBRE) (86 UN) (8647 UNIR) (8682 UNTA) (8686 UNTO) (8723 URBE)
(8762 URNA) (876 USO) (8845 UTIL) (882 UVA) (89 UY) (8222 VACA) (8236 VADO) (
8242 VAGA) (8246 VAGO) (82 VA) (827 VAS) (8253 VALE) (8257 VALS) (8266 VANO) (
8276 VASO) (8283 VATE) (8332 VEDA) (8342 VEGA) (837 VER) (8372 VERA) (8386
VETO) (843 VID) (8432 VIDA) (8442 VIGA) (845 VIL) (8456 VILO)))

$ MATCHED-EIGHTS
(((8476 TIPO TIRO) (8666 TOMO TONO) (8676 TOPO TORO) (8727 TRAS USAR) (8272
TAPA TASA VARA) (8352 TEJA TELA VEJA VELA) (8356 TEJO VELO) (8362 TEMA VENA) (
8382 TETA VETA) (839 TEZ VEZ) (842 TIA VIA) (8466 TINO VINO)))

$

NINES
(((9242 ZAGA) (927 ZAS) (9462 ZINC) (9662 ZONA) (9866 ZUMO) (9876 ZURO))

$ MATCHED-NINES
NIL $

What is claimed is:
1. The method of obtaining a desired data base entry in a computer system including a keyboard means linked to a data base, which includes differentiating matched data base entries obtained by electrical signals transmitted to the data base by said keyboard means which transmits indicia knowledge to a user and accesses the data base wherein each key of said keyboard represents a plurality of indicia and each key is capable of producing a unique electrical signal comprising the steps of:
(a) selecting a key or sequence of keys representing an indicia or string of indicia which is knowledgeable to the user;
(b) activating said key or sequence of keys selected;
(c) producing a signal or sequence of signals corresponding to said key or sequence of keys activated;
(d) comparing said signal or sequence of signals to said data base having a multiplicity of indexed data entries having at least one knowledgeable indicia or string of indicia associated therewith;
(e) selecting from said data base all indexed data entries matching said produced signal or sequence of signals and compiling all of said entries matching said produced signal or sequence of signals into a list of possibilities wherein at least two data base entries are included on said list of possibilities;
(f) analyzing all of said data entries on said list of possibilities at least a first time and determining at least a first indicia of at least one of said data entries formulated on said list of possibilities which distinguishes from at least one corresponding indicia of at least one other of said data entries formulated on said list of possibilities;

(g) querying the user at least a first time regarding said distinguishing indicia;

(h) said user responding to at least said first query;

(i) processing said user's response to at least said first query to determine the data entry desired by the user, and;

(j) informing the user of the desired data entry.

2. The method as in claim 1, wherein the step of:

(a) informing the user of the desired data entry includes providing information associated with the data entry to the user.

3. The method as in claim 2, wherein:

(a) said key pad is a standard touch-tone key pad and said electrical signals are produced by a TOUCH-TONE generator, each signal being in the form of one of twelve DTMF tones corresponding to the twelve keys of a TOUCH-TONE key pad.

4. The method as in claim 3, wherein:

(a) said data entries in said data base each correspond to one of a plurality of names and associated addresses listed in a telephone directory, and;

(b) said information associated with each of said data entries is a telephone number.

5. The method as in claim 4, wherein:

(a) said associated addresses include state, city and street localities;

(b) said data entries each include at least a first letter of said corresponding names;

(c) said data entries each further include at least three letters of said city associated with said corresponding names, and;

(d) said data entries each further include at least two letters of said state associated with said corresponding name.

6. A method as in claim 1, wherein:

(a) said query of the user at least a first time is solely with respect to said distinguishing indicia.

7. A method as in claim 1, wherein:

(a) said first indicia is common to at least two of said indexed data entries formulated on said list of possibilities and distinguishes said indexed data entries having said common first indicia from corresponding indicia of at least two other of said indexed data entries formulated on said list of possibilities;

(b) said user's response to said at least first query includes one of indicating said common first indicia is different from a corresponding indicia of said data entry desired and indicating said common first indicia is the same as a corresponding indicia of said data entry desired, and;

(c) said processing of said user's response to determine the desired data entry includes one of excluding said indexed data entries having said common first indicia from said list of possibilities and excluding said at least two other indexed data entries from said list of possibilities.

8. A method as in claim 1, wherein:

(a) said first indicia is common to at least two of said indexed data entries formulated on said list of possibilities;

(b) said user's response to said at least first query includes indicating that said common first indicia is different from a corresponding indicia of said data entry desired, and;

(c) said processing of said user's response to determine the desired data base entry includes excluding said at least two data entries having said common letter from said list of possibilities.

9. A method of informing a user of a telephone number for a desired entity via an automated directory assistance system including a TOUCH-TONE type telephone keying means linked to a data base having a plurality of data entries each corresponding to an entity listed in a telephone directory and differentiating means for distinguishing matched data entries obtained by activating only a single key of said TOUCH-TONE keying means per letter representing a data entry desired wherein said keying means transmits an electrical signal to said data base and each key of said TOUCH-TONE keying means represents a plurality of letters and is capable of producing only one unique electrical signal comprising the steps of:

(a) selecting a key or sequence of keys representing a letter or series of letters of an entity for which the telephone number is desired;

(b) activating said key or sequence of keys selected;

(c) producing a signal or sequence of signals corresponding to said key or sequence of keys activated;

(d) comparing said sequence of signals to said data base having a multiplicity of indexed data entries having at least one letter or series of letters associated therewith;

(e) selecting from said data base all indexed data entries matching said produced signal or sequence of signals and compiling all of said data entries matching said produced signal or sequence of signals into a list of possibilities wherein at least two data entries are included on said list of possibilities;

(f) analyzing all of said data entries on said list of possibilities at least a first time and determining at least a first letter of at least one of said data entries formulated on said list of possibilities which distinguishes from at least one corresponding letter of at least one other of said data entries formulated on said list of possibilities;

(g) querying the user at least a first time regarding said distinguishing letter;

(h) said user responding to at least said first query;

(i) processing said user's response to at least said first query to determine the data entry desired by the user, and;

(j) informing the user of the telephone number associated with said data entry desired.

10. A method as in claim 9, wherein:

(a) said query of the user at least a first time is solely with respect to said distinguishing letter.

11. A method as in claim 9, wherein:

(a) said key or sequence of keys selected include at least three keys representing the last name of the entity for which the telephone number is desired;

(b) said key or sequence of keys selected further include at least three keys representing the city type locality in which the desired entity resides, and;

(c) said key or sequence of keys selected further include at least two keys representing the state in which the desired entity resides.

12. A method as in claim 11, wherein:

(a) said key or sequence of keys selected further include at least a first key representing the first name of the entity for which the telephone number is desired.

13. A method as in claim 9, wherein:

(a) said key or sequence of keys selected include at most three keys representing the last name of the entity for which a telephone number is desired;

(b) said key or sequence of keys selected include at most three keys representing the city type locality in which the desired entity residues, and;

(c) said key or sequence of keys selected include at most two keys representing the state in which the desired entity resides.

14. A method as in claim 13, wherein:

(a) said key or sequence of keys selected further include at most three keys representing the first name of the entity for which a telephone number is desired.

15. A method as in claim 9, wherein:

(a) said first letter is common to at least two of said indexed data entries formulated on said list of possibilities and distinguishes said indexed data entries having said common first letter from at least two other of said indexed data entries formulated on said list of possibilities;

(b) said user's response to said at least first query includes one of indicating said common first letter is different from a corresponding letter of said data entry desired and said common letter is the same as a corresponding letter of said data entry desired, and;

(c) said processing of said user's response to determine the desired data entry includes one of excluding said at least two indexed data entries having said common indicia from said list of possibilities and excluding said at least two other indexed data entries from said list of possibilities.

16. A method as in claim 9, wherein:

(a) said first letter is common to at least two of said indexed data entries formulated on said list of possibilities;

(b) said user's response to said at least first query includes indicating that said common first letter is different from a corresponding letter of said data entry desired, and;

(c) said processing of said user's response to determine the data entry desired includes excluding said at least two data entries having said common letter from said list of possibilities.

17. An apparatus for obtaining a desired data entry and differentiating matched data entries obtained by electrical signals transmitted to a data base via a keyboard transmitting means which transmits indicia knowledgeable to a user and accesses the data base wherein each key of the keyboard transmitting means represents a plurality of indicia and each key is capable of producing only one unique electrical signal comprising:

(a) means for keying in an indicia or sequence of indicia knowledgeable to a user;

(b) means for producing a signal or sequence of signals corresponding to the indicia or sequence of indicia knowledgeable to a user;

(c) means for transmitting the signal or sequence of signals produced to a data base;

(d) means for comparing the signal or sequence of signals to said data base having a multiplicity of indexed data entries having at least one knowledgeable indicia or string of indicia associated therewith;

(e) means for selecting from said data base all indexed data entries matching said produced signal or sequence of signals and compiling all of said data entries matching said produced signal or sequence of signals into a list of possibilities wherein at least two data entries are included on said list of possibilities;

(f) means for analyzing all of said data entries on said list of possibilities at least a first time and determining at least a first indicia of one of said data entries formulated on said list of possibilities which distinguishes from at least one indicia of at least one other of said data entries formulated on said list of possibilities;

(g) means for querying the user at least a first time regarding said distinguishing indicia;

(h) means for enabling the user to respond to at least said first query;

(i) means for processing said user's response to at least said first query to determine the data entry desired by the user, and;

(j) means for informing the user of the desired data entry.

18. An apparatus as in claim 17, wherein:

(a) said apparatus is a portable unit.

19. An apparatus as in claim 17, wherein:

(a) said data base includes at least one hundred thousand indexed data entries.

20. An apparatus as in claim 17, wherein:

(a) said keying includes a standard TOUCH-TONE key pad; and, (b) said signal producing means includes a TOUCH-TONE generator whereby a signal in the form of one of twelve DTMF tones is produced corresponding to the one of the twelve keys of the TOUCH-TONE key pad activated by the user.

* * * * *